US012723109B2

(12) United States Patent
Sivaguru et al.

(10) Patent No.: US 12,723,109 B2
(45) Date of Patent: Sep. 1, 2026

(54) BIOMASS DERIVED DIKETONES AS EFFICIENT VISIBLE LIGHT PHOTOINITIATORS

(71) Applicant: Bowling Green State University, Bowling Green, OH (US)

(72) Inventors: Jayaraman Sivaguru, Bowling Green, OH (US); Ravichandranath Singathi, Bowling Green, OH (US)

(73) Assignee: Bowling Green State University, Bowling Green, OH (US)

( * ) Notice: Subject to any disclaimer, the term of this patent is extended or adjusted under 35 U.S.C. 154(b) by 657 days.

(21) Appl. No.: 17/925,930

(22) PCT Filed: May 17, 2021

(86) PCT No.: PCT/US2021/032699
§ 371 (c)(1),
(2) Date: Nov. 17, 2022

(87) PCT Pub. No.: WO2021/236489
PCT Pub. Date: Nov. 25, 2021

(65) Prior Publication Data
US 2023/0183391 A1 Jun. 15, 2023

Related U.S. Application Data

(60) Provisional application No. 63/026,237, filed on May 18, 2020.

(51) Int. Cl.
*C08F 2/50* (2006.01)
*C08F 20/14* (2006.01)

(52) U.S. Cl.
CPC ................ *C08F 2/50* (2013.01); *C08F 20/14* (2013.01)

(58) Field of Classification Search
None
See application file for complete search history.

(56) References Cited

U.S. PATENT DOCUMENTS 3,878,075 A 4/1975 McGinniss
5,739,174 A * 4/1998 Hara ........................ G03F 7/031 522/170
2014/0275075 A1* 9/2014 Beeson ................ C07D 403/06 435/375
2018/0272595 A1 9/2018 Yudovin-Farber et al.
2020/0147042 A1 5/2020 Liang et al.
2023/0183391 A1* 6/2023 Sivaguru ................. C08F 20/14 522/39

FOREIGN PATENT DOCUMENTS

JP 07207188 A * 8/1995
WO WO-9516722 A1 * 6/1995 ............... C08G 9/68
WO 2010081624 7/2010

OTHER PUBLICATIONS

Varun et al. Isatin and its derivatives: a survey of recent syntheses, reactions, and applications. Medchemcomm. Jan. 15, 2019;10(3):351-368. (Year: 2019).*
Mahida et al. Removal of some most hazardous cationic dyes using novel poly (NIPAAm/AA/N-allylisatin) nanohydrogel, Arabian Journal of Chemistry. vol. 9, Issue 3, May 2016, pp. 430-442 (Year: 2016).*
Bibaut-Renauld et al. (2002), Use of α-diketones as visible photoinitiators for the photocrosslinking of waterborne latex paints. J. Polym. Sci. A Polym. Chem., 40: 3171-3181. (Year: 2002).*
Itoh et al. Photolysis of Indan-1,2-dione Derivatives in Oxygen-Doped Argon Matrix at Low Temperature, Bulletin of the Chemical Society of Japan, vol. 82, Issue 4, Apr. 2009, pp. 475-481 (Year: 2009).*
Mahida et al. Synthesis of new superabsorbent poly (NIPAAm/AA/N-allylisatin) nanohydrogel for effective removal of As(V) and Cd(II) toxic metal ions, Chinese Chemical Letters, vol. 25, Issue 4, pp. 601-604 (2014) (Year: 2014).*
Som et al. Polymerization of methyl methacrylate using isatin and benzoyl peroxide combination as photoinitiator. European Polymer Journal. Volume 29, Issue 6, Jun. 1993, pp. 889-892 (Year: 1993).*
Wikipedia contributors. (Jul. 25, 2025). Poly(methyl methacrylate). In Wikipedia, The Free Encyclopedia. Retrieved 20:18, Aug. 14, 2025, Retrieved from internet<https://en.wikipedia.org/w/index.php?title=Poly(methyl_methacrylate)&oldid=1302477177> (Year: 2025).*
PCT International Search Report and Written Opinion, Application No. PCT/US2021/032699, dated Sep. 30, 2021.
Pubchem, SID 16496021, available Oct. 26, 2006 retrieved Jun. 22, 2021, Retrieved from the Internet <URL: http://pubchem.ncbi.nim.nih.gov/substance/16496021> entire document.
Pubchem, SID 388840264, available Dec. 6, 2019 retrieved Jun. 22, 2021, Retrieved from the Internet <URL: http://pubchem.ncbi.nim.nih.gov/substance/388840264> entire document.
Pubchem, SID 236052495, available Feb. 13, 2015 retrieved Jun. 22, 2021, Retrieved from the Internet <URL: http://pubchem.ncbi.nim.nih.gov/substance/236052495> entire document.
Pubchem, SID 387062594, available Nov. 15, 2019 retrieved Jun. 22, 2021, Retrieved from the Internet <URL: http://pubchem.ncbi.nim.nih.gov/substance/387062594> entire document.
Pubchem, SID 385482918, available Sep. 11, 2019 retrieved Jun. 22, 2021, Retrieved from the Internet <URL: http://pubchem.ncbi.nim.nih.gov/substance/385482918> entire document.
The Extended European Search Report, Application No. 21807946.5, dated May 24, 2024.
European Communication pursuant to Article 94(3) EPC, Application No. 21807946.5, dated Nov. 6, 2025.

(Continued)

*Primary Examiner* — Sanza L. McClendon
(74) *Attorney, Agent, or Firm* — MacMillan, Sobanski & Todd, LLC

(57) ABSTRACT

Isatin derivatives, and methods of using isatin and isatin derivatives as photoinitiators, are described.

23 Claims, 31 Drawing Sheets
(26 of 31 Drawing Sheet(s) Filed in Color)

(56) References Cited

OTHER PUBLICATIONS

Dong-Dong et al., "Photoinduced reactions of bicycloalkylidenes with isatin and isoquinolinetrione", Organic & Biomolecular Chemistry, 2012, vol. 10, No. 8, pp. 3626-3635.

* cited by examiner $E_T$ ( Kcal/mol )

Bi-acetyl, 1a 56.4

Benzil, 1b 53.3

Furil, 1c 55

Thenil, 1c 54.5

Camphorquinone, 2 51.3

Isatin, 3a

3b

3c

3d

3e

3f

3g

4

5

O- Xylene

10

Triethanol amine

11

1,4-Diazabicyclo [2.2.2]octane

12

Phenol

13

1) hv (Blue LED), 3 h , rt
2) cold MeOH

6

7

8

9

3a 3b 3c 3d 3e 3f 3g 4 5 6

7 8 9

10 11 12 13 14 15

3a

3c

3a

3e

3a

3f

14

15

15

6

4

5

O- Xylene

10

Triethanol amine

11

1,4-Diazabicyclo [2.2.2]octane

12

Phenol

13

3f

3e

10

BIOMASS DERIVED DIKETONES AS EFFICIENT VISIBLE LIGHT PHOTOINITIATORS

RELATED APPLICATIONS

This application is the national phase application of international application PCT/US2021/032699, filed under the authority of the Patent Cooperation Treaty on May 17, 2021, published; which claims priority to U.S. Provisional Application No. 63/026,237, filed under 35 U.S.C. § 111(b) on May 18, 2020. The entire disclosure of each of the aforementioned applications is incorporated herein by reference for all purposes.

STATEMENT REGARDING FEDERALLY SPONSORED RESEARCH

This invention was made with no government support. The government has no rights in this invention.

BACKGROUND

Tunable photoinitiators are of wide spread need for a wide array of applications in photopolymerization reactions ranging from generating contact lenses, automobile parts, 3D printing, resin curing, silicones, epoxies, dental composites, aircraft parts, and composites. However, conventional photoinitiators are not very efficient, relying on forbidden transitions, which takes a significant amount of initiator. Furthermore, most conventional photoinitiators require UV light. There is a need in the art for new and improved photoinitiators.

SUMMARY

Provided is a composition comprising compound of Formula I:

Formula I

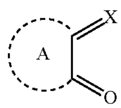

wherein dashed lines indicate optional bonds; A is aryl, heterocyclic, carbocyclic, alkenyl, alkenyl, alkynyl, or alkyl; and X is O, S, NH, Ge, NC(O)—O—$R^C$, N—O—C(O)$R^C$, or NO—$R^C$, where $R^C$ is alkyl, aryl, or heteroaryl; provided, however, that the compound is not isatin. Also provided are salts, stereoisomers, racemates, solvates, hydrates, and polymorphs thereof. The dashline component can also be derived from biomass.

Further provided herein is a composition comprising a compound of Formula II:

Formula II

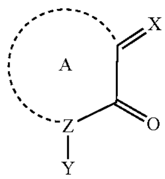

wherein dashed lines indicate optional bonds; A is aryl, heterocyclic, carbocyclic, alkenyl, alkenyl, alkynyl, or alkyl; X is O, S, NH, Ge, NC(O)—O—$R^C$, N—O—C(O)$R^C$, or NO—$R^C$, wherein $R^C$ is alkyl, aryl, or heteroaryl; and Z is N, O, or S; provided, however, that the compound is not isatin. Also provided are salts, stereoisomers, racemates, solvates, hydrates, and polymorphs thereof. The dashline component can also be derived from biomass.

Further provided is a composition comprising a compound of Formula III:

Formula III

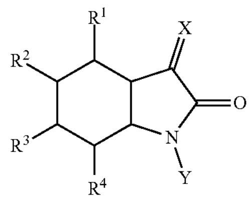

wherein X is O, S, NH, Ge, NC(O)—O—$R^C$, N—O—C(O) $R^C$, or NO—$R^C$, wherein $R^C$ is alkyl, aryl, or heteroaryl; and substituents $R^1$, $R^2$, $R^3$, $R^4$, and Y can be any combination of H, alkyl, alkene, alkynes, aryl, heterocyclic, alkenyl halides, unsaturated enones, unsaturated ketones, unsaturated amides, unsaturated alcohols, unsaturated amines, unsaturated thiols, phosphonates, carboxylates, sulfonates, nitriles, thioethers, thioamides, thioketones, azides, sulfides, disulfides, ethers, epoxides, nitrates, nitrites, nitro compounds, nitroso compounds, alkyl ketoesters, acylgermanes, metallocenes, organosilanes, oximes, imides, cyanates, isocyanates, thiocyanates, isothiocyanates, sulfoxides, sulfones, sulfites, phosphites, thial, phosphines, and aldehydes; provided, however, that the compound is not isatin. Also provided are salts, stereoisomers, racemates, solvates, hydrates, and polymorphs thereof.

Further provided is a composition comprising formula A:

Formula A

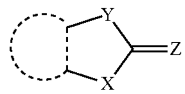

where dashed lines represent a linker that can be an alkyl chain, a carbocycle, a heterocyclic moiety, or a combination of C—C or C-heteroatom bonds, optionally substituted with one or more halogens, that links X to Y; Y is C═O, C—S, $NR^1$, $PR^2$, $PR^1R^2$, S, or Se; X is C═O, C═S, $NR^1$, $P(R^2)_2$, $PR^1R^2$, S, or Se; Z is O, S, or Se; each $R^1$ is, independently, H, alkyl, aryl, aryloxy, alkoxy, or halo-substituted alkoxy, and each $R^2$ is, independently, H, O, alkyl, aryl, aryloxy, alkoxy, N-alkyl, halo-substituted alkoxy, or halo-substituted N-alkyl; provided, however, that at least one of X or Y is C═O; further provided that when the linker is phenyl, neither Y nor X is NH.

In certain embodiments, Y and Z have a cis orientation. In certain embodiments, Y is C═O. In certain embodiments, Z is O. In certain embodiments, X is $NR^1$. In certain embodiments, Y is C═O and X is $NR^1$. In certain embodiments, X is $NR^1$; and $R^1$ is selected from the group consisting of alkyl, aryl, methoxy, phenoxy, and fluoro-substituted methoxy. In certain embodiments, Y is C═O; X is $NR^1$; and $R^1$ is selected from the group consisting of alkyl, aryl, methoxy, phenoxy, and fluoro-substituted methoxy. In certain embodiments, the linker is an aryl group.

In certain embodiments, the composition has formula B:

Formula B

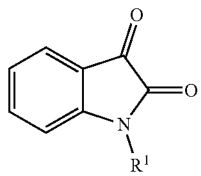

In certain embodiments, the composition comprises N-methyl isatin 3c:

3c

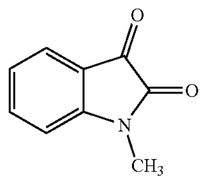

In certain embodiments, the composition comprises N-aryl isatin 3d:

3d

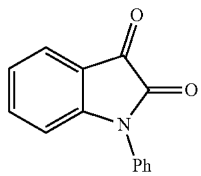

In certain embodiments, the composition comprises N-acetyl isatin 3e:

3e

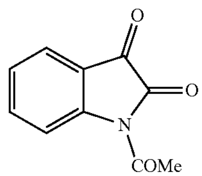

In certain embodiments, the composition comprises N-benzoyl isatin 3f:

3f

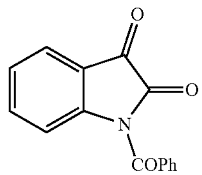

In certain embodiments, the composition comprises N-trifluoromethyl isatin 3g:

3g

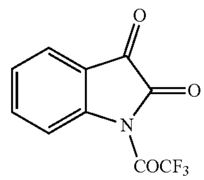

Further provided is a composition comprising a compound of Formula IP-1:

Formula IP-1

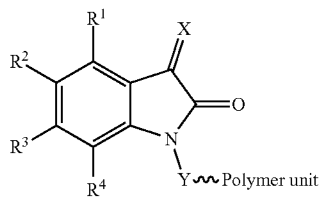

wherein X is O, S, NH, Ge, NC(O)—O—$R^C$, N—O—C(O)$R^C$, or NO—$R^C$, wherein $R^C$ is alkyl, aryl, or heteroaryl; substituents $R^1$, $R^2$, $R^3$, $R^4$, and Y can be any combination of H, alkyl, alkene, alkynes, aryl, heterocyclic, alkenyl halides, unsaturated enones, unsaturated ketones, unsaturated amides, unsaturated alcohols, unsaturated amines, unsaturated thiols, phosphonates, carboxylates, sulfonates, nitriles, thioethers, thioamides, thioketones, azides, sulfides, disulfides, ethers, epoxides, nitrates, nitrites, nitro compounds, nitroso compounds, alkyl ketoesters, acylgermanes, metallocenes, organosilanes, oximes, imides, cyanates, isocyanates, thiocyanates, isothiocyanates, sulfoxides, sulfones, sulfites, phosphites, thial, phosphines, and aldehydes; and the polymer unit is vinyl, stryl, acryl, or a cyclic monomer selected from lactones (cyclic esters), epoxides, lactides, lactams, silicon-containing cyclic monomers, and cyclic carbonates.

In certain embodiments, the compound is compound IP-1a:

IP-1a

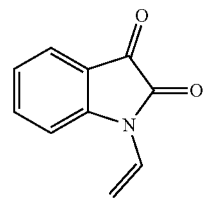

In certain embodiments, the compound is compound IP-1c:

IP-1c

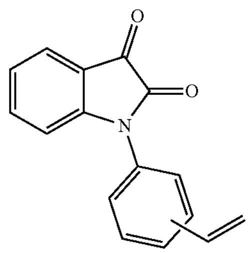

In certain embodiments, the compound is compound IP-1d:

IP-1d

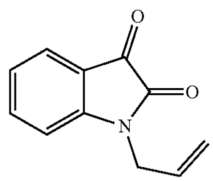

In certain embodiments, the compound is compound IP-1e:

IP-1e

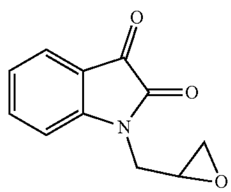

In certain embodiments, the compound is a compound of Formula IP-1b:

Formula IP-1b

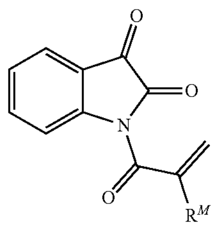

wherein $R^M$ is alkyl, aryl, heteroaryl, alkoxy, carboxy alkyl, or an amide.

In certain embodiments, the compound is compound IP-1f:

IP-1f

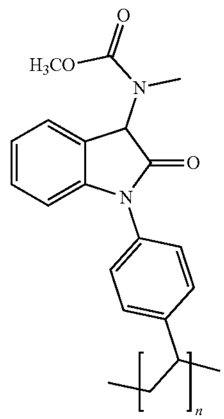

wherein n is an integer.

In certain embodiments, the compound is compound IP-1g:

IP-1g

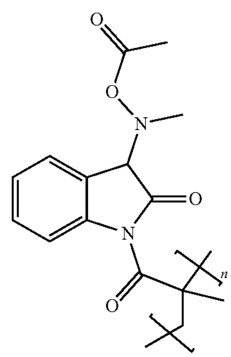

wherein n is an integer.

In certain embodiments, the compound is compound IP-1h:

IP-1h

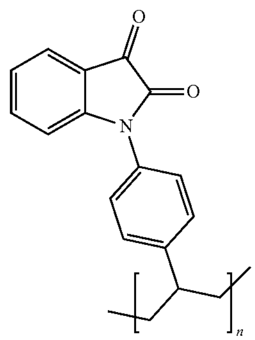

wherein n is an integer.

In certain embodiments, the compound is compound IP-1i:

IP-1i

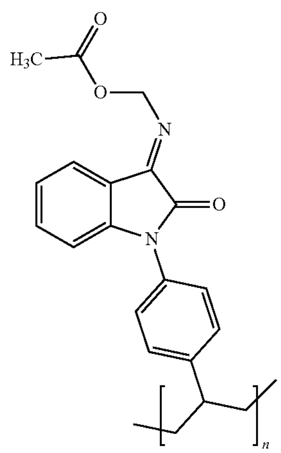

wherein n is an integer.

Further provided is a composition comprising a compound of Formula IP-2:

Formula IP-2

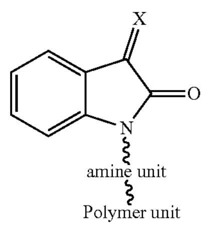

wherein X is O, S, NH, Ge, NC(O)—O—$R^C$, N—O—C(O)$R^C$, or NO—$R^C$, wherein $R^C$ is alkyl, aryl, or heteroaryl; the amine unit is an amine, thiol, or any hydrogen atom donor; and the vinyl, stryl, acryl, or a cyclic monomer selected from lactones (cyclic esters), epoxides, lactides, lactams, silicon-containing cyclic monomers, and cyclic carbonates.

In certain embodiments, the compound is compound IP-2a:

IP-2a

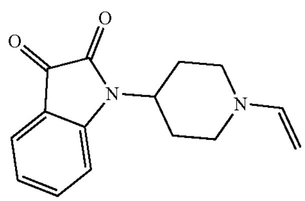

In certain embodiments, the compound is compound IP-2b:

IP-2b

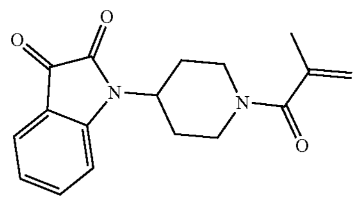

In certain embodiments, the compound is compound IP-2c:

IP-2c

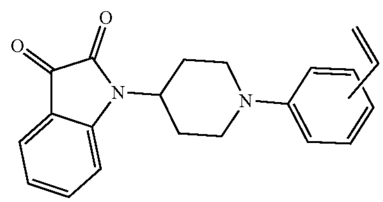

In certain embodiments, the compound is compound IP-2d:

IP-2d

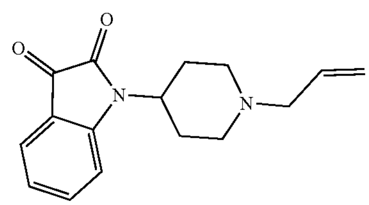

In certain embodiments, the compound is compound IP-2e:

IP-2e

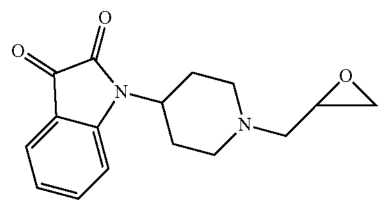

In certain embodiments, the compound is compound IP-2f:

IP-2f

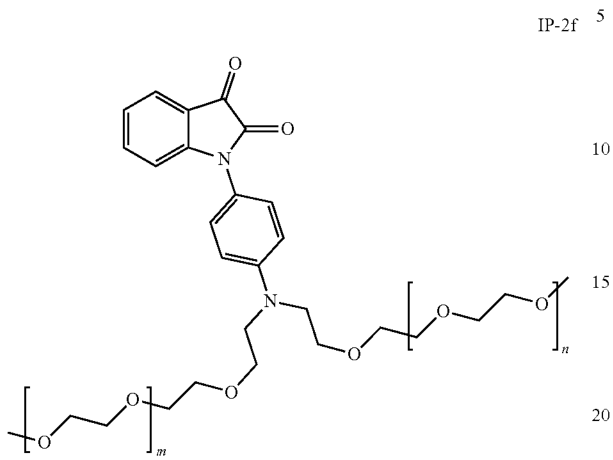

wherein m and n are each integers.

In certain embodiments, the compound is compound IP-2g:

IP-2g

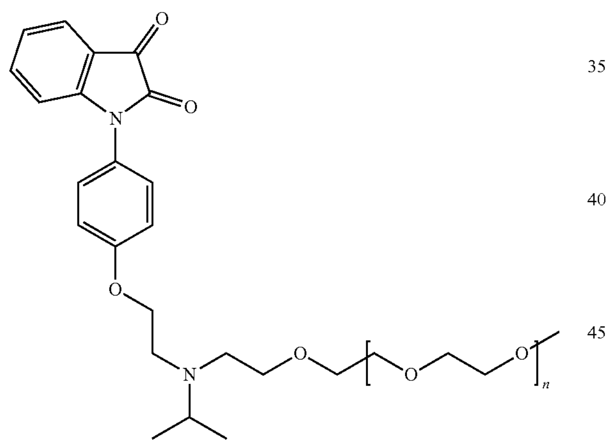

wherein n is an integer.

Further provided is a composition comprising a compound of Formula IP-3:

IP-3

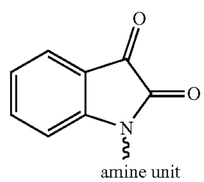

wherein the amine unit can be an amine, thiol, or any hydrogen atom donor.

In certain embodiments, the compound is compound IP-3a:

IP-3a

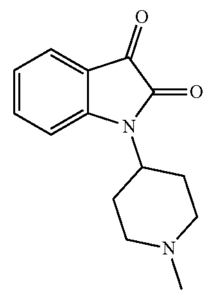

In certain embodiments, the compound is compound IP-3b:

IP-3b

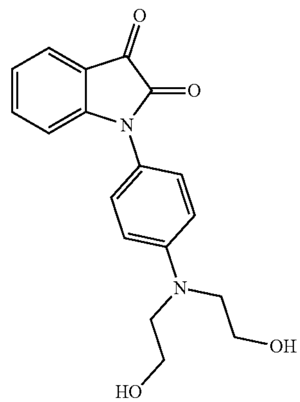

Further provided is a composition comprising a compound of Formula IP-4:

Formula IP-4

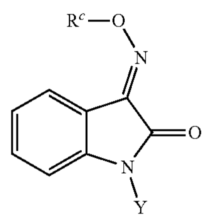

wherein $R^C$ is alkyl, alkenyl, aromatic, carbocyclic, heterocyclic, or carboxy; and Y is selected from H, alkyl, alkene, alkynes, aryl, heterocyclic, alkenyl halides, unsaturated enones, unsaturated ketones, unsaturated amides, unsaturated alcohols, unsaturated amines, unsaturated thiols, phosphonates, carboxylates, sulfonates, nitriles, thioethers, thioamides, thioketones, azides, sulfides, disulfides, ethers, epoxides, nitrates, nitrites, nitro compounds, nitroso compounds, alkyl ketoesters, acylgermanes, metallocenes, organosilanes, oximes, imides, cyanates, isocyanates, thiocyanates, isothiocyanates, sulfoxides, sulfones, sulfites, phosphites, thial, phosphines, and aldehydes.

In certain embodiments, the compound is compound IP-4a:

IP-4a

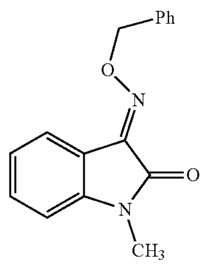

In certain embodiments, the compound is compound IP-4b:

IP-4b

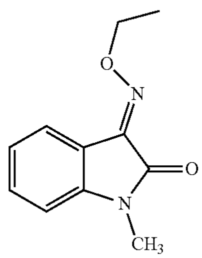

Further provided is a composition comprising a compound of Formula IP-5:

Formula IP-5

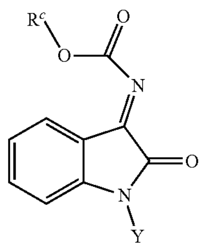

wherein $R^C$ is alkyl, alkenyl, aromatic, carbocyclic, heterocyclic, or carboxy; and Y is selected from H, alkyl, alkene, alkynes, aryl, heterocyclic, alkenyl halides, unsaturated enones, unsaturated ketones, unsaturated amides, unsaturated alcohols, unsaturated amines, unsaturated thiols, phosphonates, carboxylates, sulfonates, nitriles, thioethers, thioamides, thioketones, azides, sulfides, disulfides, ethers, epoxides, nitrates, nitrites, nitro compounds, nitroso compounds, alkyl ketoesters, acylgermanes, metallocenes, organosilanes, oximes, imides, cyanates, isocyanates, thiocyanates, isothiocyanates, sulfoxides, sulfones, sulfites, phosphites, thial, phosphines, and aldehydes.

In certain embodiments, the compound is compound IP-5a:

IP-5a

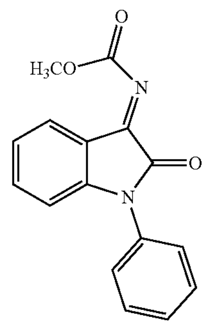

In certain embodiments, the compound is compound IP-5b:

IP-5b

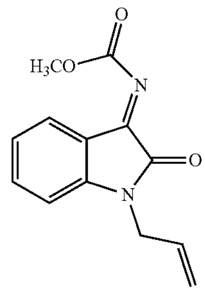

In certain embodiments, the compound is compound IP-5c:

IP-5c

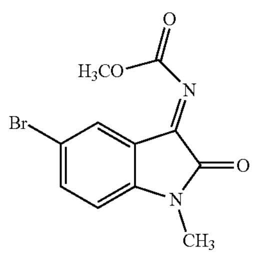

Further provided is a composition comprising a compound of Formula IP-6:

Formula IP-6

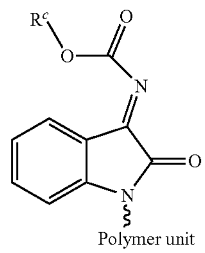

wherein $R^C$ is alkyl, alkenyl, aromatic, carbocyclic, heterocyclic, or carboxy; and the vinyl, stryl, acryl, or a cyclic monomer selected from lactones (cyclic esters), epoxides, lactides, lactams, silicon-containing cyclic monomers, and cyclic carbonates.

In certain embodiments, the compound is compound IP-6a:

IP-6a

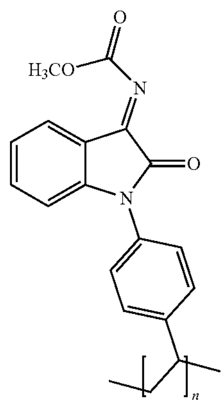

In certain embodiments, the compound is compound IP-6b:

IP-6b

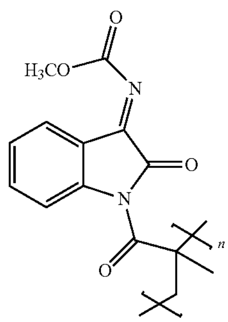

Further provided is a composition comprising a compound of Formula IP-7:

Formula IP-7

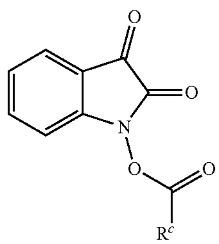

wherein $R^C$ is alkyl, alkenyl, aromatic, carbocyclic, heterocyclic, or carboxy.

In certain embodiments, the compound is compound IP-7a:

IP-7a

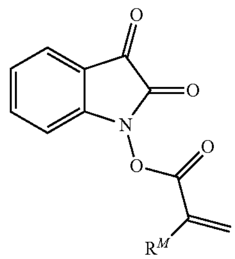

In certain embodiments, the compound is compound IP-7b:

IP-7b

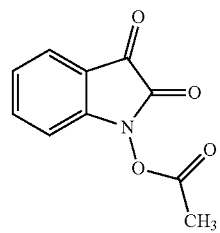

In certain embodiments, the compound is compound IP-7c:

IP-7c

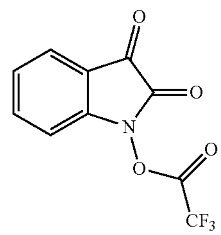

In certain embodiments, the compound is compound IP-7d:

IP-7d

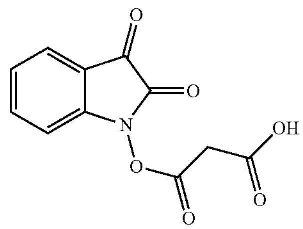

In certain embodiments, the compound is compound IP-7e:

IP-7e

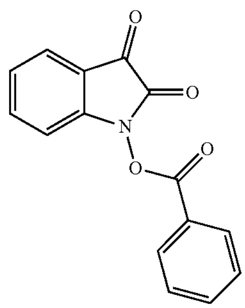

Further provided is a composition comprising a compound of Formula IP-8:

Formula IP-8

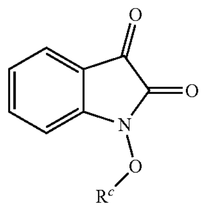

wherein $R^C$ is alkyl, alkenyl, aromatic, carbocyclic, heterocyclic, or carboxy.

In certain embodiments, the compound is compound IP-8a:

IP-8a

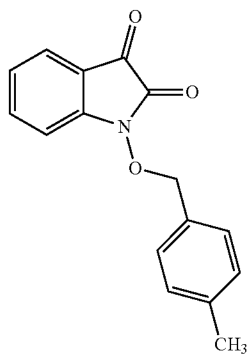

In certain embodiments, the compound is compound IP-8b:

IP-8b

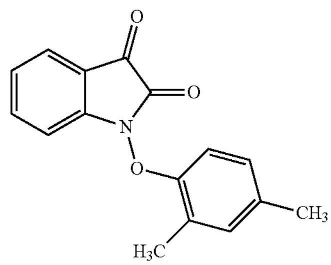

Further provided is a composition comprising a compound of Formula IP-9:

Formula IP-9

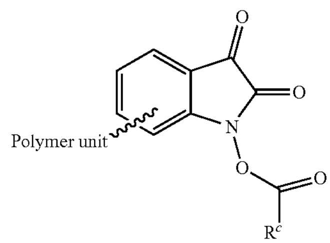

wherein $R^C$ is alkyl, alkenyl, aromatic, carbocyclic, heterocyclic, or carboxy; and the vinyl, stryl, acryl, or a cyclic monomer selected from lactones (cyclic esters), epoxides, lactides, lactams, silicon-containing cyclic monomers, and cyclic carbonates.

In certain embodiments, the compound is compound IP-9a:

IP-9a

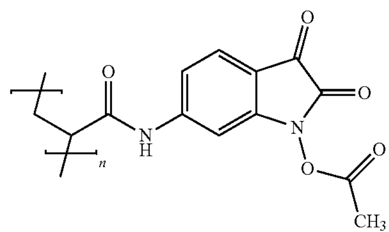

In certain embodiments, the compound is compound IP-9b:

IP-9b

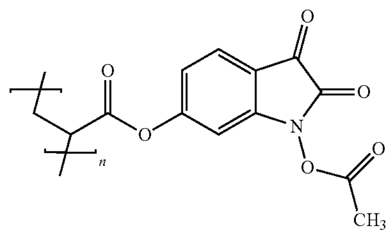

Further provided is a composition comprising a compound of Formula IP-10:

Formula IP-10

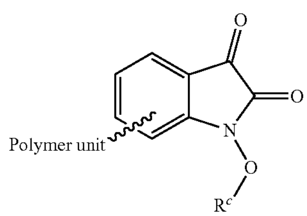

wherein $R^C$ is alkyl, alkenyl, aromatic, carbocyclic, heterocyclic, or carboxy; and the vinyl, stryl, acryl, or a cyclic monomer selected from lactones (cyclic esters), epoxides, lactides, lactams, silicon-containing cyclic monomers, and cyclic carbonates.

In certain embodiments, the compound is compound IP-10a:

IP-10a

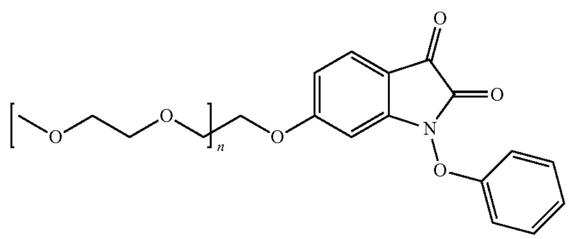

In certain embodiments, the compound is compound IP-10b:

IP-10b

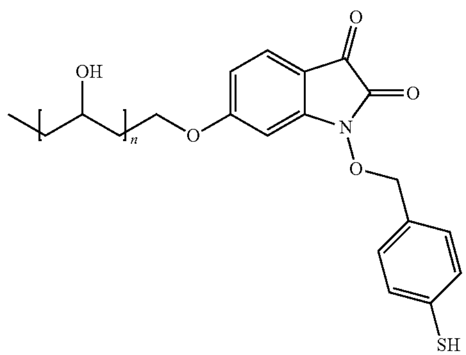

Further provided is a method for making a polymer, the method comprising exposing a photoinitiator and a monomer to light to produce a polymer, wherein the photoinitiator is isatin or an isatin derivative. In certain embodiments, the photoinitiator is isatin. In certain embodiments, the polymer is colorless or transparent.

In certain embodiments, the photoinitiator has Formula I:

Formula I

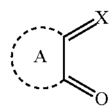

wherein dashed lines indicate optional bonds; A is aryl, heterocyclic, carbocyclic, alkenyl, alkenyl, alkynyl, or alkyl; and X is O, S, NH, Ge, NC(O)—O—$R^C$, N—O—C(O)$R^C$, or NO—$R^C$, where $R^C$ is alkyl, aryl, or heteroaryl.

In certain embodiments, the photoinitiator has Formula II:

Formula II

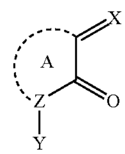

wherein dashed lines indicate optional bonds; A is aryl, heterocyclic, carbocyclic, alkenyl, alkenyl, alkynyl, or alkyl; X is O, S, NH, Ge, NC(O)—O—$R^C$, N—O—C(O)$R^C$, or NO—$R^C$, wherein $R^C$ is alkyl, aryl, or heteroaryl; and Z is N, O, or S.

In certain embodiments, the photoinitiator has Formula III:

Formula III

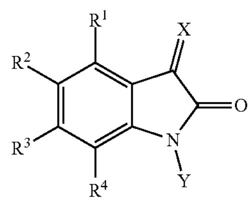

wherein X is O, S, NH, Ge, NC(O)—O—$R^C$, N—O—C(O) $R^C$, or NO—$R^C$, wherein $R^C$ is alkyl, aryl, or heteroaryl; and substituents $R^1$, $R^2$, $R^3$, $R^4$, and Y can be any combination of H, alkyl, alkene, alkynes, aryl, heterocyclic, alkenyl halides, unsaturated enones, unsaturated ketones, unsaturated amides, unsaturated alcohols, unsaturated amines, unsaturated thiols, phosphonates, carboxylates, sulfonates, nitriles, thioethers, thioamides, thioketones, azides, sulfides, disulfides, ethers, epoxides, nitrates, nitrites, nitro compounds, nitroso compounds, alkyl ketoesters, acylgermanes, metallocenes, organosilanes, oximes, imides, cyanates, isocyanates, thiocyanates, isothiocyanates, sulfoxides, sulfones, sulfites, phosphites, thial, phosphines, and aldehydes.

In certain embodiments, the photoinitiator has Formula A:

Formula A

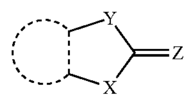

where dashed lines represent a linker that can be an alkyl chain, a carbocycle, a heterocyclic moiety, or a combination of C—C or C-heteroatom bonds, optionally substituted with one or more halogens, that links X to Y; Y is C═O, C═S, $NR^1$, $P(R^2)_2$, $PR^1R^2$, S, or Se; X is C═O, C═S, $NR^1$, $P(R^2)_2$, $PR^1R^2$, S, or Se; Z is O, S, or Se; each $R^1$ is, independently, H, alkyl, aryl, aryloxy, alkoxy, or halo-substituted alkoxy, and each $R^2$ is, independently, H, O, alkyl, aryl, aryloxy, alkoxy, N-alkyl, halo-substituted alkoxy, or halo-substituted N-alkyl; provided, however, that at least one of X or Y is C—O, and X and Z have a cis orientation. In particular embodiments, Y is C═O. In particular embodiments, Z is O. In particular embodiments, X is $NR^1$. In particular embodiments, Y is C—O and X is $NR^1$. In particular embodiments, X is $NR^1$; and $R^1$ is selected from the group consisting of alkyl, aryl, methoxy, phenoxy, and fluoro-substituted methoxy. In particular embodiments, Y is C═O; X is $NR^1$; and $R^1$ is selected from the group consisting of alkyl, aryl, methoxy, phenoxy, and fluoro-substituted methoxy. In particular embodiments, the linker is an aryl group.

In particular embodiments, the photoinitiator has formula B:

Formula B

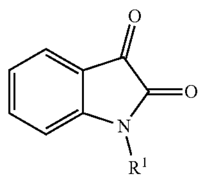

In certain embodiments, the photoinitiator comprises isatin 3a:

3a

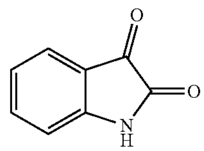

In certain embodiments, the photoinitiator comprises N-methyl isatin 3c:

3c

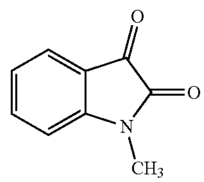

In certain embodiments, the photoinitiator comprises N-aryl isatin 3d:

3d

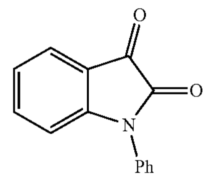

In certain embodiments, the photoinitiator comprises N-acetyl isatin 3e:

3e

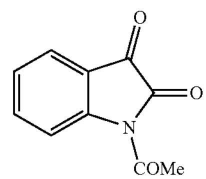

In certain embodiments, the photoinitiator comprises N-benzoyl isatin 3f:

3f

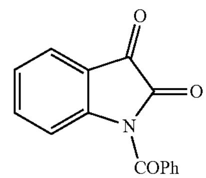

In certain embodiments, the photoinitiator comprises N-trifluoromethyl isatin 3g:

3g

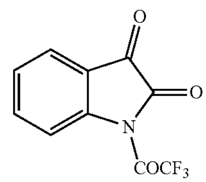

In certain embodiments, the photoinitiator is prepared from biomass. In certain embodiments, the light is visible light. In certain embodiments, the light is purple light. In certain embodiments, the light is blue light. In certain embodiments, the light is green light.

In certain embodiments, the monomer is methylmethacrylate 4:

4

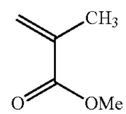

In particular embodiments, the polymer is polymer 5:

5

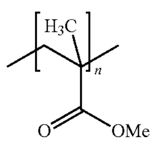

where n is an integer.

In certain embodiments, the monomer is furfuryl dimethacrylate monomer 6:

6

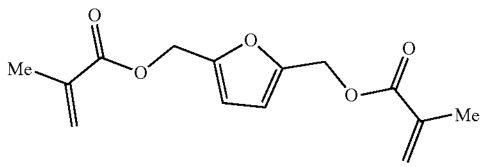

In certain embodiments, the monomer is dimethylmethacrylate monomer 8:

8

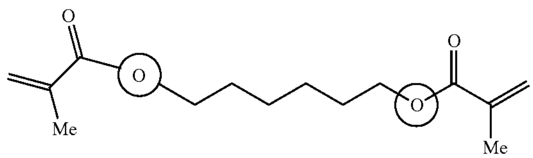

In certain embodiments, the photoinitiator is a compound of Formula IP-1:

Formula IP-1

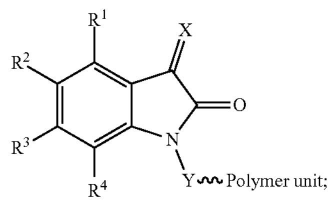

wherein X is O, S, NH, Ge, NC(O)—O—$R^C$, N—O—C(O)$R^C$, or NO—$R^C$, wherein $R^C$ is alkyl, aryl, or heteroaryl; substituents $R^1$, $R^2$, $R^3$, $R^4$, and Y can be any combination of H, alkyl, alkene, alkynes, aryl, heterocyclic, alkenyl halides, unsaturated enones, unsaturated ketones, unsaturated amides, unsaturated alcohols, unsaturated amines, unsaturated thiols, phosphonates, carboxylates, sulfonates, nitriles, thioethers, thioamides, thioketones, azides, sulfides, disulfides, ethers, epoxides, nitrates, nitrites, nitro compounds, nitroso compounds, alkyl ketoesters, acylgermanes, metallocenes, organosilanes, oximes, imides, cyanates, isocyanates, thiocyanates, isothiocyanates, sulfoxides, sulfones, sulfites, phosphites, thial, phosphines, and aldehydes; and the vinyl, stryl, acryl, or a cyclic monomer selected from lactones (cyclic esters), epoxides, lactides, lactams, silicon-containing cyclic monomers, and cyclic carbonates.

In certain embodiments, the photoinitiator is compound IP-1a:

IP-1a

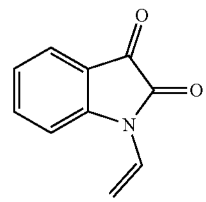

In certain embodiments, the photoinitiator is compound IP-1c:

IP-1c

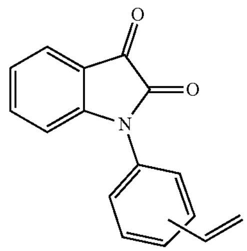

In certain embodiments, the photoinitiator is compound IP-1d:

IP-1d

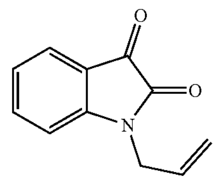

In certain embodiments, the photoinitiator is compound IP-1e:

IP-1e

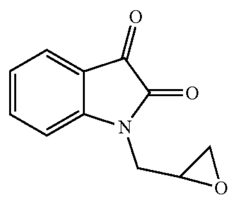

In certain embodiments, the photoinitiator is a compound of Formula IP-1b:

Formula IP-1b

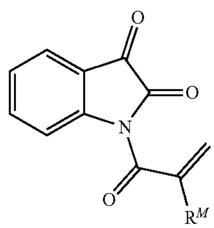

wherein $R^M$ is alkyl, aryl, heteroaryl, alkoxy, carboxy alkyl, or an amide.

In certain embodiments, the photoinitiator is compound IP-1f:

IP-1f

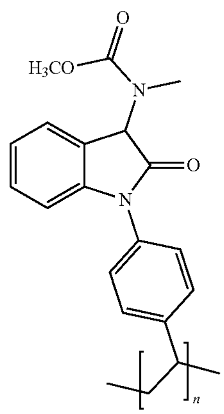

wherein n is an integer.

In certain embodiments, the photoinitiator is compound IP-1g:

IP-1g

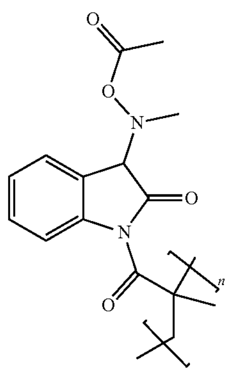

wherein n is an integer.

In certain embodiments, wherein the photoinitiator is compound IP-1h:

IP-1h

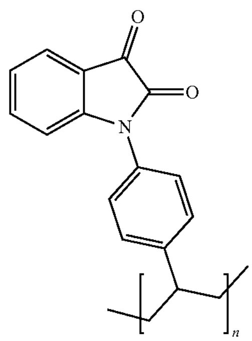

wherein n is an integer.

In certain embodiments, the photoinitiator is compound IP-1i:

IP-1i

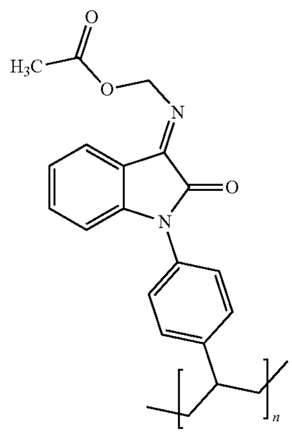

wherein n is an integer.

In certain embodiments, the photoinitiator is a compound of Formula IP-2:

Formula IP-2

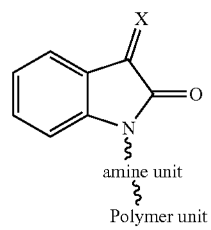

wherein X is O, S, NH, Ge, NC(O)—O—$R^C$, N—O—C(O) $R^C$, or NO—$R^C$, wherein $R^C$ is alkyl, aryl, or heteroaryl; the amine unit is an amine, thiol, or any hydrogen atom donor; and the vinyl, styl, acryl, or a cyclic monomer selected from lactones (cyclic esters), epoxides, lactides, lactams, silicon-containing cyclic monomers, and cyclic carbonates.

In certain embodiments, the photoinitiator is compound IP-2a:

IP-2a

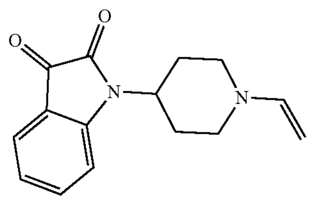

In certain embodiments, the photoinitiator is compound IP-2b:

IP-2b

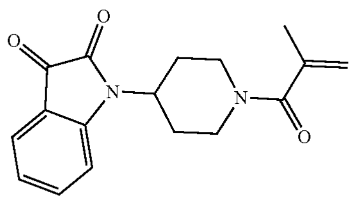

In certain embodiments, the photoinitiator is compound IP-2c:

IP-2c

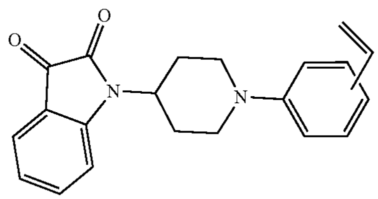

In certain embodiments, the photoinitiator is compound IP-2d:

IP-2d

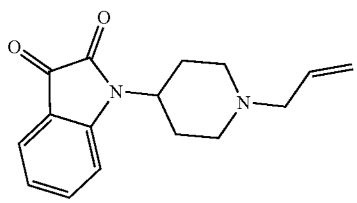

In certain embodiments, the photoinitiator is compound IP-2e:

IP-2e

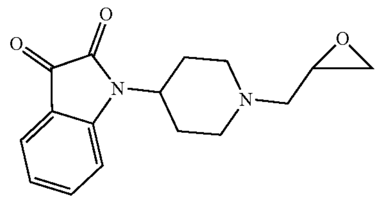

In certain embodiments, the photoinitiator is compound IP-2f:

IP-2f

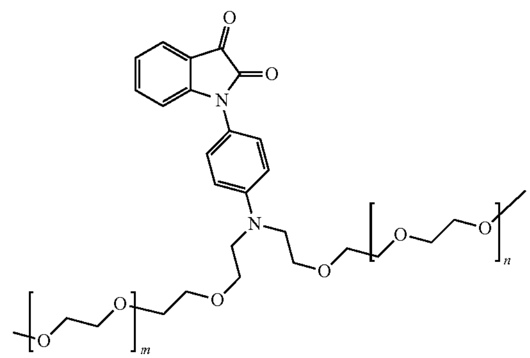

wherein m and n are each integers.

In certain embodiments, the photoinitiator is compound IP-2g:

IP-2g

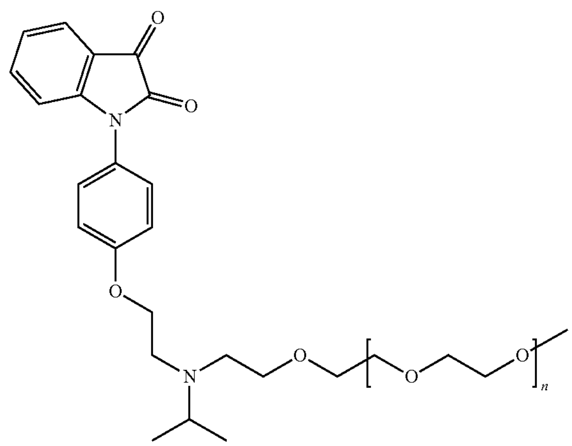

wherein n is an integer.

In certain embodiments, the photoinitiator is a compound of Formula IP-3:

IP-3

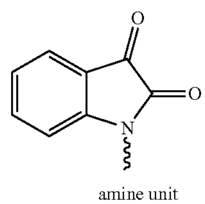

wherein the amine unit can be an amine, thiol, or any hydrogen atom donor.

In certain embodiments, the photoinitiator is compound IP-3a:

IP-3a

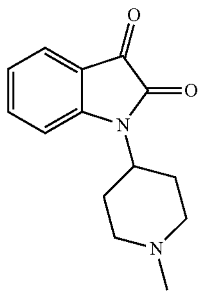

In certain embodiments, the photoinitiator is compound IP-3b:

IP-3b

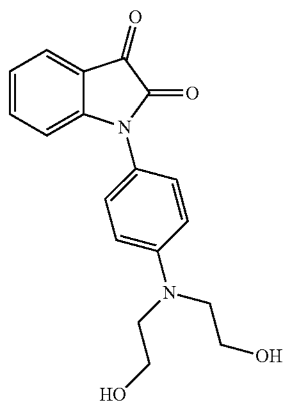

In certain embodiments, the photoinitiator is a compound of Formula IP-4:

Formula IP-4

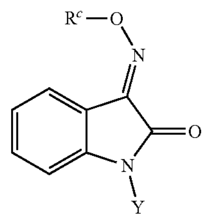

wherein $R^C$ is alkyl, alkenyl, aromatic, carbocyclic, heterocyclic, or carboxy; and Y is selected from H, alkyl, alkene, alkynes, aryl, heterocyclic, alkenyl halides, unsaturated enones, unsaturated ketones, unsaturated amides, unsaturated alcohols, unsaturated amines, unsaturated thiols, phosphonates, carboxylates, sulfonates, nitriles, thioethers, thioamides, thioketones, azides, sulfides, disulfides, ethers, epoxides, nitrates, nitrites, nitro compounds, nitroso compounds, alkyl ketoesters, acylgermanes, metallocenes, organosilanes, oximes, imides, cyanates, isocyanates, thiocyanates, isothiocyanates, sulfoxides, sulfones, sulfites, phosphites, thial, phosphines, and aldehydes.

In certain embodiments, the photoinitiator is compound IP-4a:

IP-4a

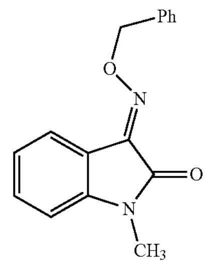

In certain embodiments, the photoinitiator is compound IP-4b:

IP-4b

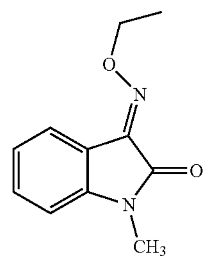

In certain embodiments, the photoinitiator is a compound of Formula IP-5:

Formula IP-5

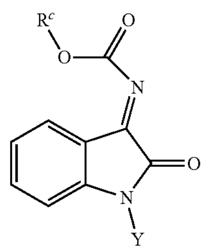

wherein $R^C$ is alkyl, alkenyl, aromatic, carbocyclic, heterocyclic, or carboxy; and Y is selected from H, alkyl, alkene, alkynes, aryl, heterocyclic, alkenyl halides, unsaturated enones, unsaturated ketones, unsaturated amides, unsaturated alcohols, unsaturated amines, unsaturated thiols, phosphonates, carboxylates, sulfonates, nitriles, thioethers, thioamides, thioketones, azides, sulfides, disulfides, ethers, epoxides, nitrates, nitrites, nitro compounds, nitroso compounds, alkyl ketoesters, acylgermanes, metallocenes, organosilanes, oximes, imides, cyanates, isocyanates, thiocyanates, isothiocyanates, sulfoxides, sulfones, sulfites, phosphites, thial, phosphines, and aldehydes.

In certain embodiments, the photoinitiator is compound IP-5a:

IP-5a

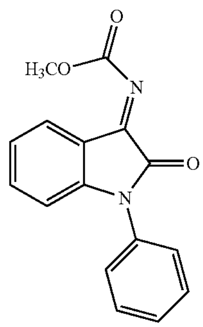

In certain embodiments, the photoinitiator is compound IP-5b:

IP-5b

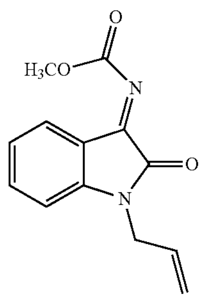

In certain embodiments, the photoinitiator is compound IP-5c:

IP-5c

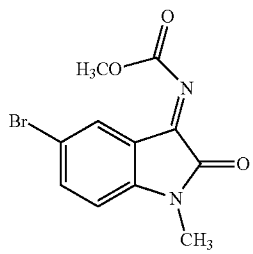

In certain embodiments, the photoinitiator is a compound of Formula IP-6:

Formula IP-6

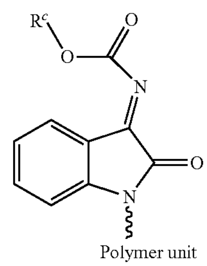

wherein $R^C$ is alkyl, alkenyl, aromatic, carbocyclic, heterocyclic, or carboxy; and the polymer unit is vinyl, stryl, acryl, or a cyclic monomer selected from lactones (cyclic esters), epoxides, lactides, lactams, silicon-containing cyclic monomers, and cyclic carbonates.

In certain embodiments, the photoinitiator is compound IP-6a:

IP-6a

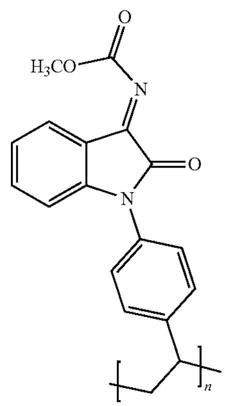

In certain embodiments, the photoinitiator is compound IP-6b:

IP-6b

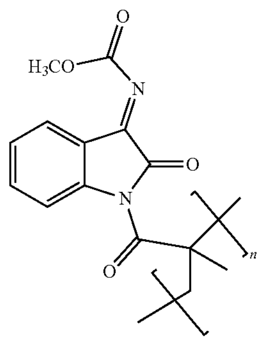

In certain embodiments, the photoinitiator is a compound of Formula IP-7:

Formula IP-7

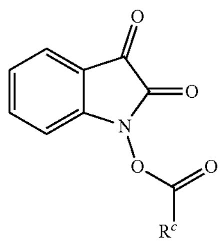

wherein $R^C$ is alkyl, alkenyl, aromatic, carbocyclic, heterocyclic, or carboxy.

In certain embodiments, the photoinitiator is compound IP-7a:

IP-7a

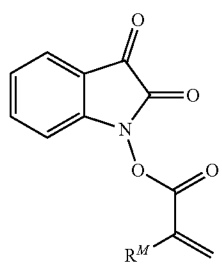

In certain embodiments, the photoinitiator is compound IP-7b:

IP-7b

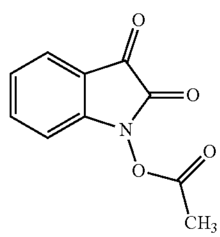

In certain embodiments, the photoinitiator is compound IP-7c:

IP-7c

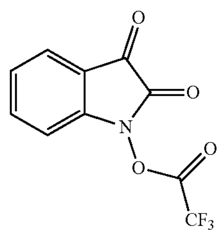

In certain embodiments, the photoinitiator is compound IP-7d:

IP-7d

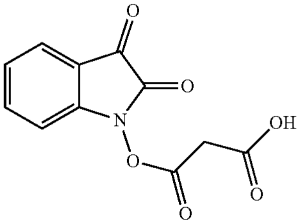

In certain embodiments, the photoinitiator is compound IP-7e:

IP-7e

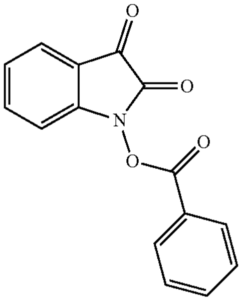

In certain embodiments, the photoinitiator is a compound of Formula IP-8:

Formula IP-8

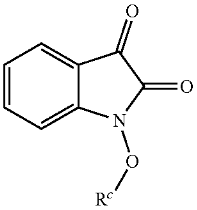

wherein $R^C$ is alkyl, alkenyl, aromatic, carbocyclic, heterocyclic, or carboxy.

In certain embodiments, the photoinitiator is compound IP-8a:

IP-8a

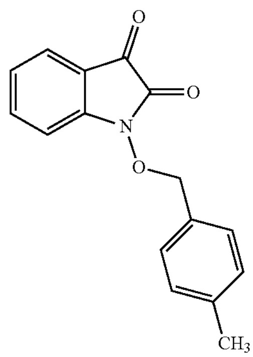

In certain embodiments, the photoinitiator is compound IP-8b:

IP-8b

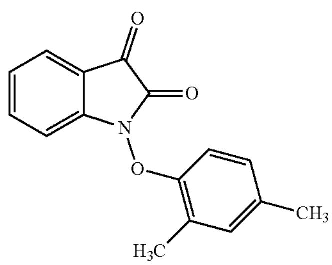

In certain embodiments, the photoinitiator is a compound of Formula IP-9:

Formula IP-9

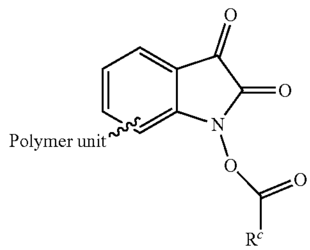

wherein $R^C$ is alkyl, alkenyl, aromatic, carbocyclic, heterocyclic, or carboxy; and the polymer unit is vinyl, stryl, acryl, or a cyclic monomer selected from lactones (cyclic esters), epoxides, lactides, lactams, silicon-containing cyclic monomers, and cyclic carbonates.

In certain embodiments, the photoinitiator is compound IP-9a:

IP-9a

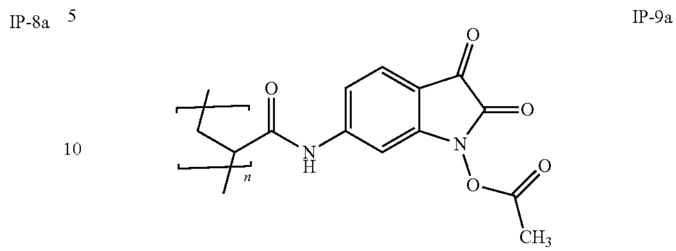

In certain embodiments, the photoinitiator is compound IP-9b:

IP-9b

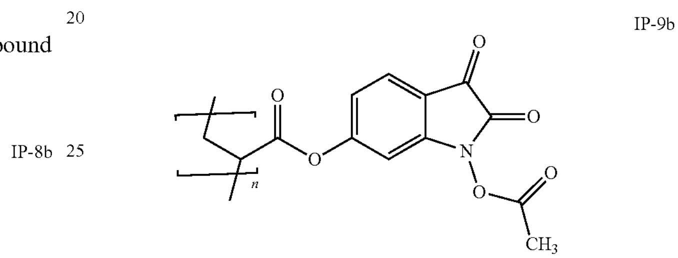

In certain embodiments, wherein the photoinitiator is a compound of Formula IP-10:

Formula IP-10

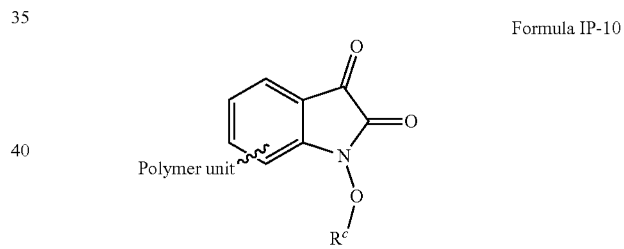

wherein $R^C$ is alkyl, alkenyl, aromatic, carbocyclic, heterocyclic, or carboxy; and polymer unit is vinyl, stryl, acryl, or a cyclic monomer selected from lactones (cyclic esters), epoxides, lactides, lactams, silicon-containing cyclic monomers, and cyclic carbonates.

In certain embodiments, the photoinitiator is compound IP-10a:

IP-10a

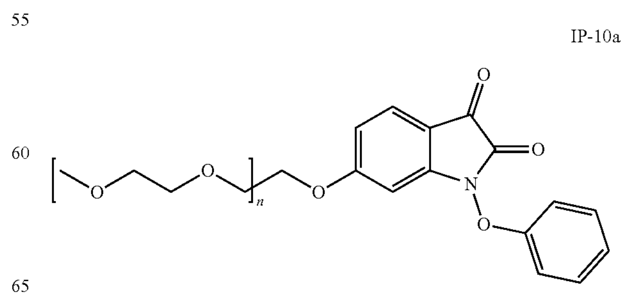

In certain embodiments, the photoinitiator is compound IP-10b:

IP-10b

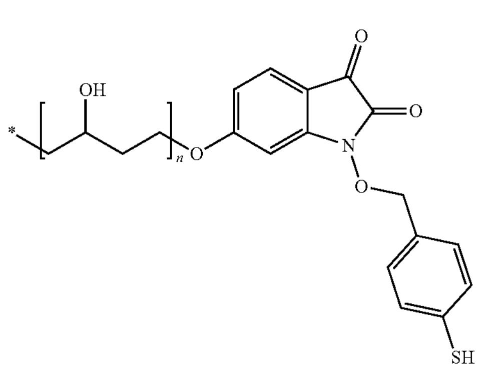

In certain embodiments, a co-initiator is exposed to the light with the photoinitiator and the monomer. In particular embodiments, the co-initiator comprises O-xylene, triethanol amine, 1,4-diazabicyclo[2.2.2]octane, or phenol.

In certain embodiments, the photoinitiator and the monomer are in a solvent. In particular embodiments, the solvent comprises o-xylene, MeCN, toluene, or a combination thereof.

In certain embodiments, the light is a 50 mW light.

In certain embodiments, the polymer is used to make a dental composite, to prepare a bone substitute material, or for bio-reconstruction.

Further provided is a kit for making a polymer, the kit comprising a first container housing a monomer, and a second container housing isatin or an isatin derivative.

Further provided is a photoinitiator comprising an isatin derivative capable of initiating a polymerization of a monomer into a transparent polymer upon exposure to visible light.

Further provided is the use of isatin or an isatin derivative as a photoinitiator. Further provided is the use of isatin or an isatin derivative as a photoinitiator for manufacturing parts for transportation, composites, electronics, or construction.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

α-Diketone derivatives play a prominent role in many of the industrial and medical/dental processes that are initiated by light. One of the reasons the a-diketones are unique photochemical chromophores is they possess low lying triplet states. A distinguishable feature of these chromophores is that some of their derivatives (e.g., biacetyl derivatives) display room temperature phosphorescence. An important feature that has a significant impact on the photophysical characteristic of the a-diketone chromophore is the orientation of the carbonyl group, i.e., s-cis and s-trans isomers of the dicarbonyl system. The versatility of the a-diketone chromophore has enabled its use in polymer curing as well as in dental curing. In spite of its vast impact in the field of material science, a-diketone derivatives that can be fine-tuned in the visible region for initiation polymerization reaction are currently very limited. The present disclosure describes the development of a-diketone derivative chromophores and the utilization of these compounds as photoinitiators. The a-diketones-based chromophores are amenable to visible light illumination and can be easily accessed synthetically, even from bio-sources, in one or two steps, with superior photochemical and photophysical properties.

Figure 1:
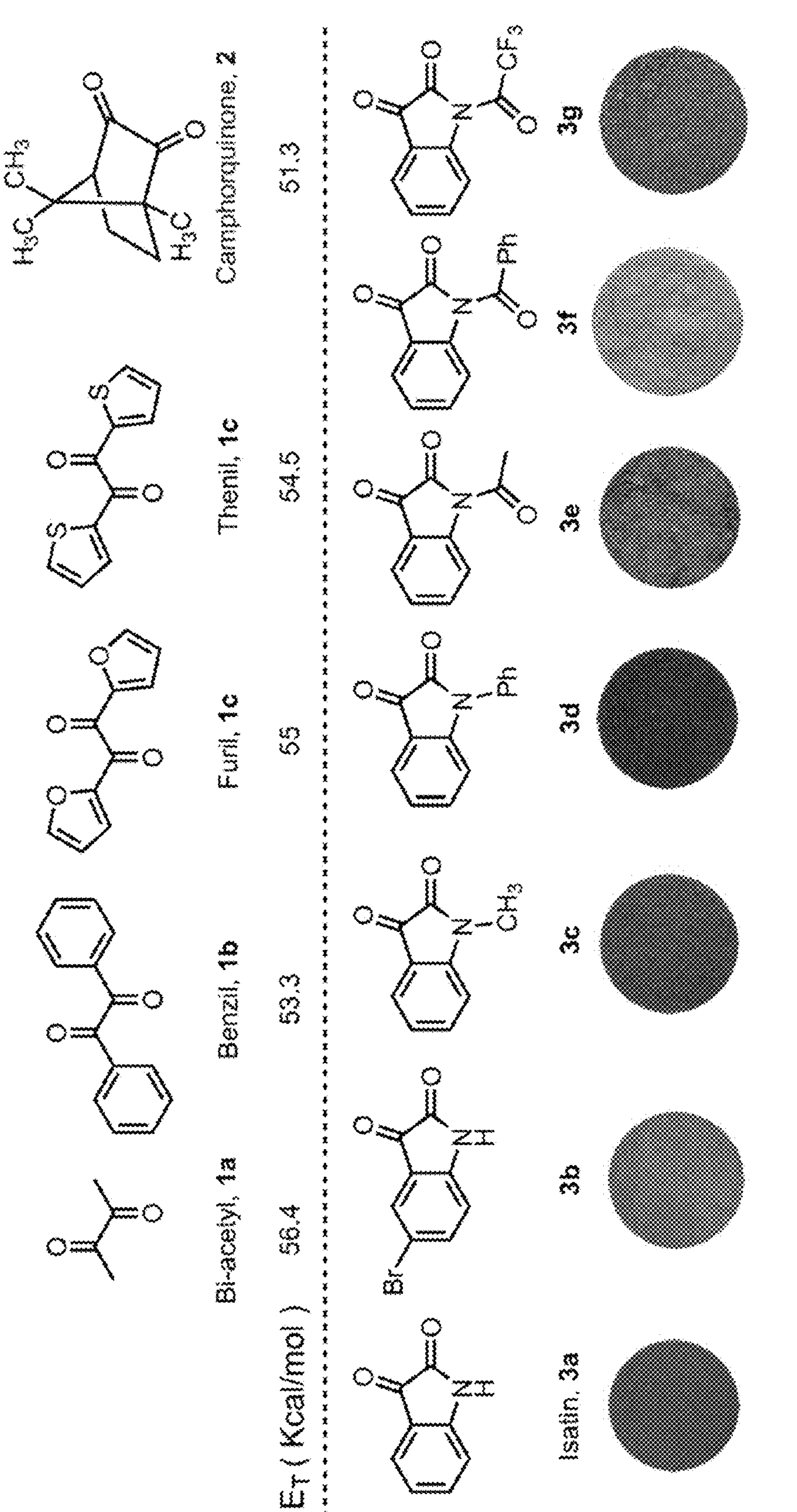
FIG. 1: α-Diketone derivatives-skeletons with photoinitiator abilities. The colors of the isatin derivatives 3a-3g are shown below each structure.

Inspection of the a-diketone chromophores shown in FIG. 1 brings about the realization that the s-cis orientation of the a-diketone is important for enhanced absorptivity in the visible region. As described in the examples herein, isatin derivatives were analyzed, as they not only feature an s-cis oriented a-carbonyl functionality, but also have a strong absorption in the visible region. Isatin has not previously been shown to be a photoinitiator (either as a type I or type II photoinitiator). However, as shown herein, the enhanced absorptivity in the visible light region by isatin and isatin derivatives, and their excepted low-lying triplet excited state, enable their use as visible light photoinitiators for conventional photoinitiated polymerization, 3D printing, dental curing, and a wide range of other applications.

Figure 3:
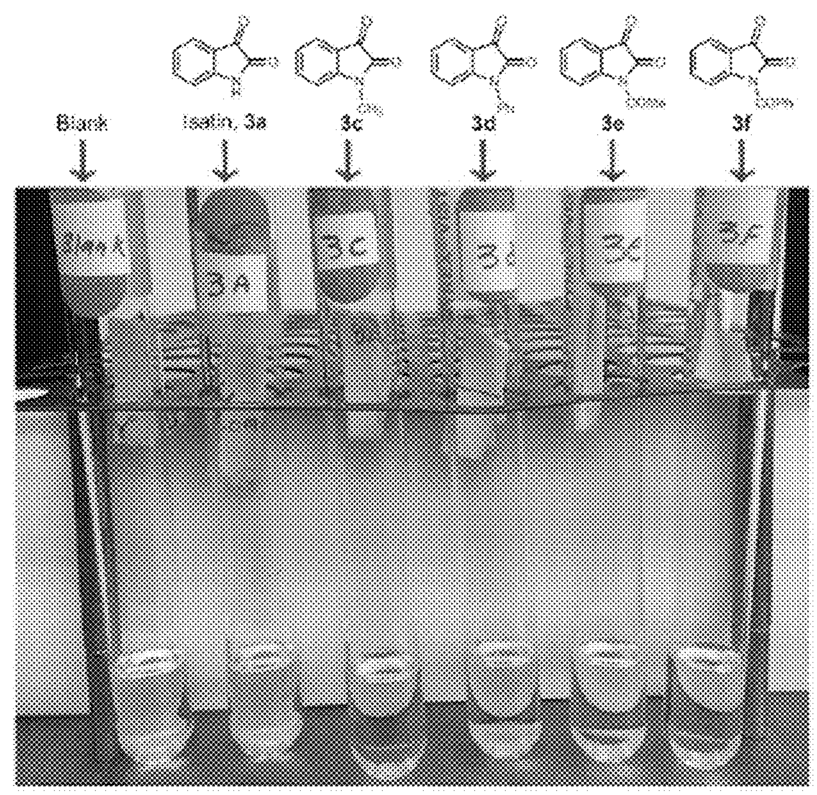
FIG. 3: Photographs showing the photopolymerization of methylmethacrylate 4 with various isatin derivatives using a blue LED.
Figure 3:
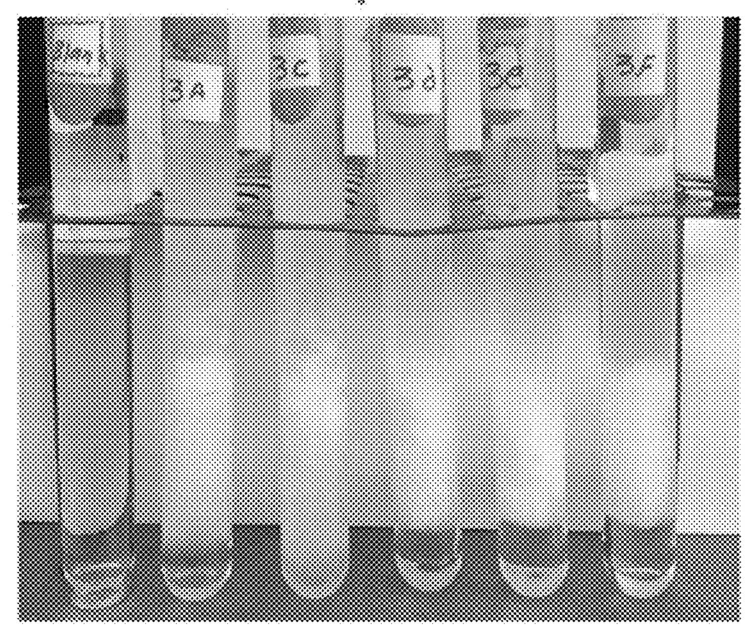

Isatin belongs to the family of plant-derived compounds called tribulins, featuring an indole core that was first isolated in 1840 by Otto Linné Erdman and Auguste Laurent by oxidation of indigo dyes. As a natural product with bright orange color, isatin is found in many natural products (e.g., in Brazil nut trees). In spite of featuring bright colors, the photochemistry and photophysical features of isatin have not been well explored. In accordance with the present disclosure, due to the presence of dicarbonyl functionality, isatin and isatin derivatives can be tailored to be highly efficient photoinitiators (PI) with excellent absorptivity in the visible region (FIG. 3). To demonstrate this, a family of isatin derivates 3a-3g was synthesized (in a single step) and evaluated as photoinitiators (FIG. 1). Based on photophysical studies, it is revealed in the examples herein that isatins can be employed as highly efficient photoinitiators at work under visible light illumination.

In general, the isatin derivatives described herein may have the following Formula I:

Formula I

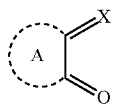

where dashed lines indicate optional bonds; A is aryl, heterocyclic, carbocyclic, alkenyl, alkenyl, alkynyl, or alkyl; and X is O, S, NH, Ge, NC(O)—O—$R^C$, N—O—C(O)$R^C$, or NO—$R^C$, where $R^C$ is alkyl, aryl, or heteroaryl.

The isatin derivatives may have the following Formula II:

Formula II

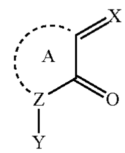

where dashed lines indicate optional bonds; A is aryl, heterocyclic, carbocyclic, alkenyl, alkenyl, alkynyl, or alkyl; X is O, S, NH, Ge, NC(O)—O—$R^C$, N—O—C(O)$R^C$, or NO—$R^C$, where $R^C$ is alkyl, aryl, or heteroaryl; and Z is N, O, or S.

The isatin derivatives may have the following Formula III:

Formula III

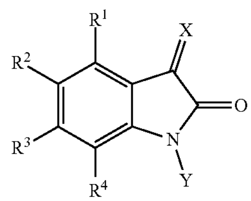

where X is O, S, NH, Ge, NC(O)—O—$R^C$, N—O—C(O)$R^C$, or NO—$R^C$, where $R^C$ is alkyl, aryl, or heteroaryl; and substituents $R^1$, $R^2$, $R^3$, $R^4$, and Y can be any combination of H, alkyl, alkene, alkynes, aryl, heterocyclic, alkenyl halides, unsaturated enones, unsaturated ketones, unsaturated amides, unsaturated alcohols, unsaturated amines, unsaturated thiols, phosphonates, carboxylates, sulfonates, nitriles, thioethers, thioamides, thioketones, azides, sulfides, disulfides, ethers, epoxides, nitrates, nitrites, nitro compounds, nitroso compounds, alkyl ketoesters, acylgermanes, metallocenes, organosilanes, oximes, imides, cyanates, isocyanates, thiocyanates, isothiocyanates, sulfoxides, sulfones, sulfites, phosphites, thial, phosphines, and aldehydes.

As shown in the examples herein, the isatin derivatives may include compounds having Formula A:

Formula A

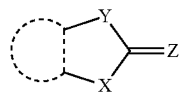

where dashed lines represent a linker that can be an alkyl chain, a carbocycle, a heterocyclic moiety, or a combination of C—C or C-heteroatom bonds, optionally substituted with one or more halogens, that links X to Y; Y is C═O, C═S, $NR^1$, $P(R^2)_2$, $PR^1R^2$, S, or Se; X is C═O, C═S, $NR^1$, $P(R^2)_2$, $PR^1R^2$, S, or Se; Z is O, S, or Se; each $R^1$ is, independently, H, alkyl, aryl, aryloxy, alkoxy, or halo-substituted alkoxy, and each $R^2$ is, independently, H, O, alkyl, aryl, aryloxy, alkoxy, N-alkyl, halo-substituted alkoxy, or halo-substituted N-alkyl; provided that at least one of X or Y is C═O. For efficient use as photoinitiators, X and Z should have a cis orientation. Cis carbonyls absorb in the visible range, whereas trans carbonyls do not absorb in the visible range. In some embodiments, the isatin derivatives have formula B:

Formula B

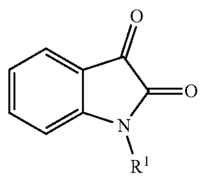

where $R^1$ is the same $R^1$ as described above, namely, H, alkyl, aryl, aryloxy, alkoxy, or halo-substituted alkoxy. In particular embodiments, $R^1$ is selected from the group consisting of alkyl, aryl, methoxy, phenoxy, and fluoro-substituted methoxy. Non-limiting example isatin derivatives include the isatin derivatives 3b-3g shown in FIG. 5.

The isatin derivatives may also include isatins immobilized on polymer supports, such as in Formula IP-1:

Formula IP-1

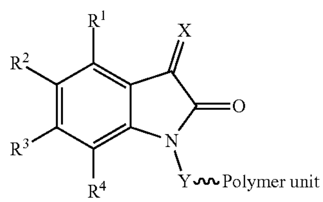

where X is O, S, NH, Ge, NC(O)—O—$R^C$, N—O—C(O)$R^C$, or NO—$R^C$, where $R^C$ is alkyl, aryl, or heteroaryl; substituents $R^1$, $R^2$, $R^3$, $R^4$, and Y can be any combination of H, alkyl, alkene, alkynes, aryl, heterocyclic, alkenyl halides, unsaturated enones, unsaturated ketones, unsaturated amides, unsaturated alcohols, unsaturated amines, unsaturated thiols, phosphonates, carboxylates, sulfonates, nitriles, thioethers, thioamides, thioketones, azides, sulfides, disulfides, ethers, epoxides, nitrates, nitrites, nitro compounds, nitroso compounds, alkyl ketoesters, acylgermanes, metallocenes, organosilanes, oximes, imides, cyanates, isocyanates, thiocyanates, isothiocyanates, sulfoxides, sulfones, sulfites, phosphites, thial, phosphines, and aldehydes; and polymer unit is vinyl, stryl, acryl, or cyclic monomers like lactones (cyclic esters), epoxides, lactides, lactams, silicon-containing cyclic monomers, cyclic carbonates, or others.

Non-limiting examples of such compounds include IP-1a, IP-1c, IP-1d, IP-1e, and compounds of Formula IP-1b:

IP-1a

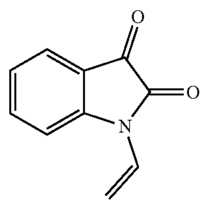

-continued

IP-1c

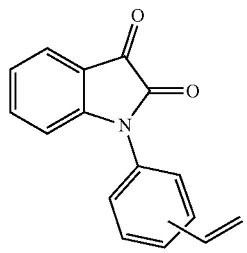

IP-1d

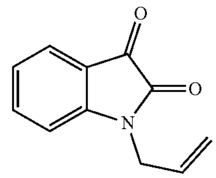

IP-1e

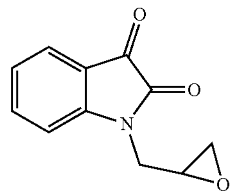

Formula IP-1b

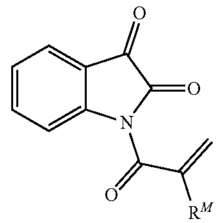

where $R^M$ is alkyl, aryl, heteroaryl, alkoxy, carboxy alkyl, or an amide. Additional examples include the compounds IP-1f, IP-1g, IP-1h, and IP-1i:

IP-1f

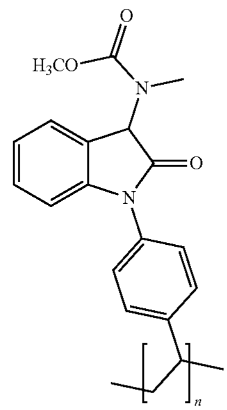

-continued

IP-1g

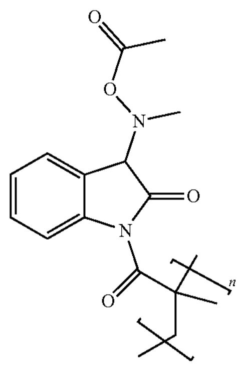

IP-1h

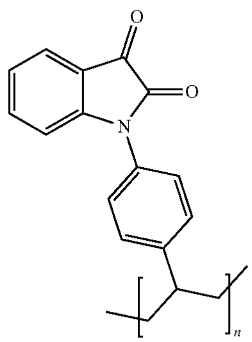

IP-1i

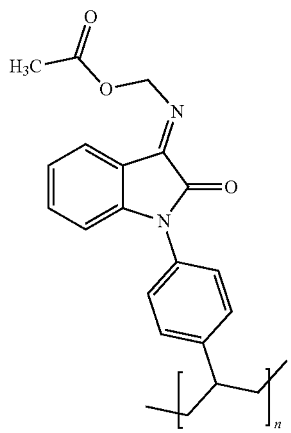

where n is an integer.

The isatin derivatives may also include isatins having amine units immobilized on polymer supports, such as in Formula IP-2:

Formula IP-2

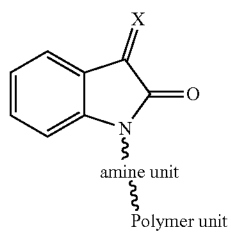

where X is O, S, NH, Ge, NC(O)—O—$R^C$, N—O—C(O) $R^C$, or NO—$R^C$, where $R^C$ is alkyl, aryl, or heteroaryl; the amine unit can be an amine, thiol, or any hydrogen atom donor; and the polymer unit is vinyl, stryl, acryl, or cyclic monomers like lactones (cyclic esters), epoxides, lactides, lactams, silicon-containing cyclic monomers, cyclic carbonates, or others. Non-limiting examples of such compounds include compounds IP-2a, IP-2b, IP-2c, IP-2d, IP-2e, IP-2f, and IP-2g:

IP-2a

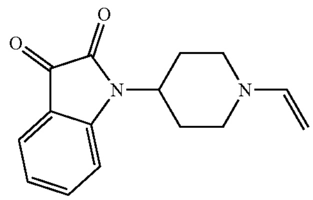

IP-2b

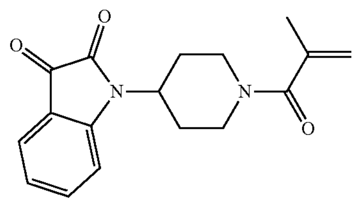

IP-2c

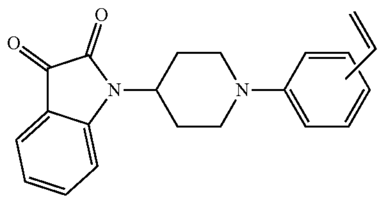

IP-2d

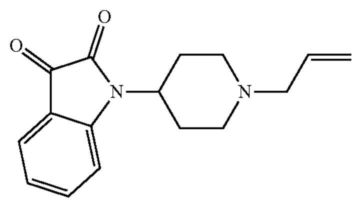

IP-2e

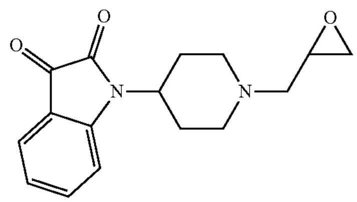

IP-2f

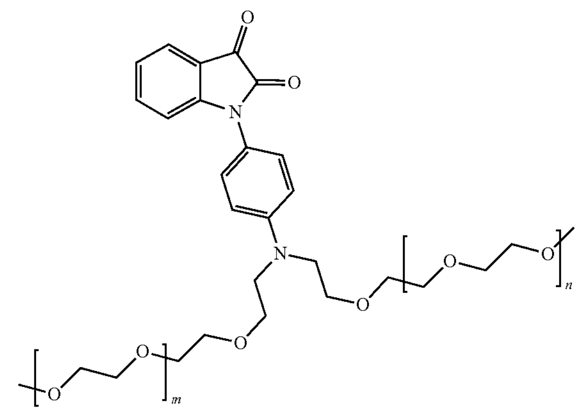

-continued

IP-2g

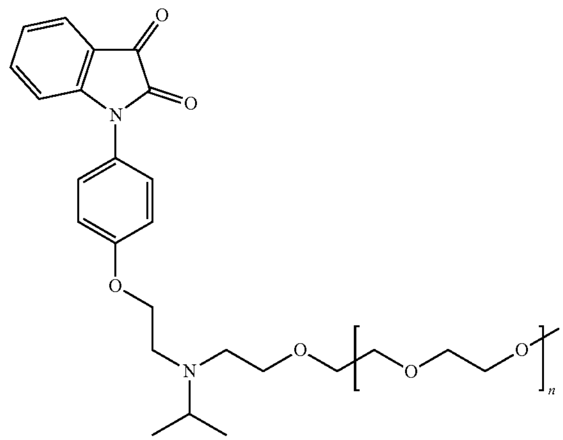

where m and n are each integers.

Furthermore, the isatin derivatives may also include isatins having amine units but without polymer supports, such as compounds of Formula IP-3:

IP-3

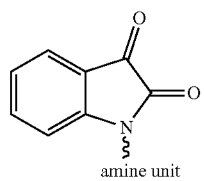

wherein the amine unit can be an amine, thiol, or any hydrogen atom donor. Non-limiting examples of such compounds are compounds IP-3a and IP-3b:

IP-3a

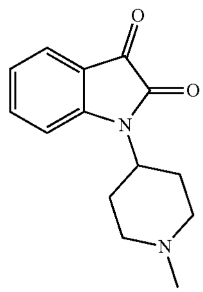

-continued

IP-3b

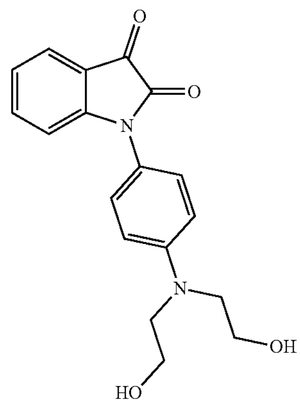

The isatin derivatives may include type I based isatin systems, such as compounds having Formula IP-4:

Formula IP-4

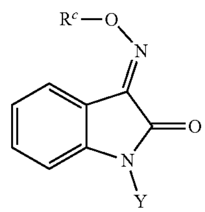

where $R^C$ is alkyl, alkenyl, aromatic, carbocyclic, heterocyclic, or carboxy; and Y is selected from H, alkyl, alkene, alkynes, aryl, heterocyclic, alkenyl halides, unsaturated enones, unsaturated ketones, unsaturated amides, unsaturated alcohols, unsaturated amines, unsaturated thiols, phosphonates, carboxylates, sulfonates, nitriles, thioethers, thioamides, thioketones, azides, sulfides, disulfides, ethers, epoxides, nitrates, nitrites, nitro compounds, nitroso compounds, alkyl ketoesters, acylgermanes, metallocenes, organosilanes, oximes, imides, cyanates, isocyanates, thiocyanates, isothiocyanates, sulfoxides, sulfones, sulfites, phosphites, thial, phosphines, and aldehydes. Non-limiting examples of such compounds include compounds IP-4a and IP-4b:

IP-4a

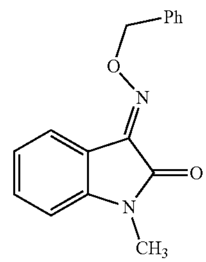

-continued

IP-4b

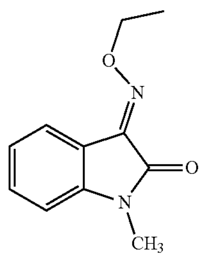

Type I isatin systems may further include compounds of Formula IP-5:

Formula IP-5

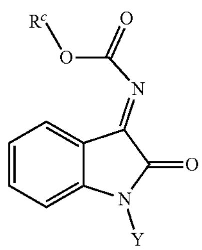

where $R^C$ is alkyl, alkenyl, aromatic, carbocyclic, heterocyclic, or carboxy; and Y is selected from H, alkyl, alkene, alkynes, aryl, heterocyclic, alkenyl halides, unsaturated enones, unsaturated ketones, unsaturated amides, unsaturated alcohols, unsaturated amines, unsaturated thiols, phosphonates, carboxylates, sulfonates, nitriles, thioethers, thioamides, thioketones, azides, sulfides, disulfides, ethers, epoxides, nitrates, nitrites, nitro compounds, nitroso compounds, alkyl ketoesters, acylgermanes, metallocenes, organosilanes, oximes, imides, cyanates, isocyanates, thiocyanates, isothiocyanates, sulfoxides, sulfones, sulfites, phosphites, thial, phosphines, and aldehydes. Non-limiting examples of such compounds include compounds IP-5a, IP-5b, and IP-5c:

IP-5a

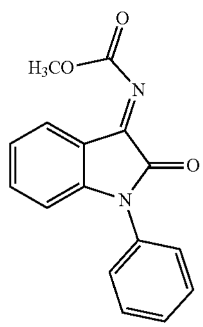

-continued

IP-5b

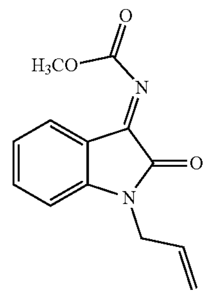

IP-5c

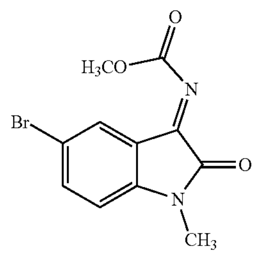

Type I isatin systems may further include polymer units, such as compounds of Formula IP-6:

Formula IP-6

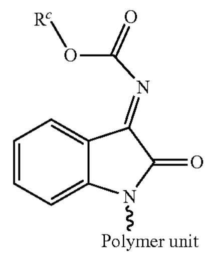

where $R^C$ is alkyl, alkenyl, aromatic, carbocyclic, heterocyclic, or carboxy; and the polymer unit is vinyl, stryl, acryl, or cyclic monomers like lactones (cyclic esters), epoxides, lactides, lactams, silicon-containing cyclic monomers, cyclic carbonates, or others. Non-limiting examples of such compounds include compounds IP-6a and IP-6b:

IP-6a

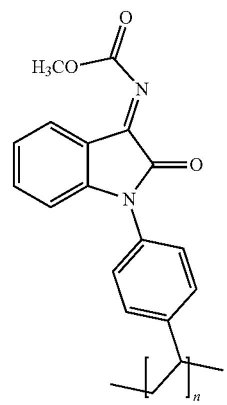

-continued

IP-6b

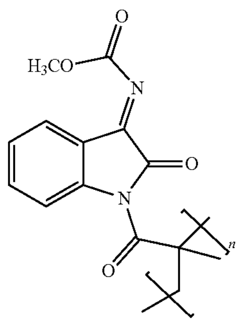

Type I isatin systems may further include compounds of Formula IP-7:

Formula IP-7

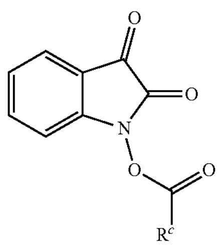

where $R^C$ is alkyl, alkenyl, aromatic, carbocyclic, heterocyclic, or carboxy. Non-limiting examples of such compounds include compounds IP-7a, IP-7b, IP-7c, IP-7d, and IP-7e:

IP-7a

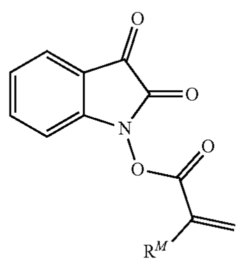

IP-7b

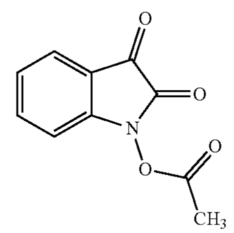

IP-7c

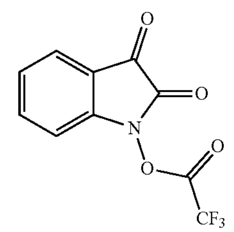

-continued

IP-7d

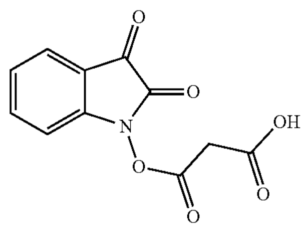

IP-7e

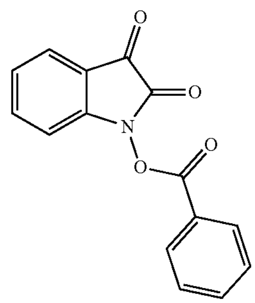

Type I isatin systems may further include compounds of Formula IP-8:

IP-8

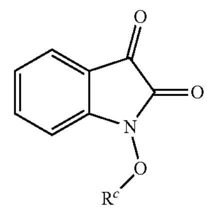

where $R^C$ is alkyl, alkenyl, aromatic, carbocyclic, heterocyclic, or carboxy. Non-limiting examples of such compounds include compounds IP-8a and IP-8b:

IP-8a

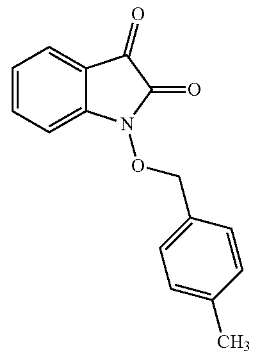

-continued

IP-8b

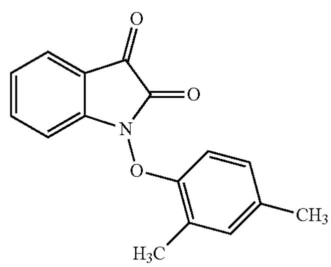

Type I isatin systems may further include compounds bound to a polymer support, such as compounds of Formula IP-9:

Formula IP-9

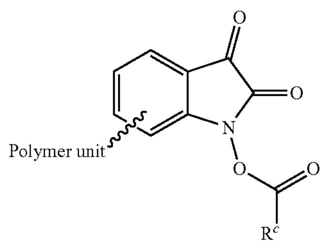

where $R^C$ is alkyl, alkenyl, aromatic, carbocyclic, heterocyclic, or carboxy; and the polymer unit is vinyl, stryl, acryl, or cyclic monomers like lactones (cyclic esters), epoxides, lactides, lactams, silicon-containing cyclic monomers, cyclic carbonates, or others. Non-limiting examples of such compounds include compounds IP-9a and IP-9b:

IP-9a

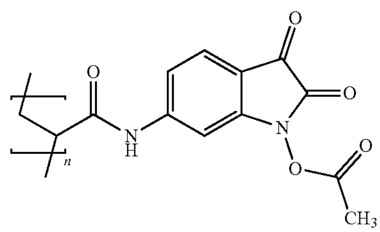

IP-9b

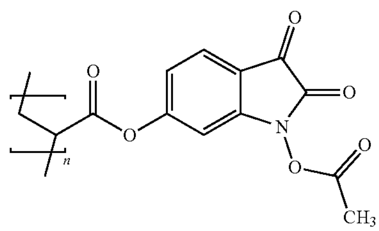

Type I isatin systems may further include compounds of Formula IP-10:

Formula IP-10

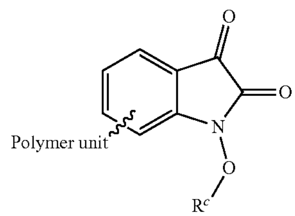

where $R^C$ is alkyl, alkenyl, aromatic, carbocyclic, heterocyclic, or carboxy; and the polymer unit is vinyl, stryl, acryl, or cyclic monomers like lactones (cyclic esters), epoxides, lactides, lactams, silicon-containing cyclic monomers, cyclic carbonates, or others. Non-limiting examples of such compounds include compounds IP-10a and IP-10b:

IP-10a

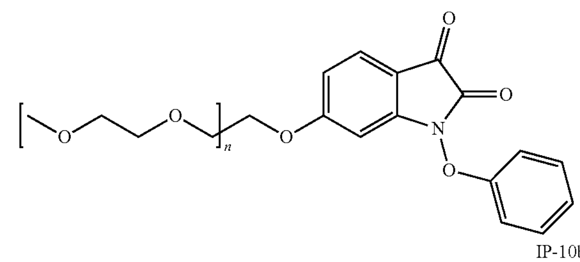

IP-10b

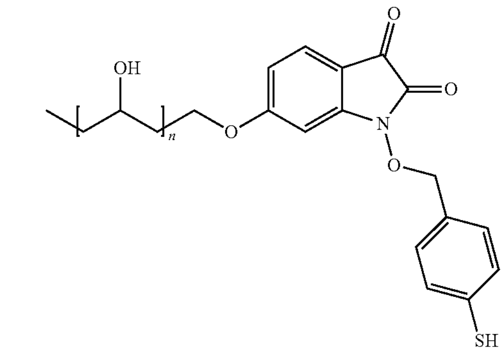

Advantageously, isatin and isatin derivatives are useful as efficient photoinitiators for visible light-based polymerization. These initiators can be fine tuned for various wavelengths (purple, blue, green, etc.), and their unique excited state properties make them ideal candidates for replacing well-established UVA light-based photoinitiators. The isatin compounds work with LED lights as the illumination source. Typical UV curing uses a 1000 W light. In contrast, the isatin photoinitiators described herein may be utilized with a 50 mW light, thereby providing energy savings. The photoinitiation may work with wavelengths of light all the way to green. The compounds are highly tunable to a specific wavelength depending on end application, and can be channeled for photopolymerization reactions.

The isatin derivatives may also be plant-derived. Surprisingly, plant dye-based derivates have not previously been evaluated as photoinitiators (either as type I or type II photoinitiators). Their enhanced absorptivity in the visible light region and the excepted low-lying triplet excited state enables their use as visible light photoinitiators for conventional photoinitiated polymerization, 3D printing, and dental curing, for example. The need for such visible light initiators is of high demand as photoinitiators that use UV-curing are used in inks, imaging, dental composites, automobile parts manufacturing, clear coatings in the printing industry, paints, and packaging, to name a few. An added advantage is the generation of transparent materials starting from colored photoinitiators. The isatin derivatives described herein can be used to create transparent or colorless polymers, which further broadens their possible applications. The chromophore implementation is quite straight forward with enhanced efficiency, and low loading levels. This decreases coloration. The resulting polymers may be transparent, and stable from yellowing. The polymers may be free from haze or fogging.

The photoinitiators described herein can be used in connection with elastomers, polymers, thermoplastics, composites, glues, resins, paints, pigments, contact lenses, automobile parts, 3D printing, resin curing, silicones, epoxies, dental composites (e.g., as an alternative to camphorquinone 2), photo etching, aircraft parts, composites, and the like. In some embodiments, the photoinitiators are used in biomedical applications such as for dental curing, bone hardening, or to make bandages. The photoinitiators can be used to initiate polymerization of any monomer that can be photopolymerized. The final filament may be colorless or otherwise given no color from the photoinitiator. Thus, the photoinitiators are useful to produce a wide range of plastics.

Furthermore, the photoinitiators described herein may be polymerized or otherwise incorporated into a polymer. For example, a polymer backbone may include an isatin derivative dangling from it. Such polymer compositions are usable as type I or type II initiators.

The compositions and methods described herein can be embodied in the form of a kit or kits. A non-limiting example of such a kit is a kit for conducting a photopolymerization or making a polymer, the kit comprising a monomer and isatin or an isatin derivative in separate containers, where the containers may or may not be present in a combined configuration. Many other kits are possible, such as kits that further include a light source, such as an LED. The kits may further include instructions for using the components of the kit to practice the subject methods. The instructions for practicing the subject methods are generally recorded on a suitable recording medium. For example, the instructions may be present in the kits as a package insert or in the labeling of the container of the kit or components thereof. In other embodiments, the instructions are present as an electronic storage data file present on a suitable computer readable storage medium, such as a flash drive or CD-ROM. In other embodiments, the actual instructions are not present in the kit, but means for obtaining the instructions from a remote source, such as via the internet, are provided. An example of this embodiment is a kit that includes a web address where the instructions can be viewed and/or from which the instructions can be downloaded. As with the instructions, this means for obtaining the instructions is recorded on a suitable substrate.

Examples

In this example, isatin derivatives are compared to existing technology and shown to have enhanced properties. Biomass derived diketones were found to be efficient photoinitiators for visible light based polymerization. Their unique excited state properties make them ideal candidates for replacing well-established UVA light-based type 1 and type 2 photoinitiators.

Isatin 3a and a family of isatin derivatives 3b-3g were synthesized, in a single step, and their use as photoinitiators was evaluated (FIG. 1). Based on photophysical studies, it is revealed that these compounds are efficient photoinitiators that work under visible light illumination.

Figure 2:
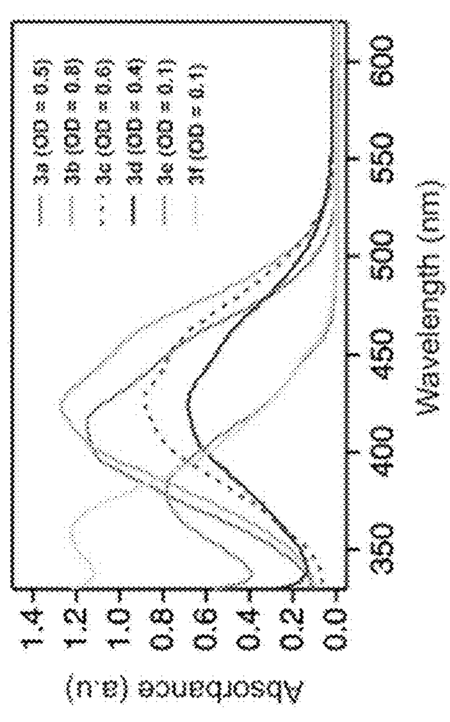
FIG. 2: Scheme 1, showing isatin photoinitiators. Inset: absorption spectra of isatin derivatives 3a-3f with optical density in parenthesis.
Figure 2:
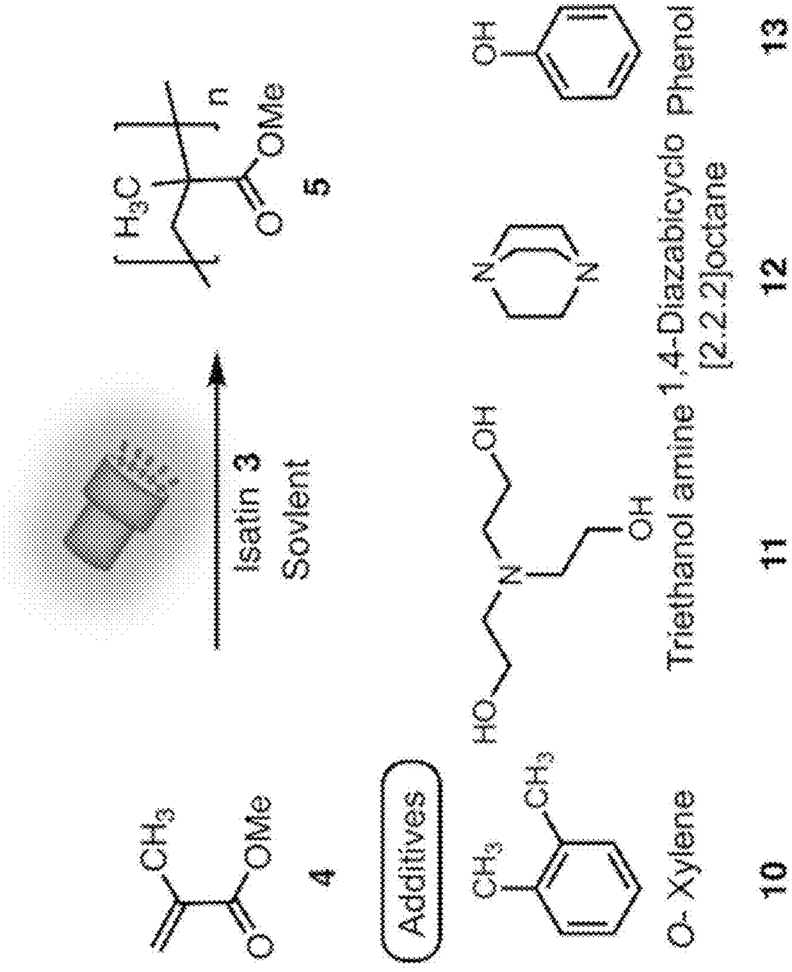

Commercially available isatin 3a can be conveniently functionalized to feature alkyl (3c), aryl (3d), acyl (3e), benzoyl (3f), or trifluoromethyl (3g) functionalities. Depending on the substitution on the nitrogen, isatins display absorption in the visible region as illustrated by their bright colors (FIGS. 1, 3). To take advantage of this visible light absorptivity for initiating polymerization with visible light, understanding the photophysical features becomes quite important. As isatins feature a benzoyl carbonyl functionality, a visible light initiated hydrogen abstraction reaction that can be channeled for polymerization reaction utilizing methylmethacrylate 4 (Scheme 2, FIG. 4) is possible. An added advantage of this strategy is that it enables polymerization reactions in which the solvent plays a dual role as diluent and coinitiator (co-initiator 10, Scheme 1, FIG. 2), increasing the efficiency of the polymerization process.

The evaluation of the photopolymerization efficiency of isatin 3a and isatin derivatives 3b-3f began with o-xylene 10 and triethanolamine 11 as co-initiators. Satisfactory conversions of monomer methylmethacrylate 4 to polymer 5 was achieved (Table 1) under blue LED irradiation with o-xylene 10 as co-initiator/solvent. The reaction was also efficient with triethanol amine 11 as the co-initiator in acetonitrile (6 h irradiation). Inspection of Table 1 shows that the % conversion in the case of photoinitiators 3a-3d does not vary with the choice of co-initiator. On other hand, N-acyl isatin derivatives 3e and 3f gave relatively high polymer yield and the % conversions were around 17-19%. GPC analysis on the polymers showed polydispersities ranging from 1.8-5.3, which is reasonable for a free radical polymerization process. Surprisingly, colored reaction mixtures 3e and 3f before irradiation turned colorless after reaction. Quenching the reaction samples with cold methanol resulted in polymer 5 as a white precipitate/gel. (FIG. 3.) Taking into consideration of absorptivity at wavelength ~390 nm from UV-Vis absorption studies, similar photopolymerization experiments were performed using purple LED irradiation. All the samples gave similar % conversion of monomer.

TABLE 1

Isatin photoinitiators for acrylate polymerization using blue LED irradiation

| Entry | Isatin | CI | Monomer | % Conversion[c] | Mn | Mw | PDI |
|---|---|---|---|---|---|---|---|
| 1 | 3a | 10 | 4 | 6 | 46,916 | 98,450 | 2.0 |
| 2 | 3a | 11 | 4 | 7 | 85,700 | 1,72,535 | 2.0 |
| 3 | 3b[b] | 10 | 4 | — | — | — | — |

TABLE 1-continued

Isatin photoinitiators for acrylate polymerization using blue LED irradiation

| Entry | Isatin | CI | Monomer | % Conversion[c] | Mn | Mw | PDI |
|---|---|---|---|---|---|---|---|
| 4 | 3b | 11 | 4 | 11 | 73,554 | 2,20,504 | 2.0 |
| 5 | 3c | 10 | 4 | 6 | 42,862 | 78,814 | 1.8 |
| 6 | 3c | 11 | 4 | 7 | 1,07,294 | 2,15,521 | 2.1 |
| 7 | 3d | 10 | 4 | 9 | 37,036 | 81,271 | 2.1 |
| 8 | 3d | 11 | 4 | 7 | 1,08,092 | 2,48,628 | 2.3 |
| 9 | 3e | 10 | 4 | 17 | 19,405 | 63,400 | 3.2 |
| 10 | 3e | 11 | 4 | 9 | 83,228 | 4,48,088 | 5.3 |
| 11 | 3f | 10 | 4 | 17 | 22,014 | 66,444 | 3.0 |
| 12 | 3f | 11 | 4 | 7 | 1,128,22 | 2,67,774 | 2.3 |

[a]M = Monomer 4 = 3.12M; isatin concentration = 1.5 mM. CI = co-initiator 10 or 11. Concentration of co-initiator 11 was used in equimolar concentrations to photoinitiator. o-Xylene 10 was used both as a solvent and a co-initiator when employed for photopolymerization. For co-initiator 11, MeCN was employed as the solvent. Photopolymerizations were performed with blue LED ~460 nm (strip taped on pyrex glass jar) illumination. Irradiation was done for 3 h (for 10) and 6 h (for 11).
[b]3b is insoluble in o-xylene.
[c]% conversion carry an error of 6% (average of three runs) and was calculated gravimetrically = ratio of weight(g) of isolated polymer/weight(g) of the monomer used.

TABLE 2

Isatin photoinitiators for acrylate polymerization using purple LED

| Entry | Isatin 3e [2 mM] (1 equiv) | 11 [mM] (equiv.) | % Conversion[b] |
|---|---|---|---|
| 1 | 3e | 0.2 mM (0.1 equiv) | 2.6 |
| 2 | 3e | 1.0 mM (0.5 equiv) | 5.8 |
| 3 | 3e | 2.0 mM (1.0 equiv) | 10.4 |
| 4 | 3e | 4.0 mM (2.0 equiv) | 8.6 |
| 5 | 3e | 8.0 mM (4.0 equiv) | 8.1 |
| 6 | 3e | 10 mM (5.0 equiv) | 7.5 |

[a]M = Monomer 4 = 3.12M; Isatin concentration = 2.0 mM. Co-initiator = triethanol amine 11, solvent = MeCN. Blue LED strip illumination was employed for the photopolymerization with a flux density of 1.27 $mW/cm^2$ (LED jar) and Ee = Flux density ($mW/cm^2$) measured by Thor PM100D power meter console using S121C photodiode power sensor by keeping the sample at a distance of ~3 cm from the light source. Irradiation was done for 6 h.
[b]% conversion carry an error of 5% and was calculated gravimetrically = ratio of weight(g) of isolated polymer/weight(g) of the monomer used. The values reported are an average of three run.

TABLE 3

Isatin photoinitiators for acrylate polymerization using purple LED

| Entry | Isatin | CI | Monomer | % Conversion[b] | Mn | Mw | PDI |
|---|---|---|---|---|---|---|---|
| 1 | 3a | 11 | 4 | 7 | 86,105 | 1,56,606 | 1.8 |
| 2 | 3b | 11 | 4 | <1 | 86,337 | 1,65,490 | 1.9 |
| 3 | 3c | 11 | 4 | 9 | 1,01,115 | 2,19,813 | 2.1 |
| 4 | 3d | 11 | 4 | 10 | 85,626 | 1,81,794 | 2.1 |
| 5 | 3e | 11 | 4 | 8 | 78,526 | 2,57,136 | 3.2 |
| 6 | 3f | 11 | 4 | 8 | 1,28,547 | 2,52,197 | 1.9 |

[a]M = Monomer 4 = 3.12M; isatin concentration = 1.5 mM. Concentration of co-initiator 11 was used in equimolar concentrations to photoinitiator. Photopolymerizations were performed in MeCN with purple LED ~390 nm (strip taped on pyrex glass jar) illumination. Irradiation was done for 6 h.
[b]% conversion carry an error of 7% (average of three runs) and was calculated gravimetrically = ratio of weight(g) of isolated polymer/weight(g) of the monomer used. The values reported are an average of three runs.

In order to demonstrate the usability of the visible light active photoinitiators for industrial applications, a biomass-derived furfural dimethacrylate derivative was used as the monomer to make cross-linked polymers. A 50-50% blend of monomer 6 or 8 and 3e in o-xylene was placed in a silicone mold. The samples were irradiated by blue LED for 3 h. After the photoreaction, the solvent was removed by placing the cross-linked polymer product in vacuum dry oven for ~12 h. The formation of a transparent thin film without any coloration from isatin 3e was observed after curing (Scheme 2, FIG. 2). Without wishing to be bound by theory, it is believed that the isatin functionality is incorporated within the polymer backbone in which the benzoyl carbonyl group is reduced, leading to a transparent film. 3g was synthesized to test its efficiency as a photoinitiator based on polymerization results on N-acetyl 3e and N-benzoyl 3f derivatives from Table 1.

Figure 20A:
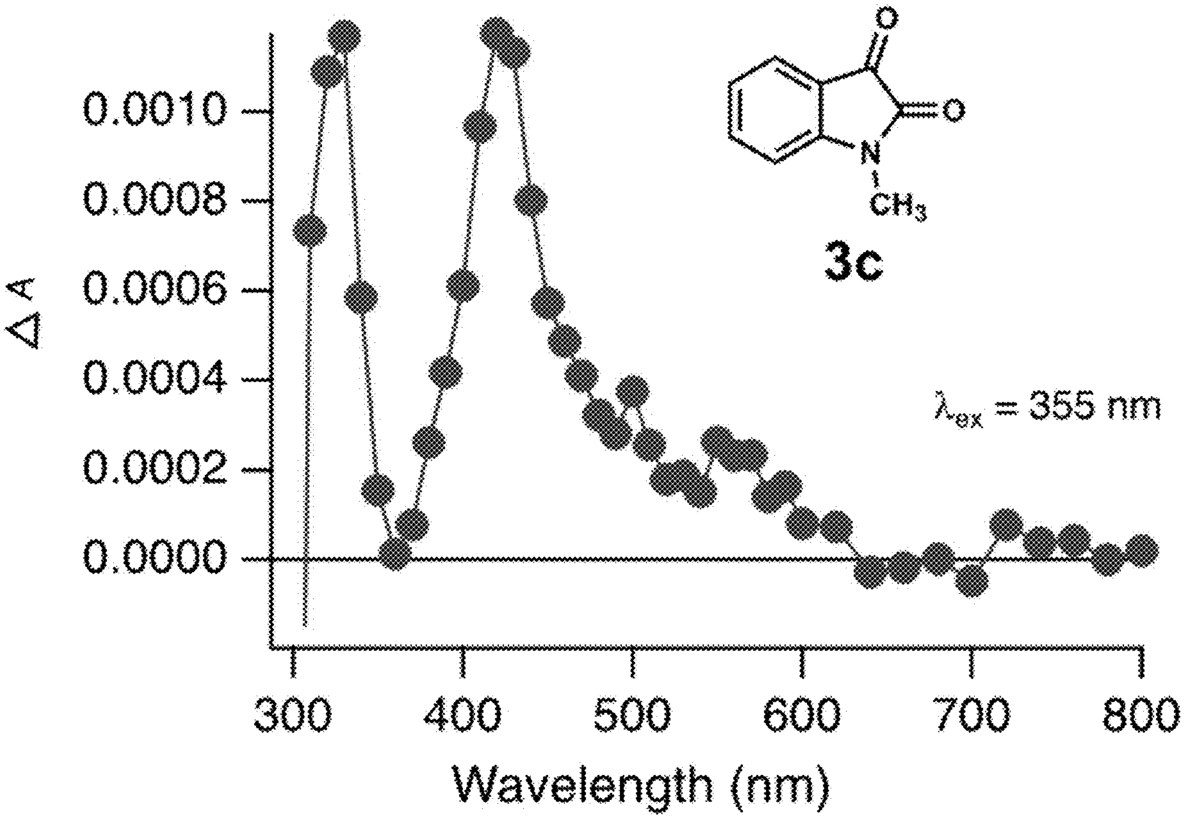
FIGS. 20A-20C: Laser flash photolysis: Triplet absorption spectra for isatins 3c (FIG. 20A), 3e (FIG. 20B), and 3f (FIG. 20C) in benzene under argon.
Figure 20B:
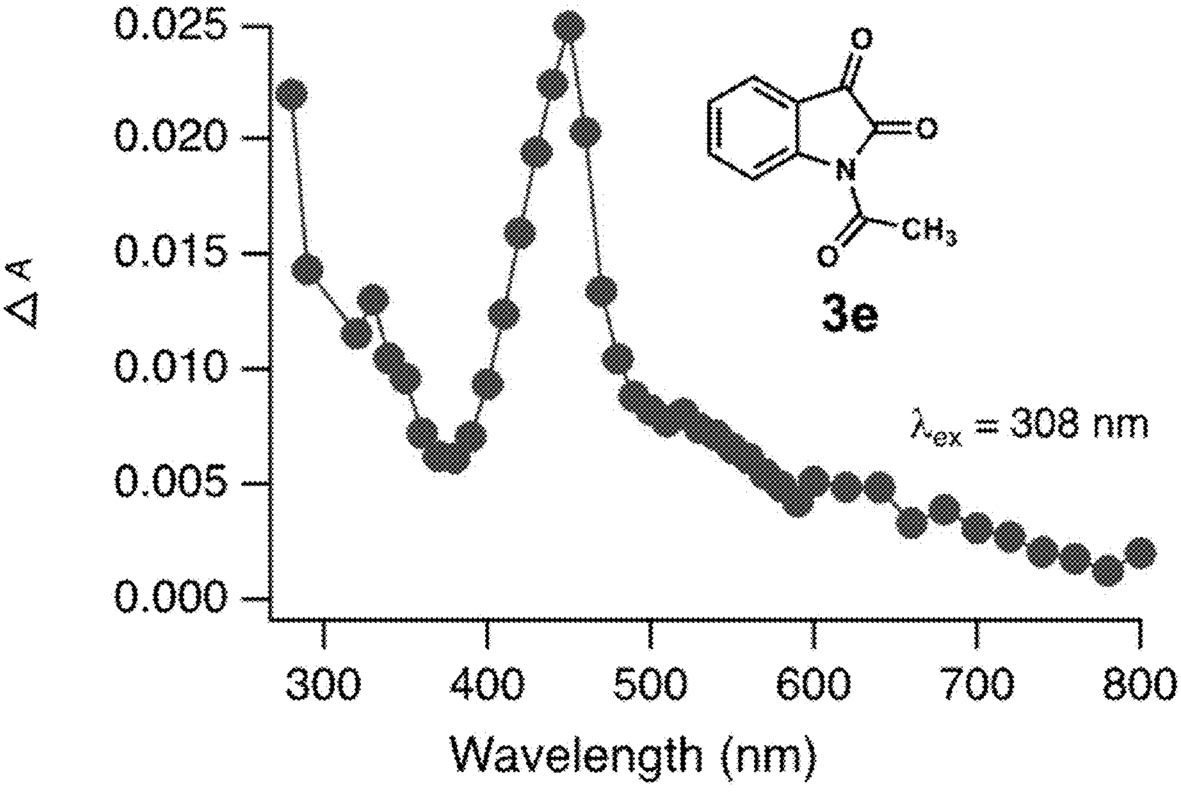
Figure 20C:
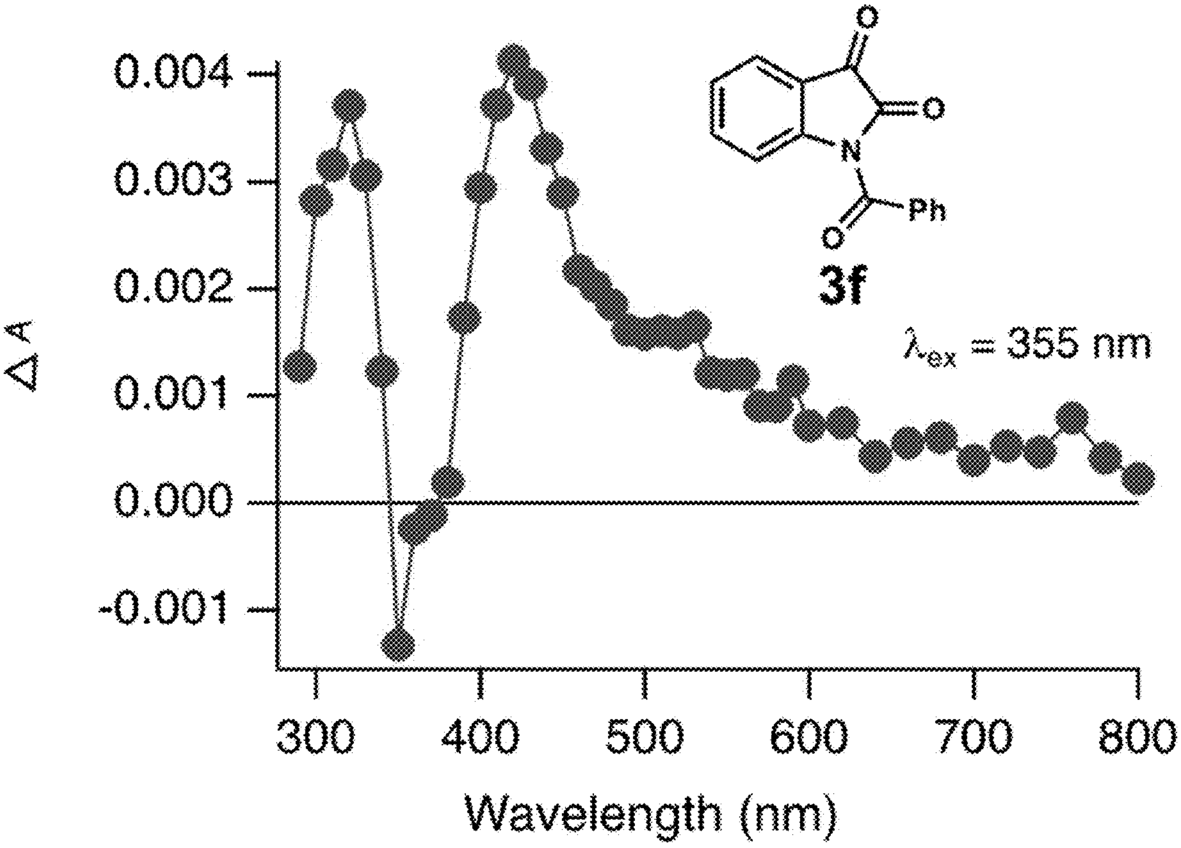

To understand the excited state processes involved leading to radical generation and their kinetics, photophysical studies were performed on isatin derived photoinitiators 3a, 3c, 3e, and 3f. To investigate the triplet state properties at room temperature, transient absorption measurements were performed using a pulsed laser for excitation of $\lambda_{ex}$=308 nm for 3e and $\lambda_{ex}$=355 nm for 3c and 3f. FIGS. 20A-20C show the transient absorption spectra of 3c, 3e, and 3f, which were assigned to triplet-triplet absorptions. The spectra of 3a was consistent with literature reports. The triplet states decayed with lifetimes between of 9 μs for 3a, 7.1 μs for 3c (Table 4). Placing the electron withdrawing acyl substituent on the isatin nitrogen lowered lifetimes to 0.066 μs and 0.48 μs for 3e and 3f, respectively.

TABLE 4

Photophysical kinetic parameters for various isatins

| | 3a | 3c | 3e | 3f |
|---|---|---|---|---|
| $\tau_T$ (μs) in benzene | 9.0 | 7.1 | 0.066 | 0.48 |
| $k_q^{11}$ ($10^8$ $M^{-1}$ $s^{-1}$) | 2.8 ± 0.1 | 1.2 ± 0.1 | 4.0 ± 0.3 | 2.5 ± 0.1 |
| $k_q^{10}$ ($10^8$ $M^{-1}$ $s^{-1}$) | 2.8 ± 0.1 | — | — | — |
| $k_q^{O2}$ ($10^9$ $M^{-1}$ $s^{-1}$) | 1.6 ± 0.5 | — | — | — |

Figure 21:
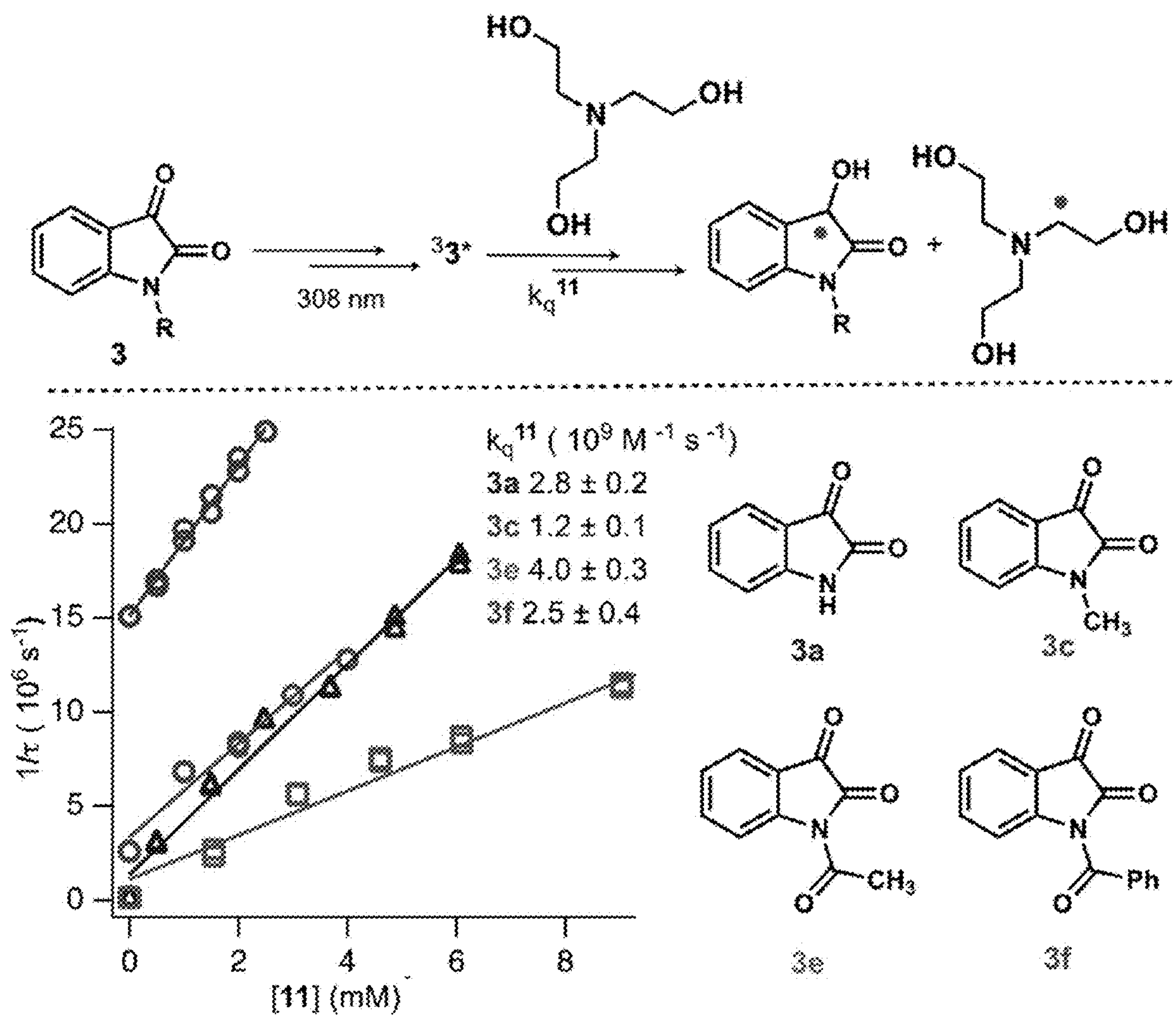
FIG. 21: Top: Reaction mechanism for generating initiator radicals. Bottom: Determination of the bimolecular quenching rate constants $k_q$ 11 from the plot of the inverse triplet lifetimes of 3a, 3c, 3e, and 3f measured by laser flash photolysis and monitored at 420 nm (3a, 3c, 3f) and 450 nm (3e) vs. varying concentrations of 11 in benzene.
Figure 22:
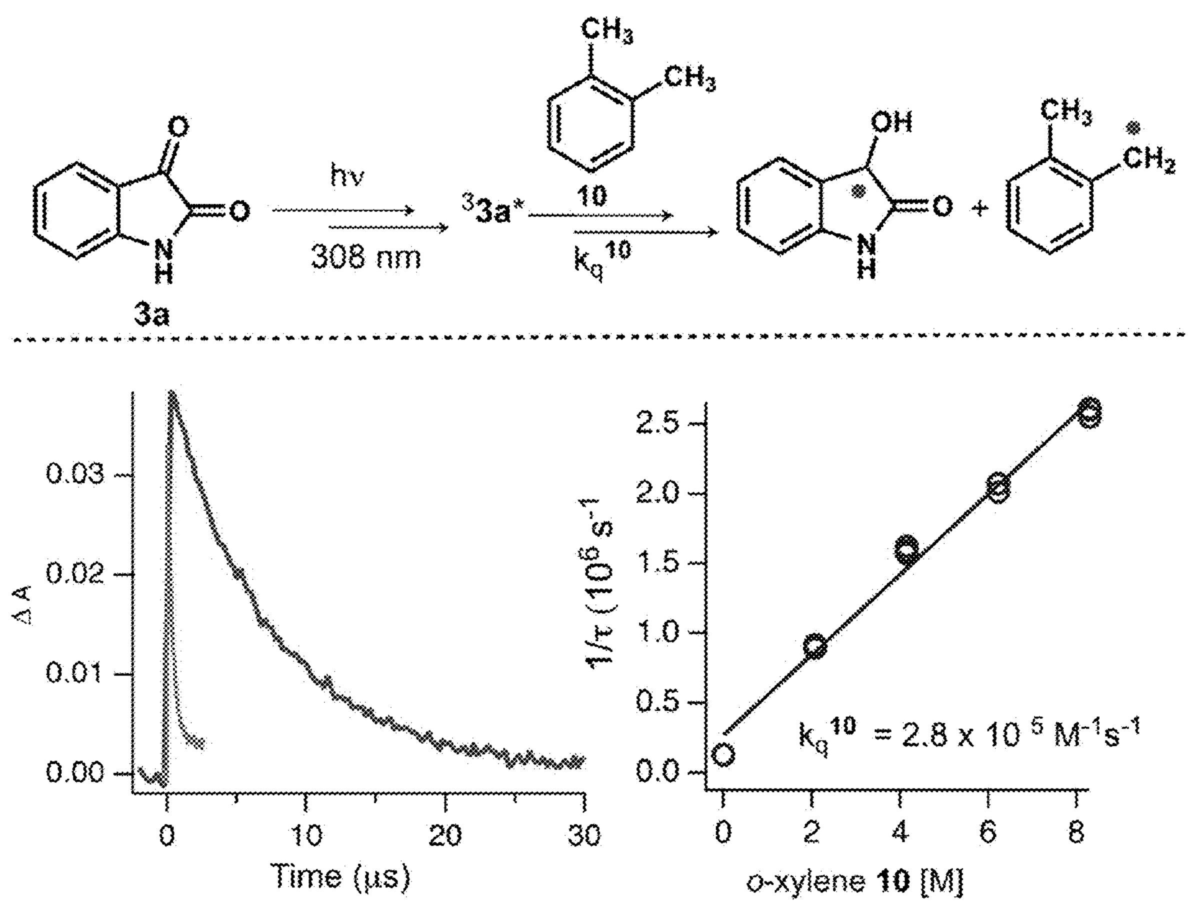
FIG. 22: Top: Reaction mechanism for generating initiator radicals. Bottom left: Decay of the triplet absorbance of 3a after laser excitation (308 nm, 15 ns pulse length) monitored at 420 nm in deoxygenated benzene (red) or o-xylene (blue). Bottom right: Determination of the bimolecular quenching rate constants $k_q$ 10 from the plot of the inverse triplet lifetime of 3a measured by laser flash photolysis vs. varying concentrations of o-xylene in benzene.
Figure 23:
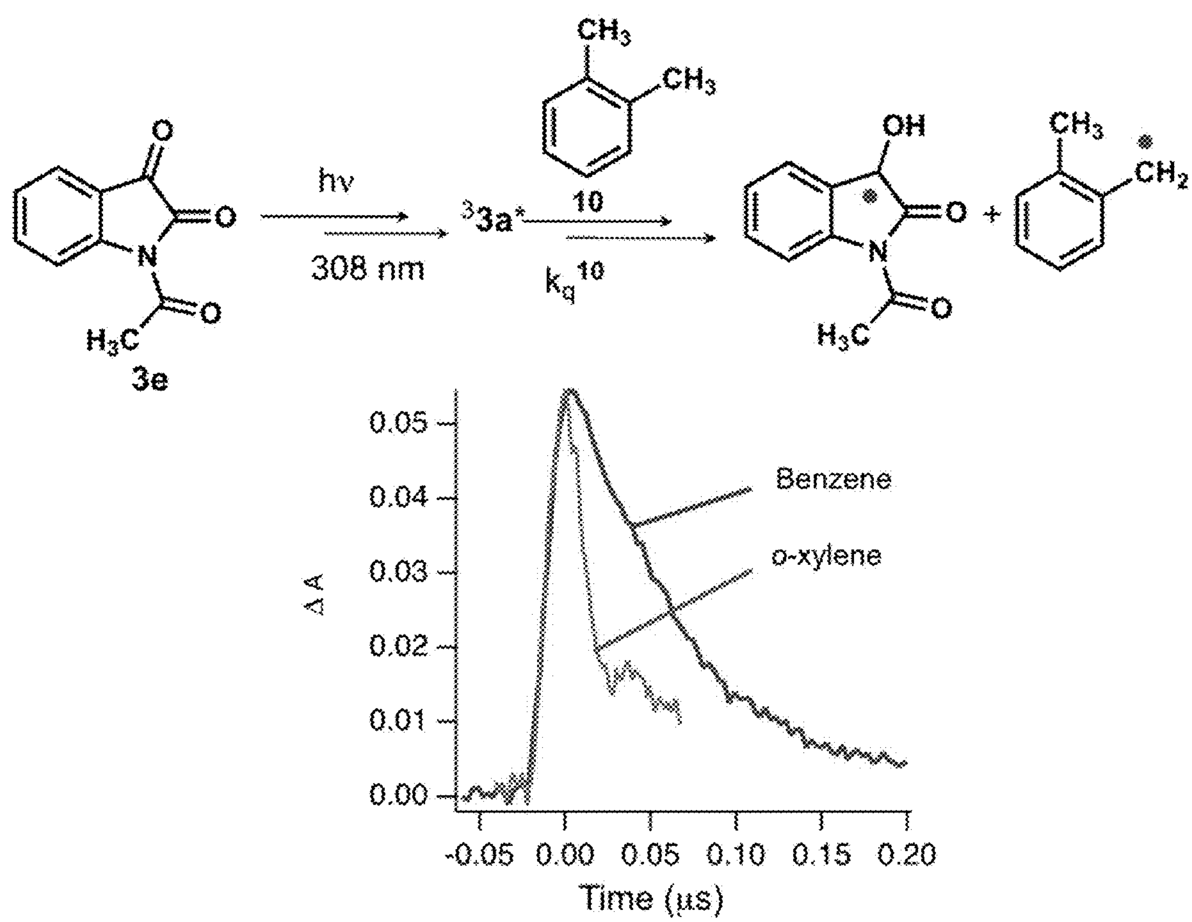
FIG. 23: Top: Reaction mechanism for generating initiator radicals. Bottom: Decay of the triplet absorbance of 3e after laser excitation (308 nm, 15 ns pulse length) monitored at 450 nm in deoxygenated benzene (red) or o-xylene (blue). Triplet lifetime of 3e in o-xylene is 66 ns.

The rate constants for quenching of the triplet excited states of isatins 3a, 3c, 3e, and 3f by o-xylene 10, triethanol amine 11 and molecular oxygen were ascertained using laser flash photolysis (FIGS. 21-23). The quenching of the triplet 3a by molecular oxygen was $1.6\pm0.5\times10^9$ $M^{-1}$ $s^{-1}$ (Table 4; entry 3). Under type II conditions, the critical step in generating radicals that can initiate free radical polymerization is the reaction of triplet states of the photoinitiator with the co-initiator (e.g., tertiary amine). The bimolecular quenching rate constants of triplet state quenching of 3a, 3c, 3e, and 3f by the triethanol amine 11 were determined by laser flash photolysis. Pseudo-first order treatment for the triplet decay traces of the photoinitiators 3a, 3c, 3e, and 3f at varying concentrations of 11 was employed to extract the bimolecular quenching rate constants $k_q^{11}$ from the slope of the inverse triplet lifetimes vs. the concentrations of 11 (FIG. 21). The quenching high-rate constants ($1.2\text{-}4.0\times10^8$ $M^{-1}$ $s^{-1}$) ensure efficient initiator radical generation. The similar rate constants ($k_q^{11}$) correlate with similar conversions of MMA into polymer (Table 1). The highest rate constant was observed for 3e ($k_q^{11}=4.0\pm0.3\times10^8$ $M^{-1}$ $s^{-1}$) which also showed the highest conversion of 9% (Table 1; entry 10).

Given the success in utilizing a highly colored species for visible light photopolymerization without the final polymer being colored, the strategy is opened up to being utilized for making various industrial applications such as food packaging, dental composites, and automobiles, where type II aromatic photoinitiators play a major role.

These examples establish the use of isatin and isatin derivatives as visible light photoinitiators. The onset of absorptivity of isatins is highly tuneable for visible light initiated photopolymerization. The polymerized materials are colorless, indicating that the photoinitiators color is not transferred to the system. This was demonstrated by generating transparent films from biomass-derived monomers.

General Methods

All commercially obtained reagents/solvents were used as received; chemicals were purchased from Alfa Aesar®, Sigma-Aldrich®, Acros Organics®, TCI America®, and Oakwood® Products, and were used as received without further purification. Spectrophotometric grade solvents (e.g. acetonitrile, ethanol) were purchased from Sigma-Aldrich® and used without further purification for emission measurements. Unless stated otherwise, reactions were conducted in oven-dried glassware under nitrogen atmosphere. $^1$H-NMR and $^{13}$C-NMR spectra were recorded on Bruker 500 MHz (125 MHz for $^{13}$C) spectrometers. Data from the $^1$H-NMR spectroscopy are reported as chemical shift (δ ppm) with the corresponding integration values. Coupling constants (J) are reported in hertz (Hz). Standard abbreviations indicating multiplicity were used as follows: s (singlet), b (broad), d (doublet), t (triplet), q (quartet), m (multiplet), and virt (virtual). Data for $^{13}$C NMR spectra are reported in terms of chemical shift (δ ppm).

When necessary, the compounds were purified by combiflash equipped with dual wavelength UV-Vis absorbance detector (Teledyne ISCO) using hexanes:ethyl acetate as the mobile phase and Redisep® cartridge filled with silica (Teledyne ISCO) as stationary phase. In some cases, compounds were purified by column chromatography on silica gel (Sorbent Technologies, silica gel standard grade: porosity 60 A, particle size: 230×400 mesh, surface area: 500-600 m2/g, bulk density: 0.4 g/mL, pH range: 6.5-7.5). Unless indicated, the Retention Factor (Rf) values were recorded using a 5-50% hexanes:ethyl acetate as mobile phase and on Sorbent Technologies, silica Gel TLC plates (200 mm thickness w/UV254).

Photophysical Methods

Spectrophotometric solvents (Sigma-Aldrich®) were used whenever necessary unless or otherwise mentioned. UV quality fluorimeter cells (with range until 190 nm) were purchased from Luzchem®. Absorbance measurements were performed using a Cary UV-Vis spectrophotometer. Emission spectra were recorded on a Horiba Scientific® Fluorolog 3 spectrometer (FL3-22) equipped with double-grating monochromators, dual lamp housing containing a 450-watt CW xenon lamp and a UV xenon flash lamp (FL-1040), Fluorohub/MCA/MCS electronics, and R928 PMT detector. Emission and excitation spectra were corrected in all the cases for source intensity (lamp and grating) and emission spectral response (detector and grating) by standard instrument correction provided in the instrument software. Fluorescence (steady state) and phosphorescence (77 K) emission spectra were processed by FluorEssence® software. Phosphorescence lifetime measurements were performed using DAS6® V6.4 software. The goodness-of-fit was assessed by minimizing the reduced chi squared function and further judged by the symmetrical distribution of the residuals. Laser flash photolysis experiments employed the pulses from a Spectra Physics GCR-150-30 Nd: YAG laser (355 nm, ca. 5 mJ/pulse, 7 ns pulse length or 266 nm, ca 5 mJ/pulse, 5 ns pulse length) and a computer-controlled system.

Gel Permeations Chromatography (GPC) Analysis

Polymer sample analysis were performed on EcoSEC GPC System (HLC-8320) equipped with a dual flow refractive index detector (RI) detector. Separation of injections occurred over a column bank consisting of two 67.8 mm ID x 30 cm, 5 μm particle size TSKgelR multiporeH xL (exclusion limit 6×104 g/mol) and one 6 mm ID x 15 cm, 4 μm particle size TSKgel SuperH-RC (exclusion limit 5×105 g/mol) columns (Tosoh Bioscience LLC). Tetrahydrofuran (THF) (HPLC grade, EMD OmnisolvR) was used as mobile phase and solvent for sample preparation were at flow rate of 1 mL/min. The detector, pump oven, and column oven were maintained at 40° C. Polystyrene kits with PStQuick C (Lot No: PSQ-D02C) and PStQuick C (Lot No: PSQ-C04C) were used. All the molecular weight value (Mw, Mn, and PDI) results are calculated based on a polystyrene calibration curve.

The concentration of polymer samples for GPC analysis was 1 mg/ml in THF. The samples were soaked overnight. The saturated compounds were filtered through a 25 mm, 0.2 μm PTFE membrane filter.

Figure 5:
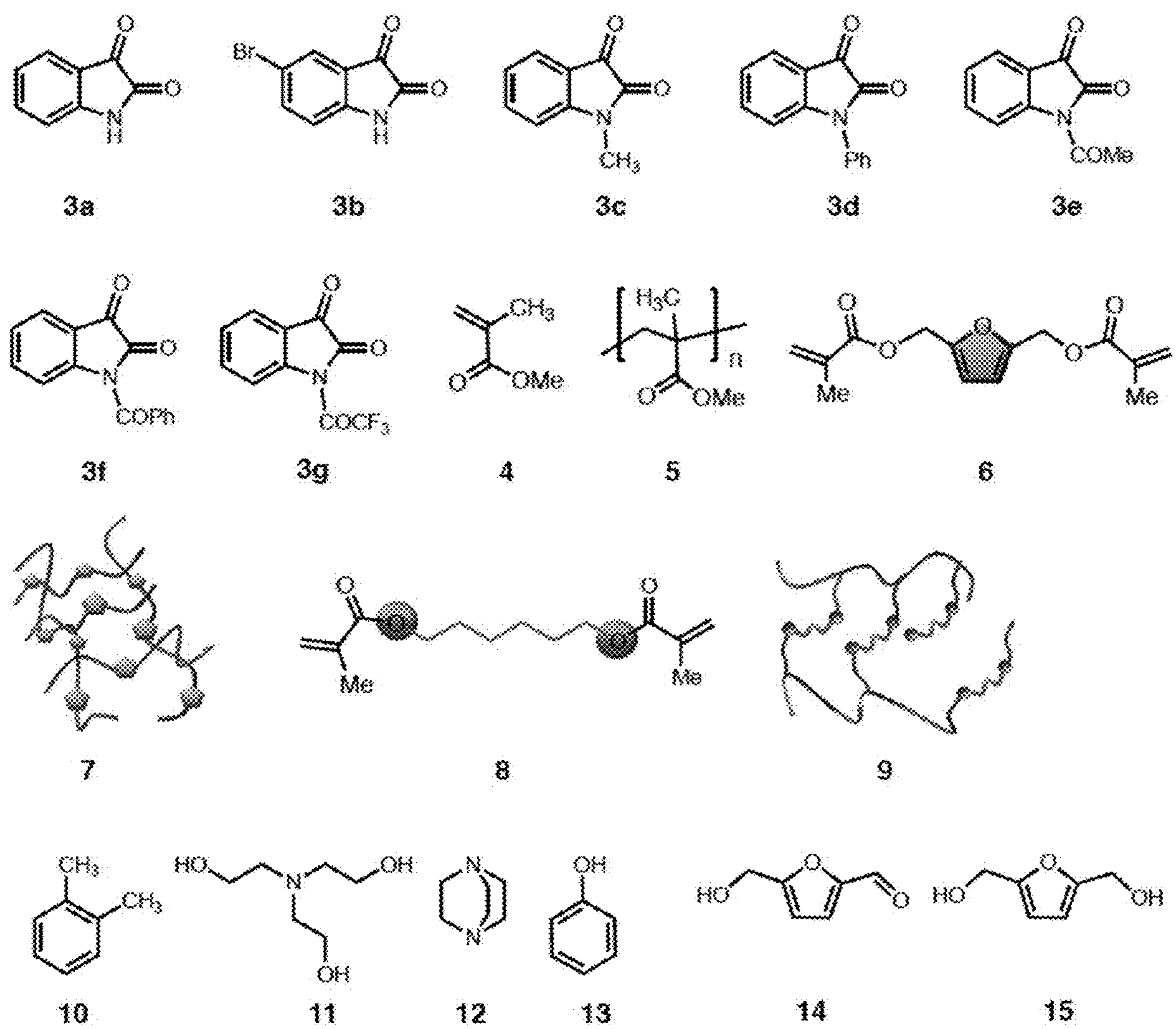
FIG. 5: Chemical structures of isatin 3a, isatin derivatives 3b-3g, monomers 4, 6, 8, and corresponding polymer products 5, 7, 9.

Chemical Structures of Isatin Photoinitiators, Co-Initiators, Monomers, and Polymers Chemical structures of isatins, monomers, and corresponding polymer products are shown in FIG. 5.

General Procedure for the Synthesis of Benzophenone Photoinitiators

Synthesis of N-Methyl Isatin 3c

Figure 6:
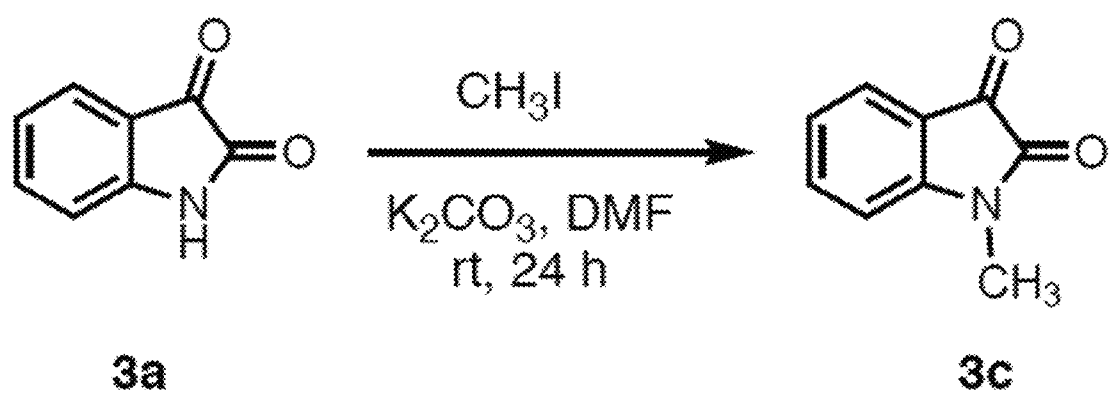
FIG. 6: Scheme 3, depiciting the non-limiting example synthesis of N-methyl isatin 3c.

The synthesis of N-methyl isatin 3c is depicted in FIG. 6.

N-methyl isatin derivative 3c was synthesized as follows. To a solution of isatin 3a (2.0 g, 13.6 mmol, 1.0 equiv) in dry DMF (40 mL) under $N_2$ atmosphere at room temperature, $K_2CO_3$ (3.7 g, 27.2 mmol, 2.0 equiv), and iodomethane (1.0 mL, 19.0 mmol, 1.4 equiv) were added. The resulting mixture was stirred at room temperature over 24 h. After the reaction, red solid precipitate formed was filtered, washed with water, and dried. The pure product 3c was recrystallized from ethanol (without using any chromatographic techniques).

3c

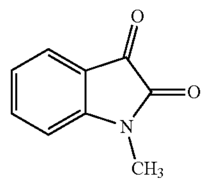

Figure 7A:
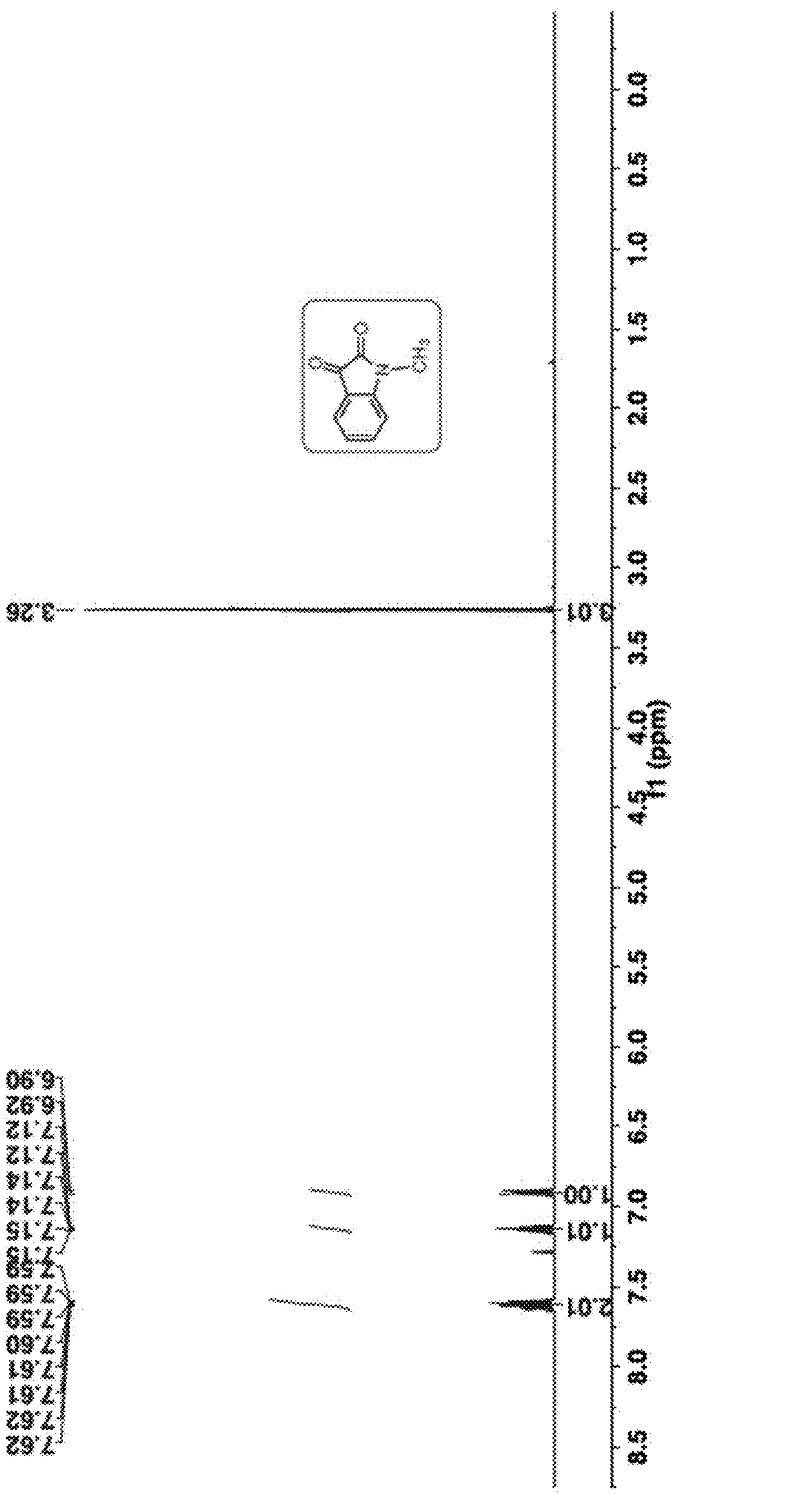
FIGS. 7A-7B: $^{1}H$ NMR spectrum (FIG. 7A) and $^{13}C$ NMR spectrum (FIG. 7B) of N-methyl isatin 3c.
Figure 7B:
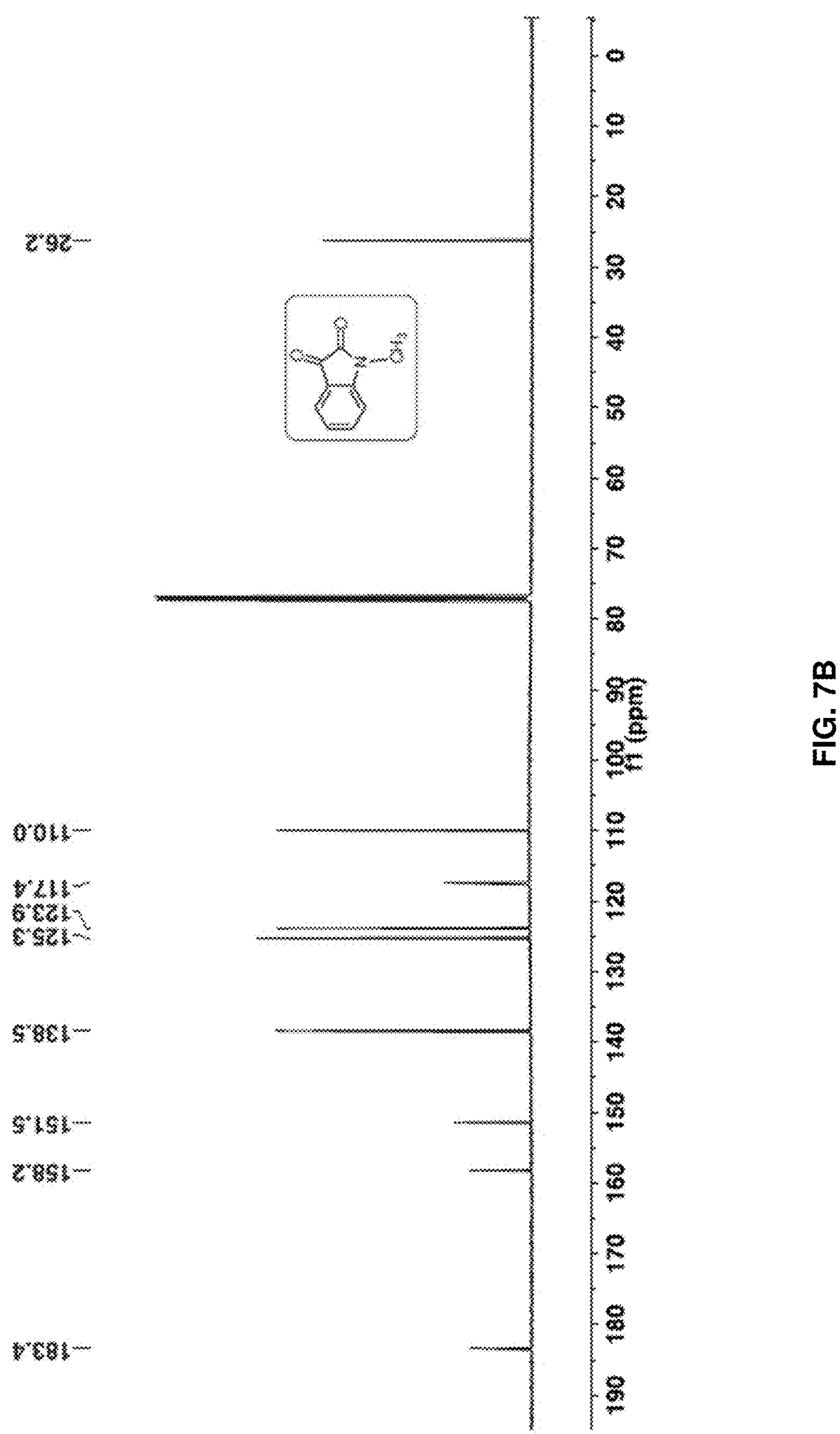

Yield=90%, $^1H$ NMR (500 MHz, $CDCl_3$, δ ppm) 7.64-7.58 (m, 1H), 7.14 (td, J=7.6, 0.8 Hz, 1H), 6.91 (d, J=7.9 Hz, 1H), 3.26 (s, 3H). $^{13}C$ NMR (125 MHz, $CDCl_3$, δ ppm) 183.4, 158.2, 151.5, 138.5, 125.3, 123.9, 117.4, 110.0, 26.2. FIG. 7A shows the $^1H$ NMR spectrum of 3c, and FIG. 7B shows the $^{13}C$ NMR spectrum of 3c.

Synthesis of N-Acetyl Isatin Derivative 3e

Figure 8:
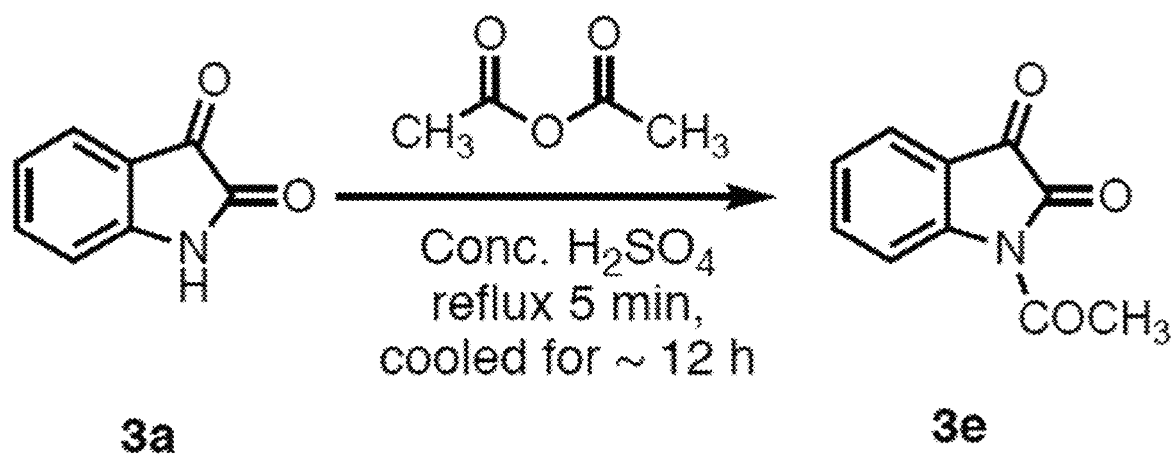
FIG. 8: Scheme 4, depicting the non-limiting example synthesis of N-acetyl isatin derivative 3e.

The synthesis of N-acetyl derivative 3e is depicted in FIG. 8.

Isatin 3a (2.0 g, 1 equiv) was dissolved in 20 mL of acetic anhydride and the reaction mixture was refluxed for ~5 min. The solution obtained was cooled in refrigeration for ~12 h and the crude solid product 3e formed was separated by vacuum filtration by washing with copious amount of water to remove the acid impurities. The bright reddish green product 3e formed was dried and used in the next step without any purification.

3e

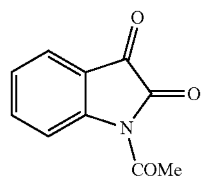

Figure 9A:
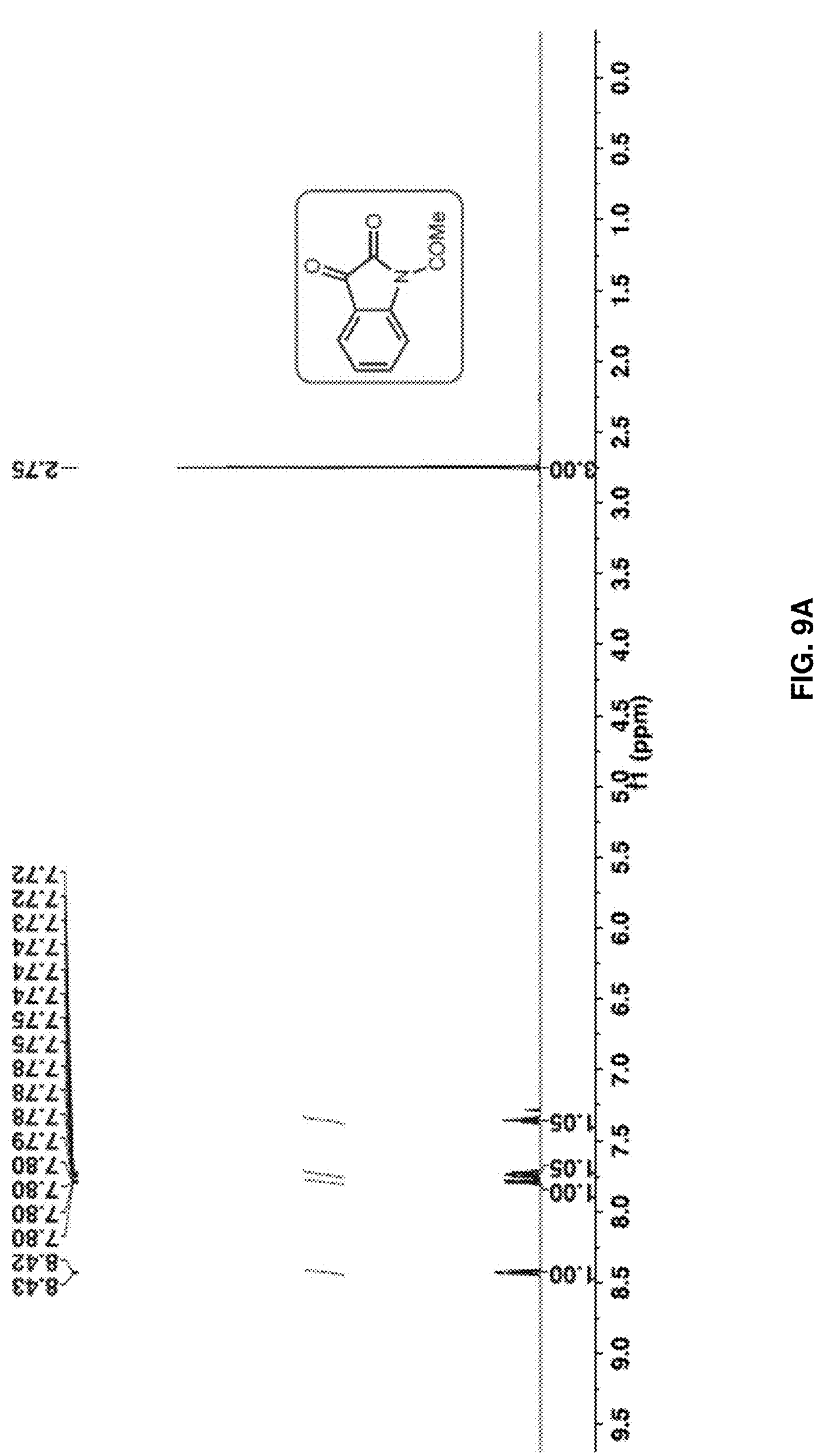
FIGS. 9A-9B: $^{1}H$ NMR spectrum (FIG. 9A) and $^{13}C$ NMR spectrum (FIG. 9B) of N-acetyl isatin derivative 3e.
Figure 9B:
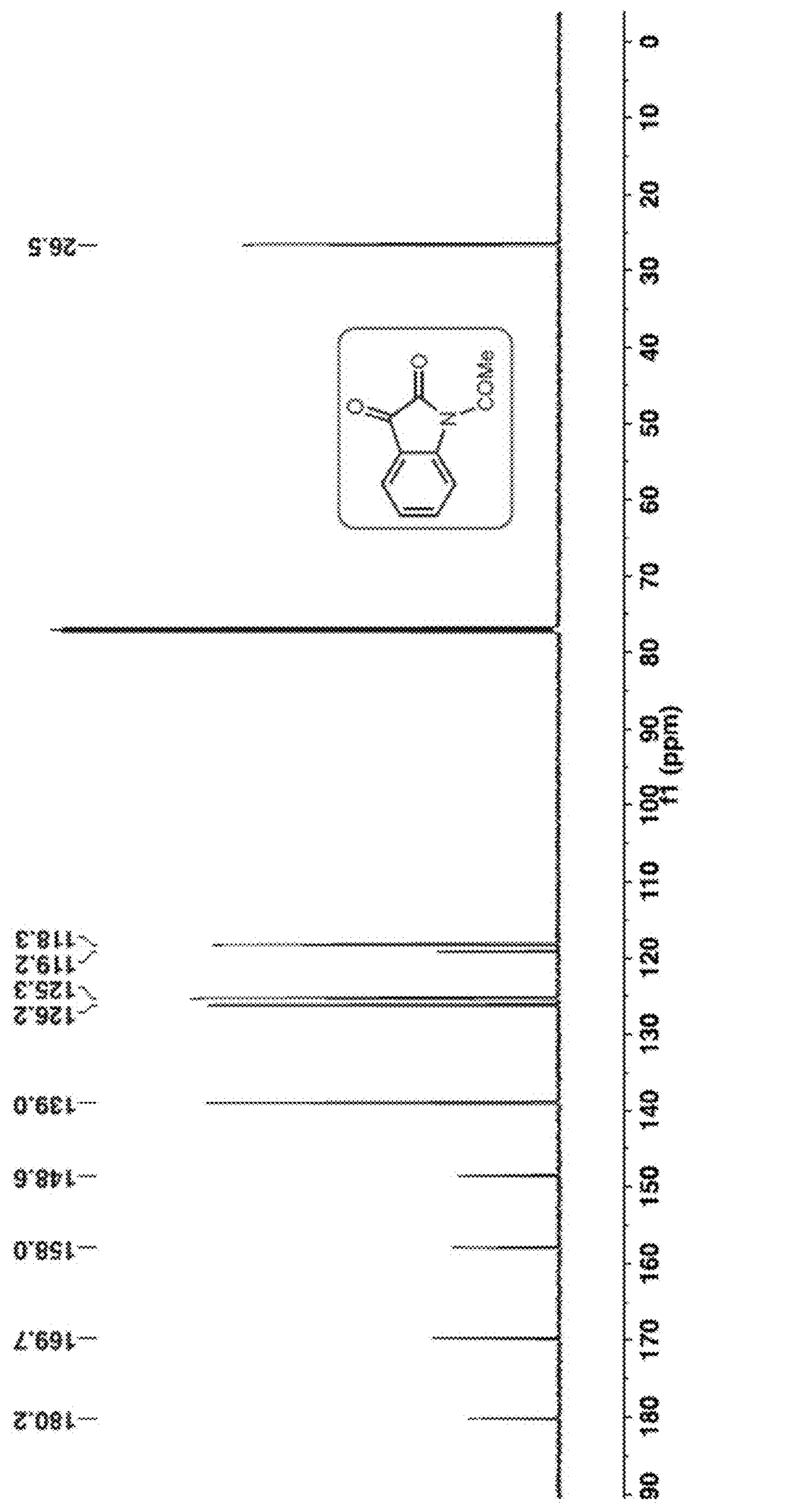

Yield=89%, $^1H$ NMR (500 MHz, $CDCl_3$, δ ppm) 8.43 (d, J=8.3 Hz, 1H), 7.79 (ddd, J=7.6, 1.4, 0.5 Hz, 1H), 7.74 (ddd, J=8.3, 7.6, 1.5 Hz, 1H), 7.36 (td, J=7.5, 0.8 Hz, 1H), 2.75 (s, 3H). $^{13}C$ NMR (125 MHz, $CDCl_3$, δ ppm) 180.2, 169.7, 158.0, 148.6, 139.0, 126.2, 125.3, 119.2, 118.3, 26.5. FIG. 9A shows the $^1H$ NMR spectrum of 3e, and FIG. 9B shows the $^{13}C$ NMR spectrum of 3e.

Synthesis of N-Benzoyl Isatin 3f

Figure 10:
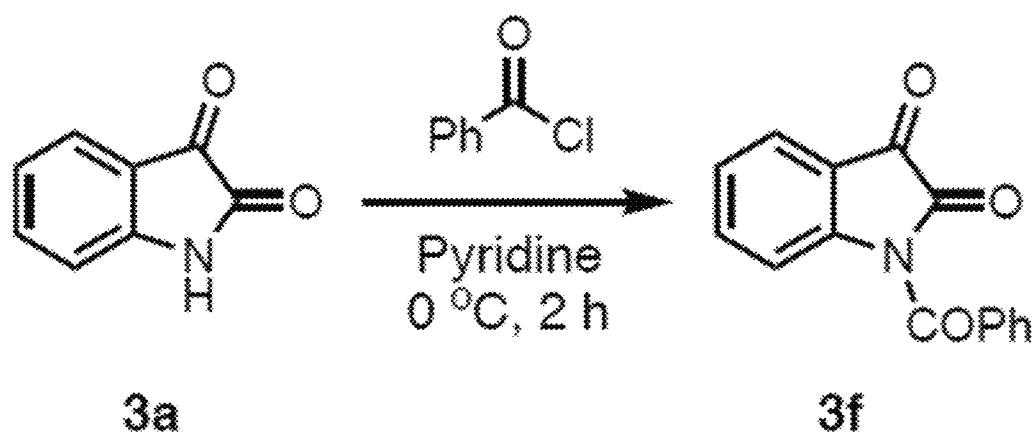
FIG. 10: Scheme 5, depicting the non-limiting example synthesis of N-benzoyl isatin derivative 3f.

The synthesis of N-benzoyl isatin 3f is depicted in FIG. 10.

Isatin 3a (2.0 g, 1.0 equiv, 13.5 mmol) was dissolved in 40 mL dry pyridine and cooled on an ice bath to 0° C. Benzoyl chloride (3.1 mL, 2.0 equiv, 27 mmol) was added dropwise to the stirred solution and stirred for ~2 h. The 2 h reaction mixture was poured onto crushed ice and a yellow colored compound was crashed out. The solid product 3f was filtered and dried under reduced pressure to yield pure N-benzoyl isatin derivative 3f.

3f

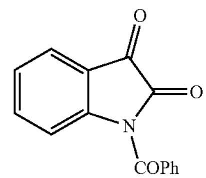

Yield=90%, $^1H$ NMR (500 MHz, $CD_2Cl_2$, δ ppm) 7.99 (dt, J=8.2, 0.7 Hz, 1H), 7.82-7.74 (m, 4H), 7.69-7.64 (m, 1H), 7.54-7.49 (m, 2H), 7.37 (td, J=7.6, 0.8 Hz, 1H). $^{13}C$ NMR (125 MHz, $CD_2Cl_2$, δ ppm) 180.5, 168.0, 157.0, 148.9, 138.8, 133.6 133.2, 129.7, 128.4, 126.0, 125.2, 119.3, 117.0.

Figure 11A:
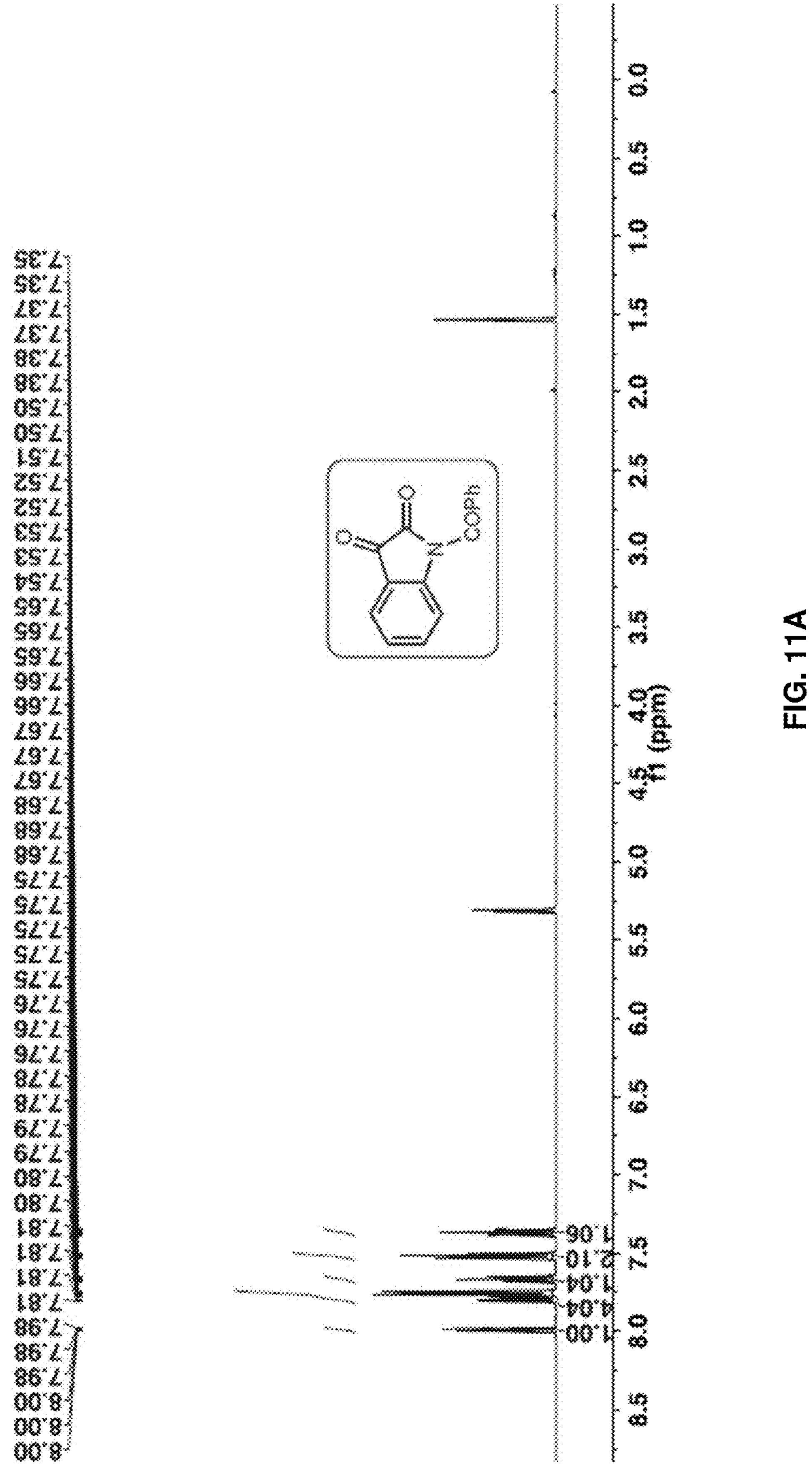
FIGS. 11A-11B: $^{1}H$ NMR spectrum (FIG. 11A) and $^{13}C$ NMR spectrum (FIG. 11B) of N-benzoyl isatin derivative 3f.
Figure 11B:
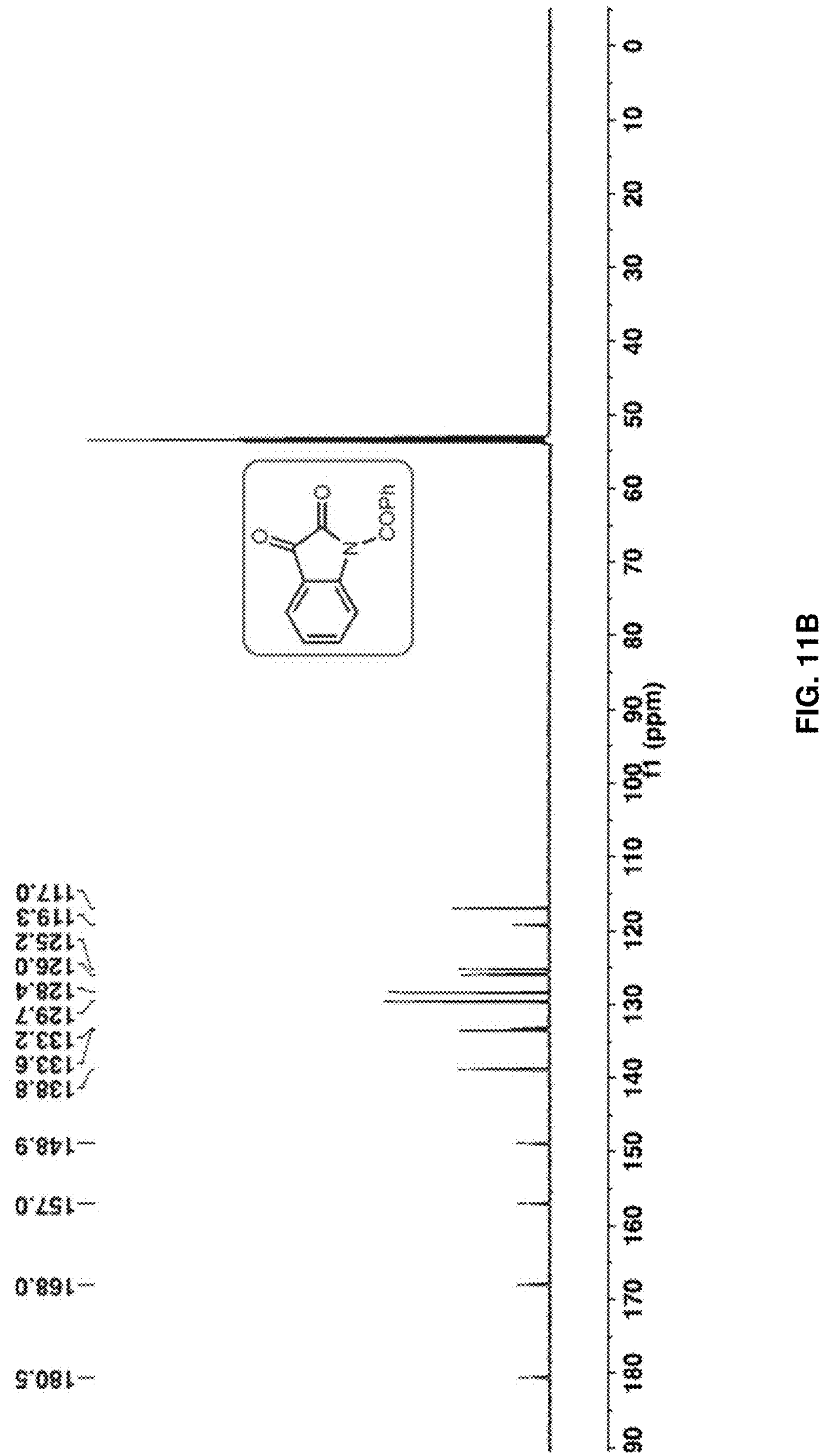

FIG. 11A shows the $^1H$ NMR spectrum of 3f, and FIG. 11B shows the $^{13}C$ NMR spectrum of 3f.

Synthesis of 2,5-Bis(Hydroxymethyl) furan 15

Figure 12:
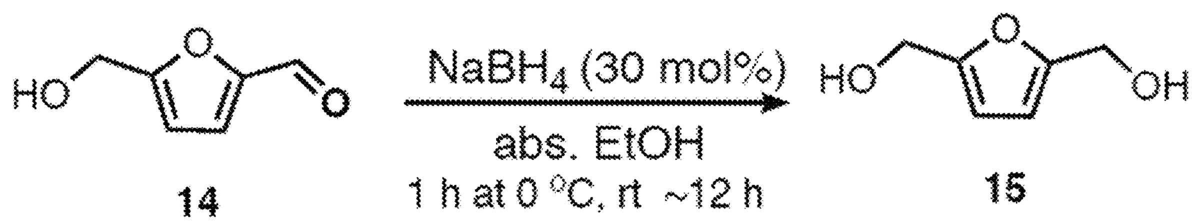
FIG. 12: Scheme 6, depicting the non-limiting example synthesis of 2,5-bis(hydroxymethyl) furan 15.

FIG. 12 shows the synthesis of 2,5-bis(hydroxymethyl) furan 15.

5-Hydroxymethylfurfural 14 (5.0 g, 1.0 equiv, 39.6 mmol,) was dissolved in 5 mL of absolute ethanol and the solution was cooled to 0° C. for ~10 min. Sodium borohydride (0.46 g, 12 mmol, 30 mol %) was added slowly to the cooled solution and allowed to stir on an ice bath for an hour. After 1 hour, the resultant mixture was warmed to room temperature and stirred for 12 h. Afterwards, ~5 g of silica gel was added to the reaction, and ethanol was removed under reduced pressure. The obtained solid slurry was used in flash chromatography with dichloromethane/methanol as mobile phase. 2,5-Dialkyl substituted furan ring was detected by a 225 nm detection mode in the instrument. A yellowish viscous liquid was obtained after the removal of solvent and a white powder material was formed upon addition of diethyl ether.

15

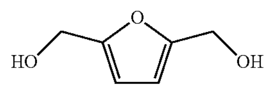

Figure 13A:
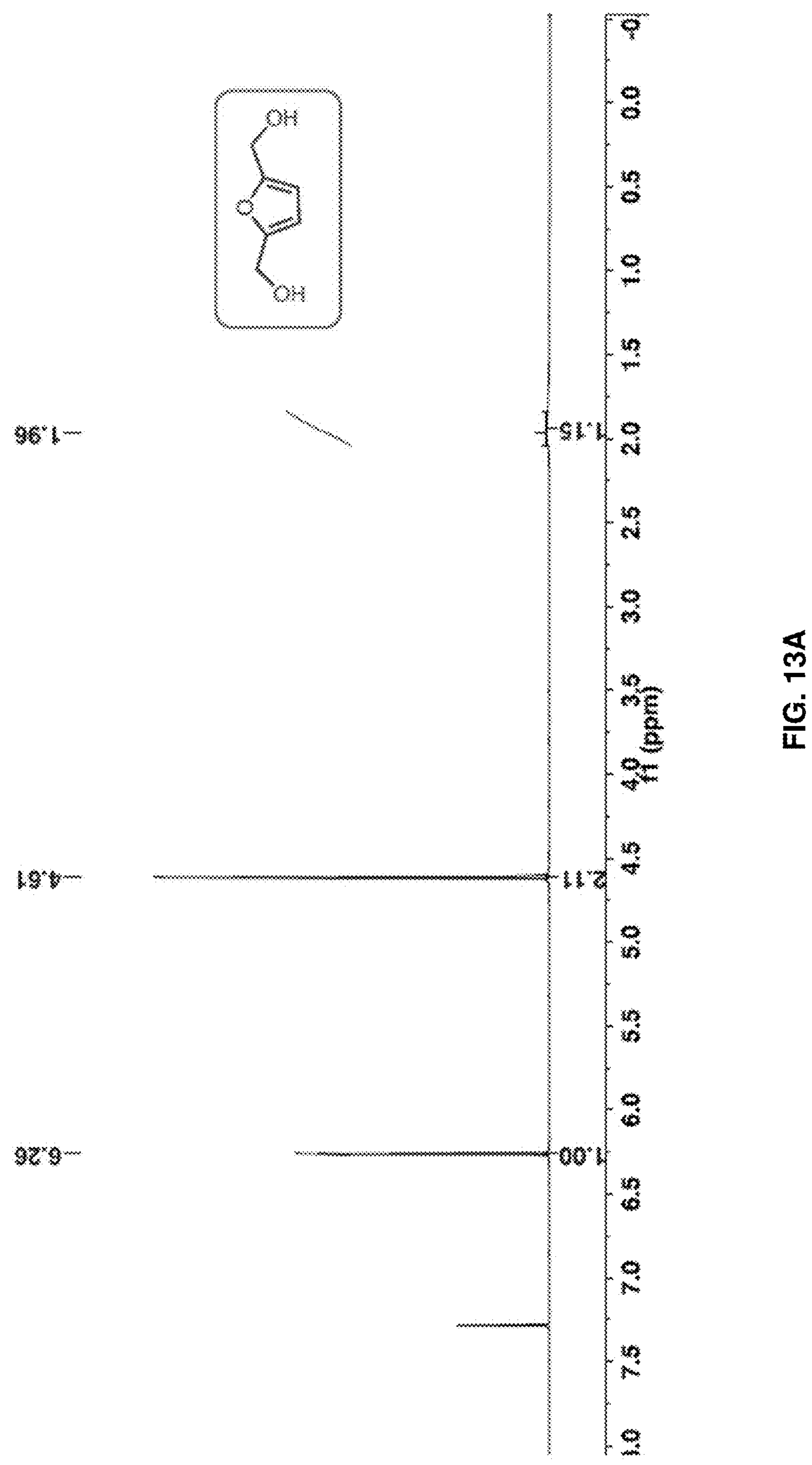
FIGS. 13A-13B: $^{1}H$ NMR spectrum (FIG. 13A) and $^{13}C$ NMR spectrum (FIG. 13B) of 2,5-bis(hydroxymethyl) furan 15.
Figure 13B:
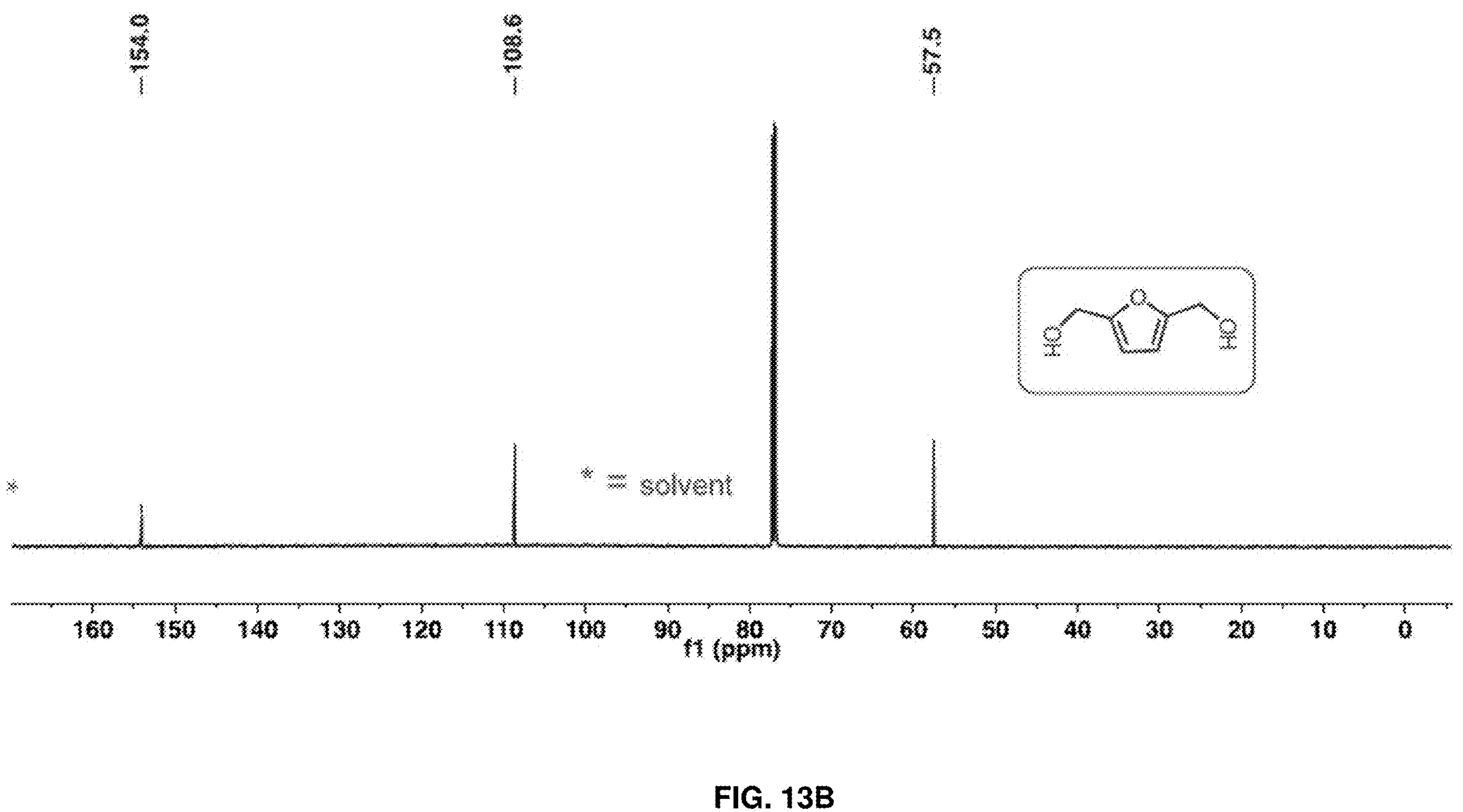

$R_f$=0.36 (95% Dichloromethane: 5% Methanol), Yield=82%, $^1H$ NMR (500 MHz, $CDCl_3$, δ ppm) 6.26 (s, 1H), 4.61 (s, 2H), 1.96 (s, 1H). $^{13}C$ NMR (125 MHz, $CDCl_3$, δ ppm) 154.0, 108.6, 57.5. FIG. 13A shows the $^1H$ NMR spectrum of 15, and FIG. 13B shows the $^{13}C$ NMR spectrum of 15.

Synthesis of Furfuryl Dimethacrylate Monomer 6

Figure 14:
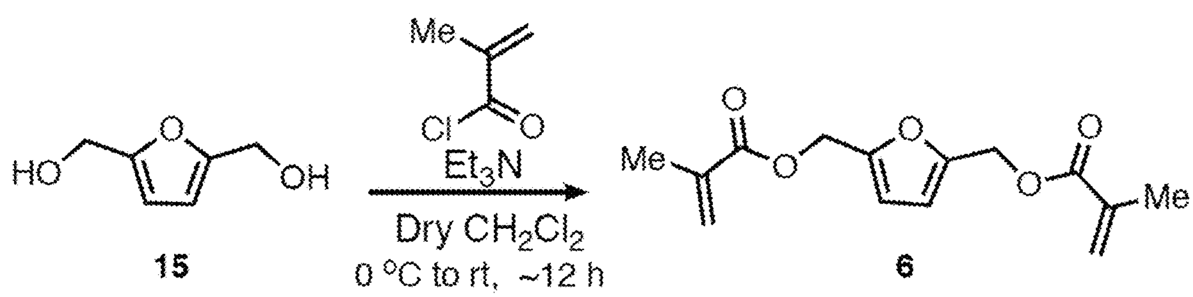
FIG. 14: Scheme 7, depicting the non-limiting example synthesis of furfuryl dimethacrylate monomer 6.

FIG. 14 depicts the synthesis of furfuryl dimethacrylate monomer 6.

2,5-Bis(hydroxymethyl) furan 15 (4.0 g, 1.0 equiv, 40 mmol) was dissolved in 100 mL dry dichloromethane and cooled to 0° C. Triethylamine (8.5 mL, 60 mmol) was added dropwise to the cooled solution and stirred for ~1 h. Methacryloyl chloride (5.9 mL, 60 mmol) was added dropwise to the reaction mixture and was slowly warmed to room temperature and continued stirring for 12 h. Byproduct amine salts were removed by vacuum filtration and the filtrate was washed 3×20 mL of water and 2×10 mL of NaCl solution. The combined organic layer was dried over anhydrous $Na_2SO_4$ and solvent was removed under reduced pressure to get the crude product. The crude product was purified by column chromatography with Hex: EA (10:1) to give oily product 6.

6

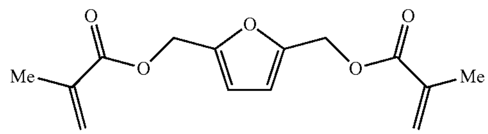

Figure 15A:
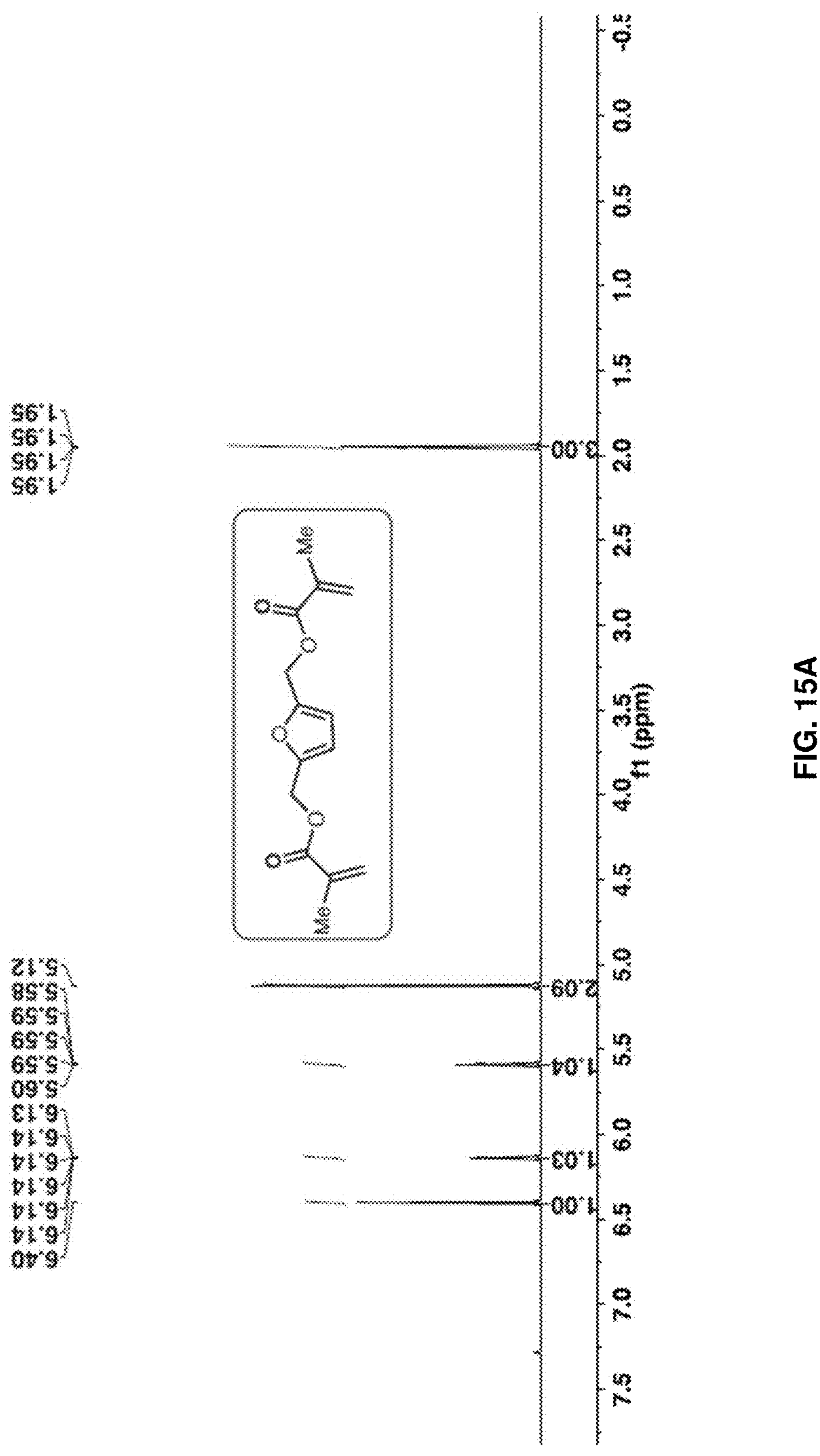
FIGS. 15A-15B: $^{1}H$ NMR spectrum (FIG. 15A) and $^{13}C$ NMR spectrum (FIG. 15B) of furfuryl dimethacrylate monomer 6.
Figure 15B:
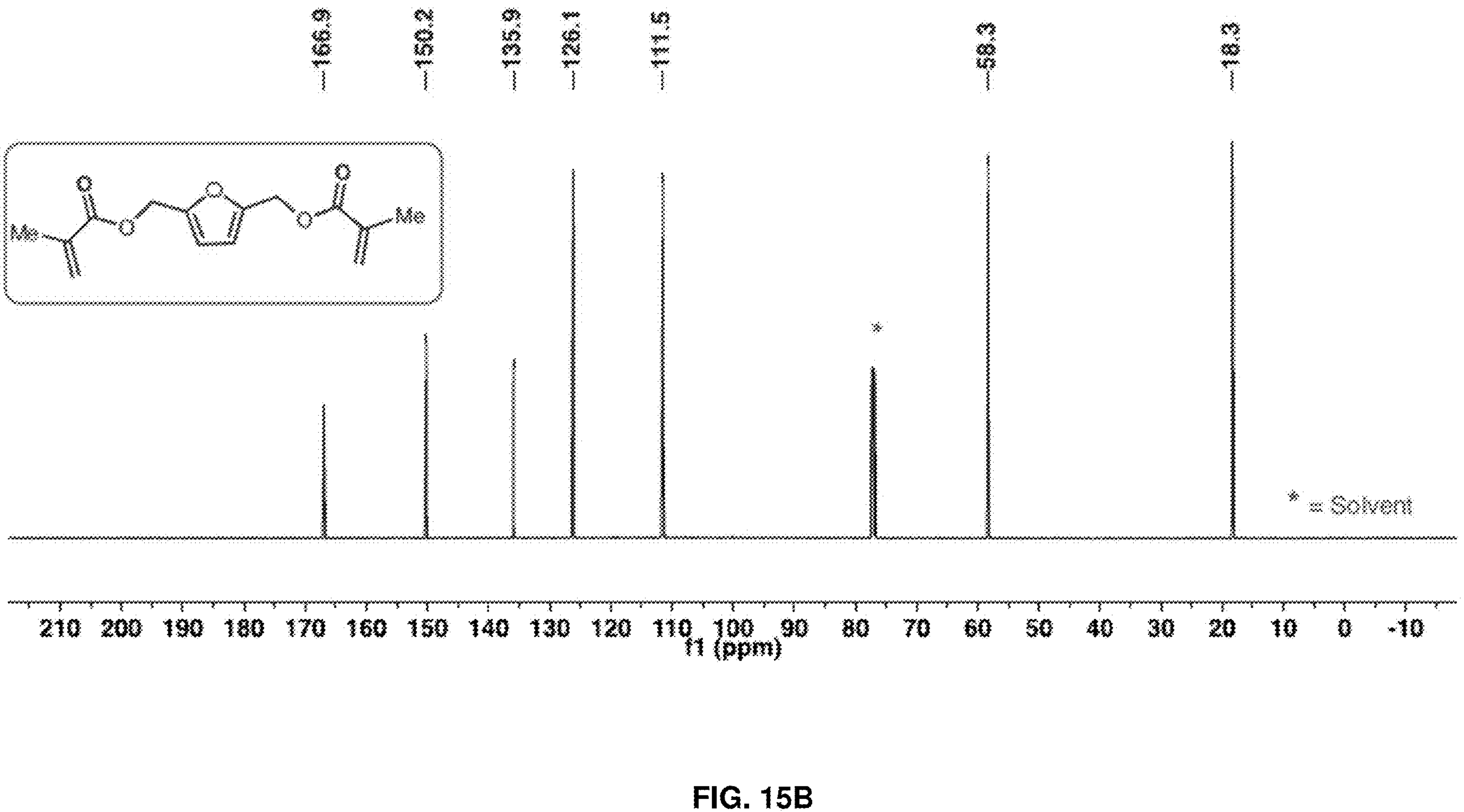

$R_f$=0.4 (85% hexanes: 15% ethyl acetate), Yield=60%, $^1$H NMR (500 MHz, $CDCl_3$, δ ppm) 6.40 (s, 1H), 6.14 (dq, J=1.9, 0.9 Hz, 1H), 5.59 (p, J=1.6 Hz, 1H), 5.12 (s, 2H), 1.95 (dd, J=1.6, 1.0 Hz, 3H). $^{13}$C NMR (126 MHz, $CDCl_3$, δ ppm) 166.9, 150.2, 135.9, 126.1, 111.5, 58.3, 18.3. FIG. 15A shows the $^1$H NMR spectrum of 6, and FIG. 15B shows the $^{13}$C NMR spectrum of 6.

Photophysical Studies

Figure 16:
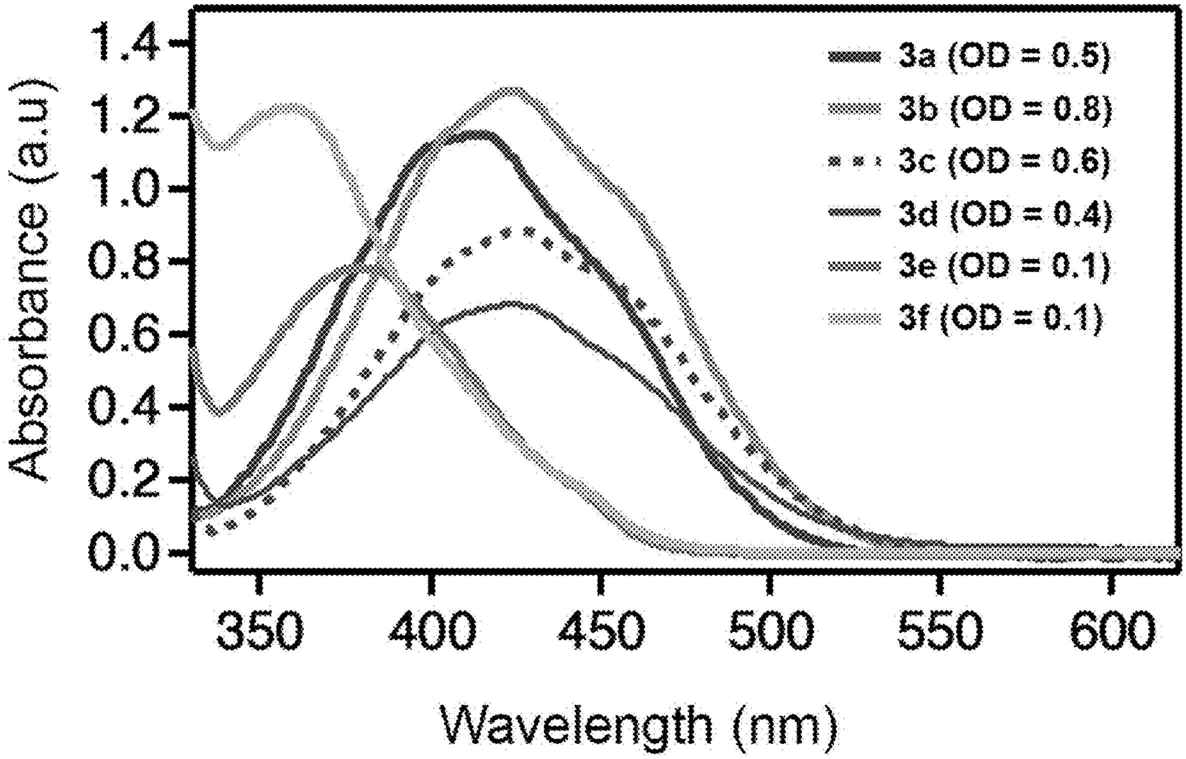
FIG. 16: U-Vis absorption spectra of isatin photoinitiators 3a-3f at a concentration of 150 μM in MeCN.

FIG. 16 shows UV-Vis absorption spectra of isatin photoinitiators 3a-3f at a concentration of 150 UM in MeCN.

Figure 17:
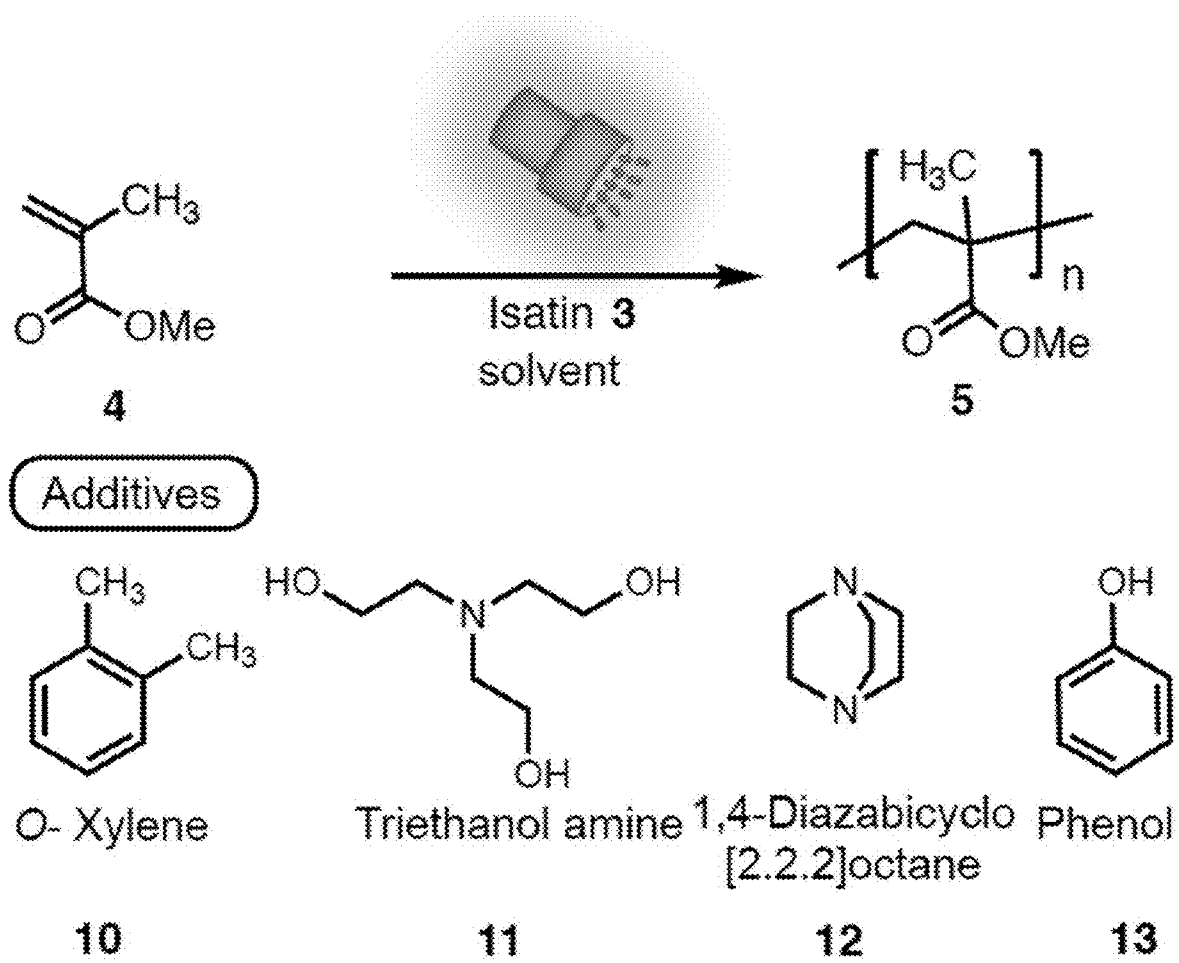
FIG. 17: Scheme 8, depicting the photopolymerization of methylmethacrylate 4 with isatin photoinitiators to produce polymer 5.

Photopolymerization of Methylmethacrylate Using Isatin Derivatives Under Visible Light Irradiation FIG. 17 shows the photopolymerization of methylmethacrylate 4 with isatin photoinitiators.

Methylmethacrylate monomer 4 was freshly distilled and stored under inert atmosphere before the reaction was employed. Photopolymerization of 4 was performed with isatin photoinitiators 3a-3f with co-initiators 10-13 in MeCN/toluene. A solution of photoinitiator 3, co-initiator 11-13 (equimolar with photoinitiator) in $CH_3CN$, or 10 as solvent was employed for photopolymerization. The total volume of the polymerization reaction was =3 mL (1 mL of Monomer, 1 mL of photoinitiator, and 1 mL of co-initiator). The reaction mixture was prepared in septum sealed pyrex test tube and degassed with $N_2$ for 15 min to remove dissolved oxygen. Blue LED strip illumination was employed for the reaction with a flux density of 1.27 mW/cm2 (LED jar) and Ee=Flux density (mW/cm2) measured by Thor PM100D power meter console using S121C photodiode power sensor by keeping the sample at a distance of ~3 cm from the light source. After the photoreaction, the samples were quenched with 30 mL of cold methanol, the turbid polymers were filtered by employing buchner funnel vacuum filtration, and the polymers were dried in vacuum over at ~35° C. for ~24 h.

Photopolymerization of Dimethyl Methacrylate 6 and 8 with 3e

Figure 4:
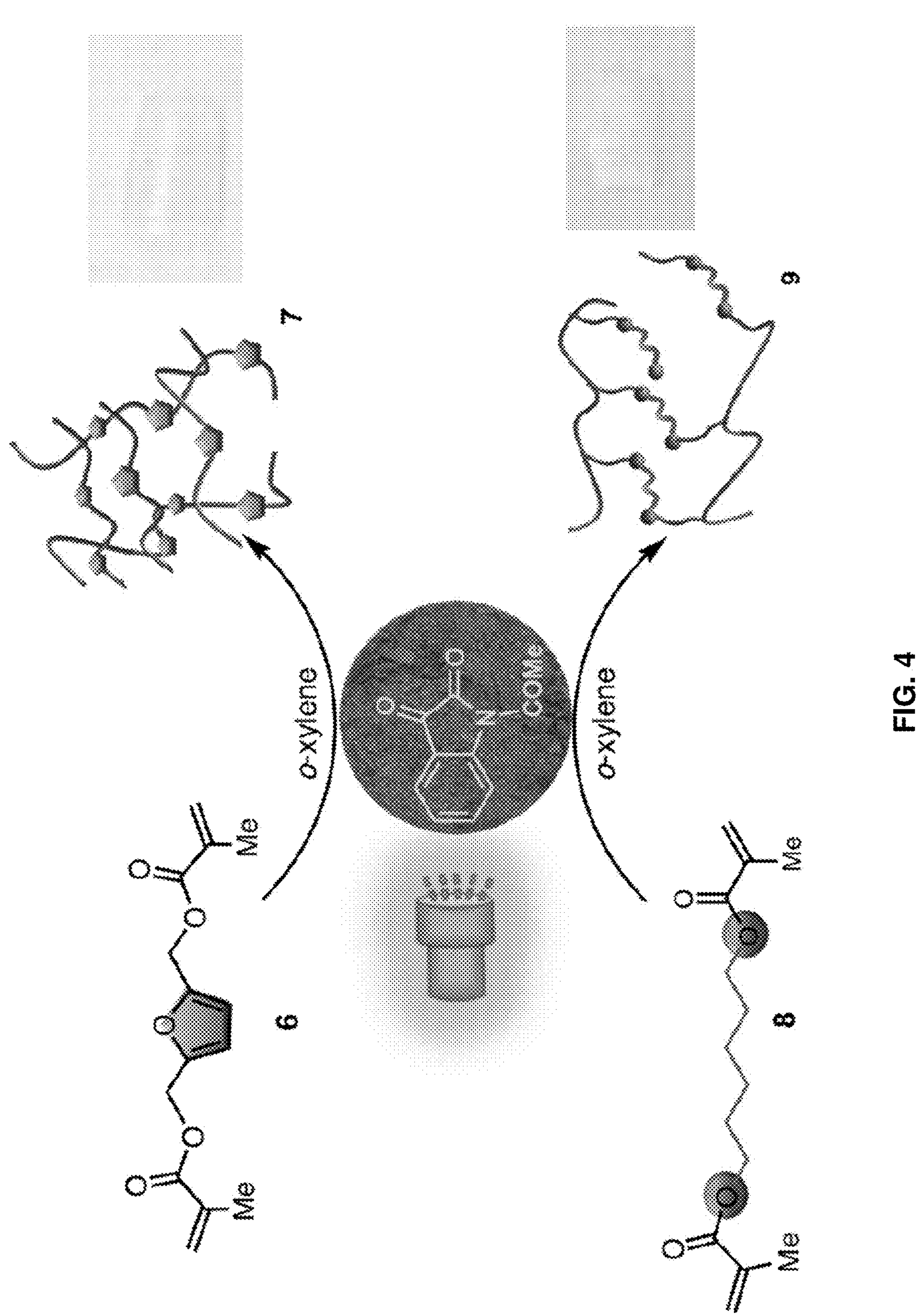
FIG. 4: Scheme 2, showing isatin derivative 3e-mediated photopolymerization of 6 and 8.

FIG. 4 depicts the photopolymerization of dimethyl methacrylate 6 and 8 with isatin photoinitiators.

In a silicon mold, a 50-50% blend of monomer 6 or 8 and 3e in o-xylene was placed and the samples were irradiated by blue LED for 3 h. After the photoreaction, the solvent was removed by placing the cross-linked polymer product in vacuum dry oven.

Gel Permeation Chromatography (GPC) Analysis for Acrylate Polymers

Table 1 above displays the GPC analysis for 4 with various photoinitiators 3a-3f of methylmethacrylate 4.

Figure 18A:
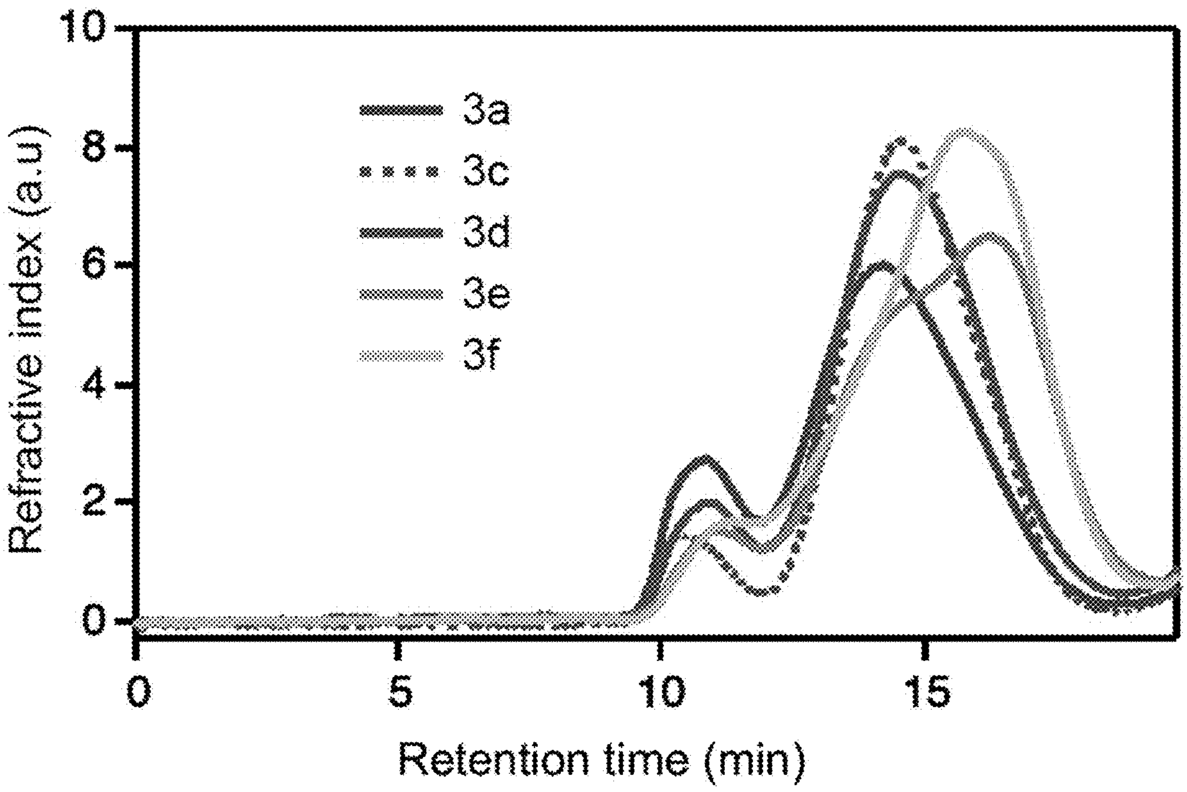
FIGS. 18A-18B: GPC traces for 5, when 10 was used as solvent/co-initiator (FIG. 18A), and when 11 was used as co-initiator in MeCN (FIG. 18B) and blue LED irradiation.
Figure 18B:
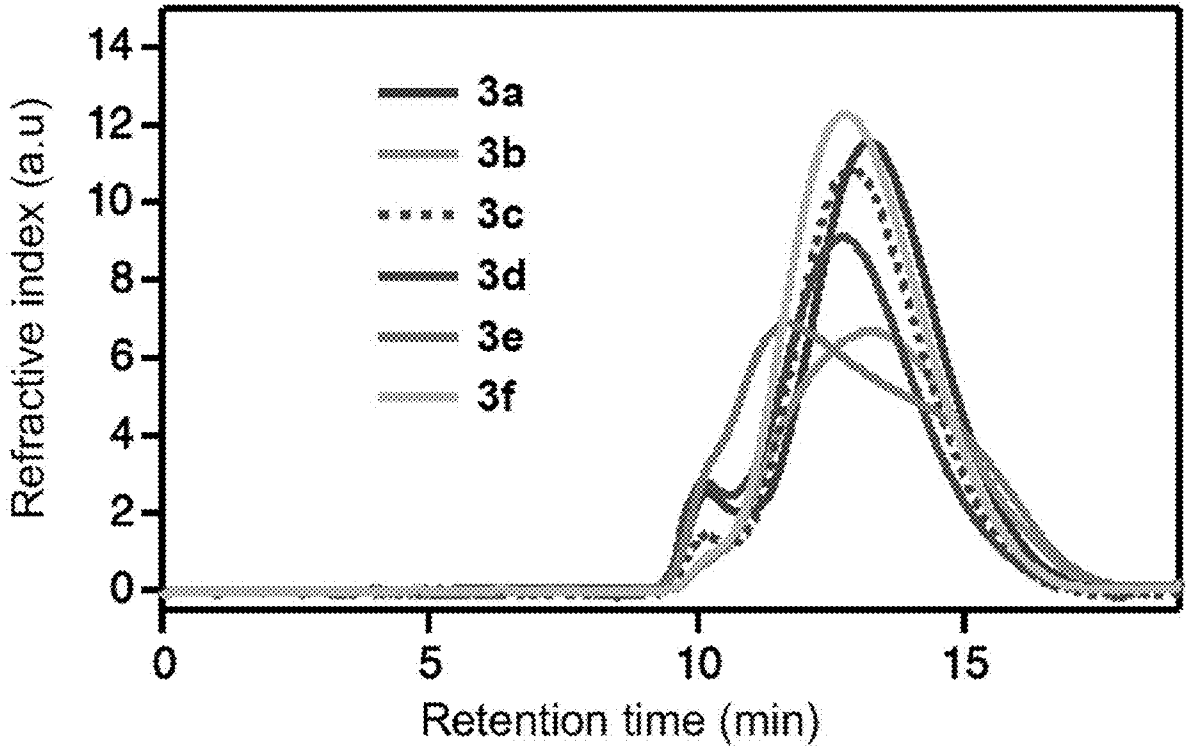

FIGS. 18A-18B show GPC traces for 5, when 10 was used as solvent/co-initiator (FIG. 18A), and when 11 was used as co-initiator in MeCN (FIG. 18B) and blue LED irradiation.

Table 3 above shows the GPC analysis of isatin photoinitiators for acrylate polymerization using purple LED.

Figure 19:
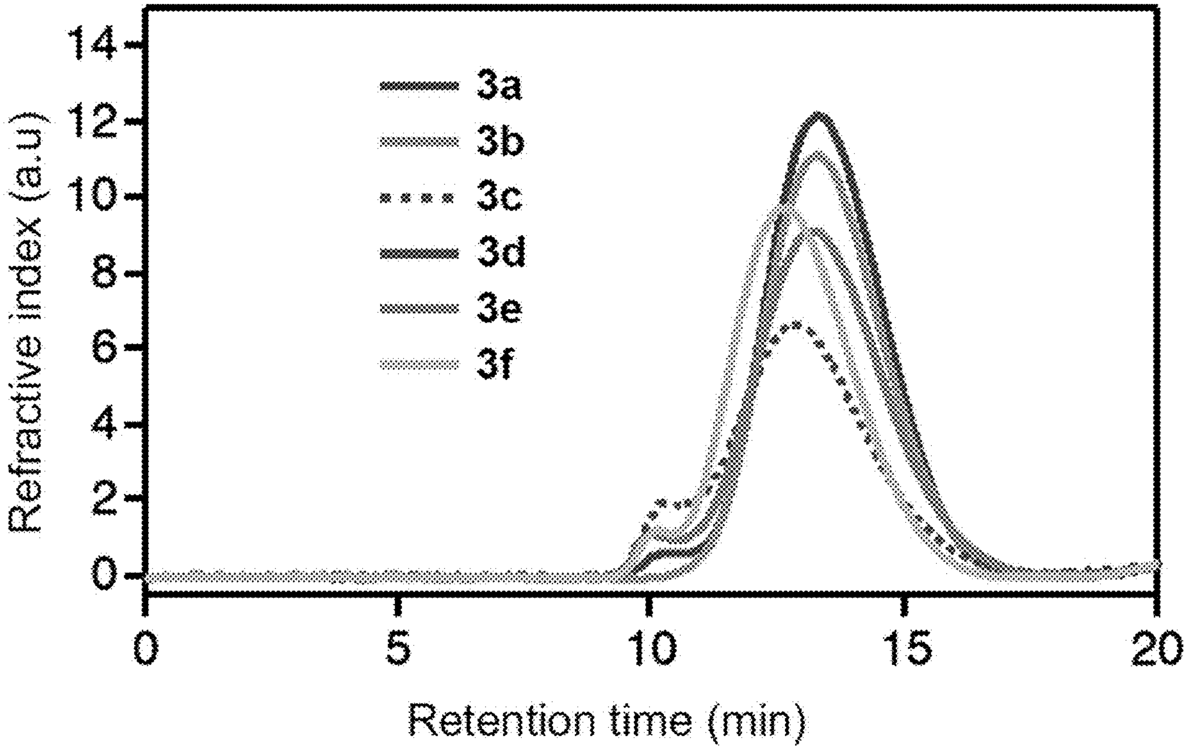
FIG. 19: GPC traces for 5 when 11 is used as co-initiator in MeCN and purple LED irradiation.

FIG. 19 shows GPC traces for 5 when 11 is used as co-initiator in MeCN and purple LED irradiation.

Certain embodiments of the compositions and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A photoinitiator comprising a composition, wherein the composition comprises a compound of Formula III, Formula IP-1, Formula IP-2, Formula IP-3, or Formula IP-10:

Formula III

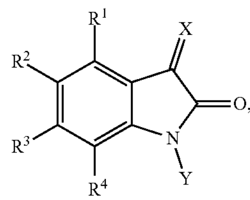

Formula IP-1

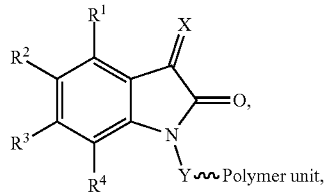

Formula IP-2

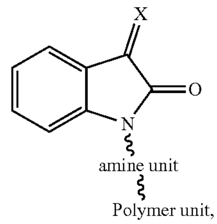

Formula IP-3

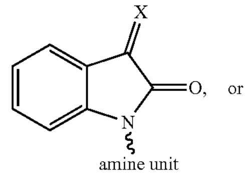

or

Formula IP-10

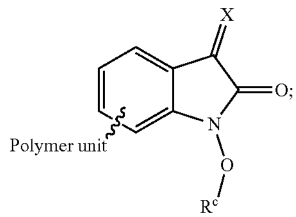

wherein:

X is O, S, NH, Ge, NC(O)—O—$R^C$, N—O—C(O)$R^C$, or NO—$R^C$, wherein each $R^C$ is independently alkyl, aryl, or heteroaryl; and each of $R^1$, $R^2$, $R^3$, $R^4$, and Y is, independently, H, alkyl, alkene, alkynes, aryl, heterocyclic, alkenyl halide, unsaturated enone, unsaturated ketone, unsaturated amide, unsaturated alcohol, unsaturated amine, unsaturated thiol, phosphonate, carboxylate, sulfonate, nitrile, thioether, thioamide, thioketone, azide, sulfide, disulfide, ether, epoxide, nitrate, nitrite, a nitro compound, a nitroso compound, an alkyl ketoesters, an acylgermane, a metallocene, an organosilane, an oxime, an imide, a cyanate, an isocyanate, a thiocyanate, an isothiocyanate, a sulfoxide, a sulfone, a sulfite, a phosphite, a thial, a phosphine, or an aldehyde;

the polymer unit is vinyl, stryl, acryl, or a cyclic monomer selected from lactones, epoxides, lactides, lactams, silicon-containing cyclic monomers, and cyclic carbonates; and the amine unit is an amine, thiol, or any hydrogen atom donor;

provided, however, that the compound is not isatin.

2. A photoinitiator comprising a composition comprising Formula A:

Formula A

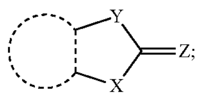

wherein:

dashed lines represent a linker that links X to Y and comprises an alkyl chain, a carbocycle, a heterocyclic moiety, or a combination of C—C or C-heteroatom bonds, optionally substituted with one or more halogens, Y is C═O, C═S, $NR^1$, $P(R^2)_2$, $PR^1R^2$, S, or Se, X is C═O, C═S, $NR^1$, $P(R^2)_2$, or $PR^1R^2$, S, or Se, Z is O, S, or Se, each $R^1$ is, independently, H, alkyl, aryl, aryloxy, alkoxy, or halo-substituted alkoxy, and each $R^2$ is, independently, H, O, alkyl, aryl, aryloxy, alkoxy, N-alkyl, halo-substituted alkoxy, or halo-substituted N-alkyl;

provided, however, that at least one of X or Y is C═O; and further provided that when the linker is phenyl, neither Y nor X is NH.

3. The composition of claim 2, wherein:

X is $NR^1$; and $R^1$ is selected from the group consisting of alkyl, aryl, methoxy, phenoxy, and fluoro-substituted methoxy.

4. The composition of claim 2, wherein the composition has formula B:

Formula B

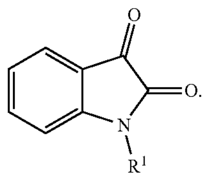

5. The composition of claim 2, wherein the linker comprises an aryl group.

6. The composition of claim 2, wherein the composition comprises N-methyl isatin 3c, N-aryl isatin 3d, N-acetyl isatin 3e, N-benzoyl isatin 3f, or N-trifluoromethyl isatin 3g:

3c

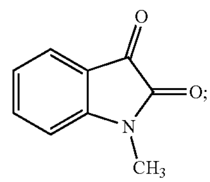

3d

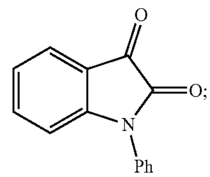

3e

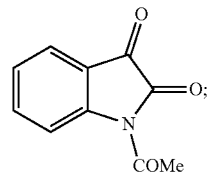

3f

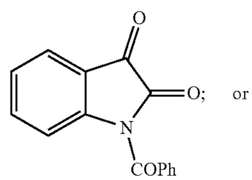

or

3g

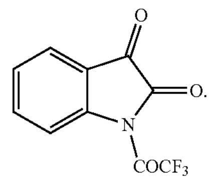

7. The composition of claim 1, wherein the compound is compound IP-1a, compound IP-1c, compound IP-1d, compound IP-1e, or Formula IP-1b:

IP-1a

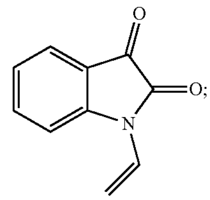

-continued
IP-1c
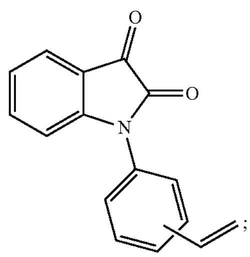
IP-1d
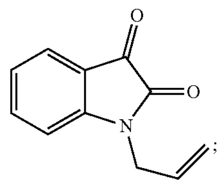
IP-1e
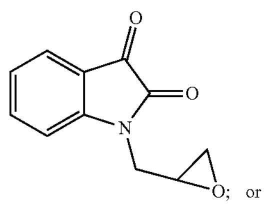
or
Formula IP-1b
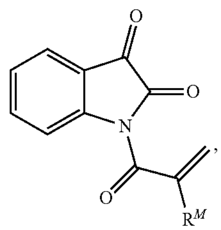
wherein $R^M$ is alkyl, aryl, heteroaryl, alkoxy, carboxy alkyl, or an amide.
8. The composition of claim 7, wherein the compound is compound IP-1f, compound IP-1g, or compound IP-1h:
IP-1f
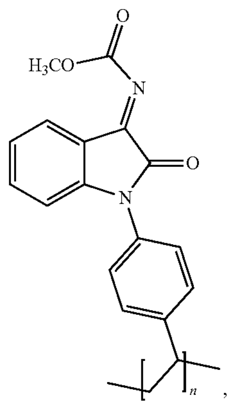
wherein n is an integer;
IP-1g
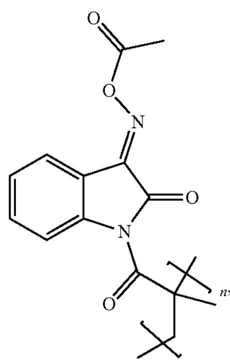
wherein n is an integer; or
IP-1h
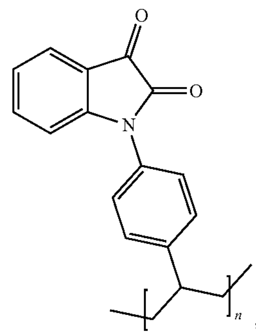
wherein n is an integer; or
IP-1i
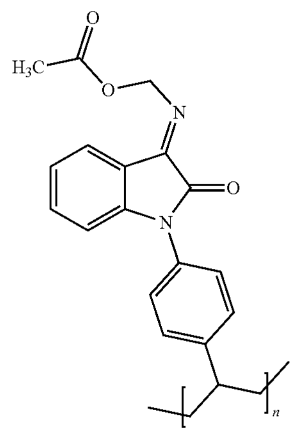
wherein n is an integer.

9. The composition of claim 1, wherein the compound is compound IP-2a, compound IP-2b, compound IP-2c, compound IP-2d, compound IP-2e, compound IP-2f, compound IP-2g, compound IP-3a, or compound IP-3b:
IP-2a
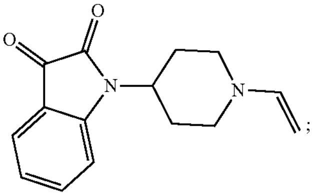
IP-2b
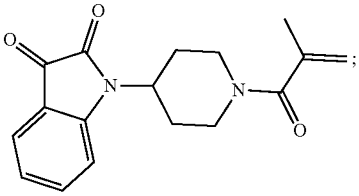
IP-2c
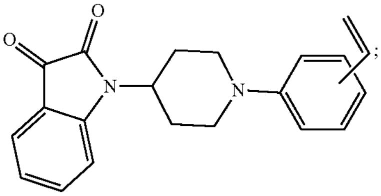
IP-2d
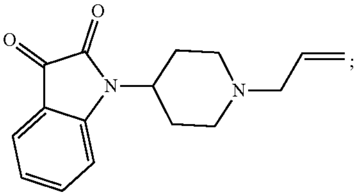
IP-2e
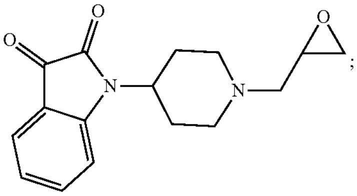
IP-2f
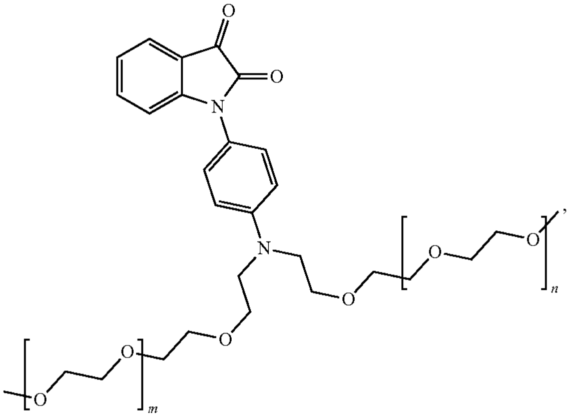
wherein m and n are each integers; or
IP-2g
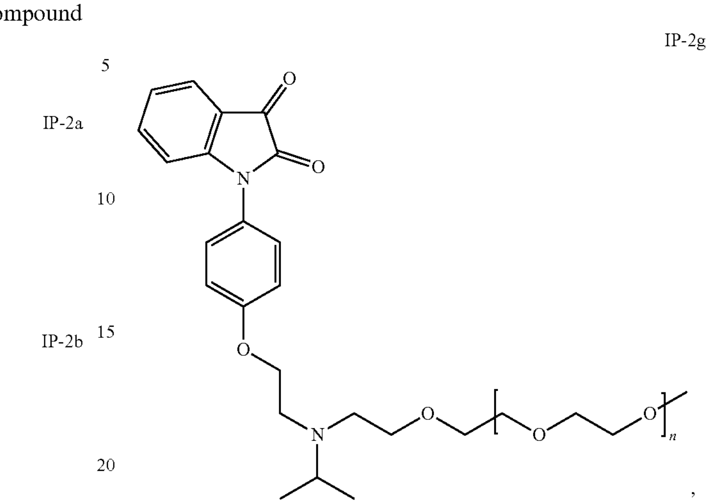
wherein m and n are each integers;
IP-3a
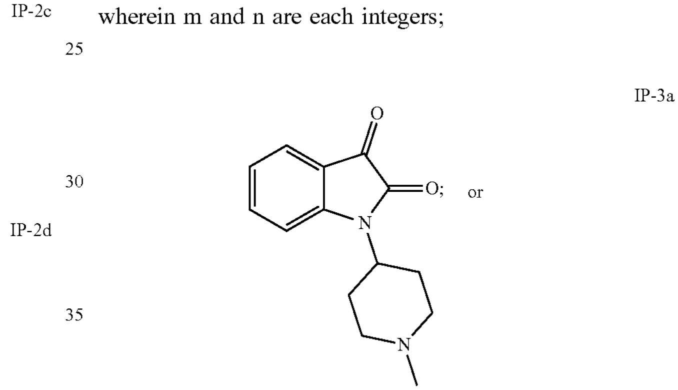
IP-3b
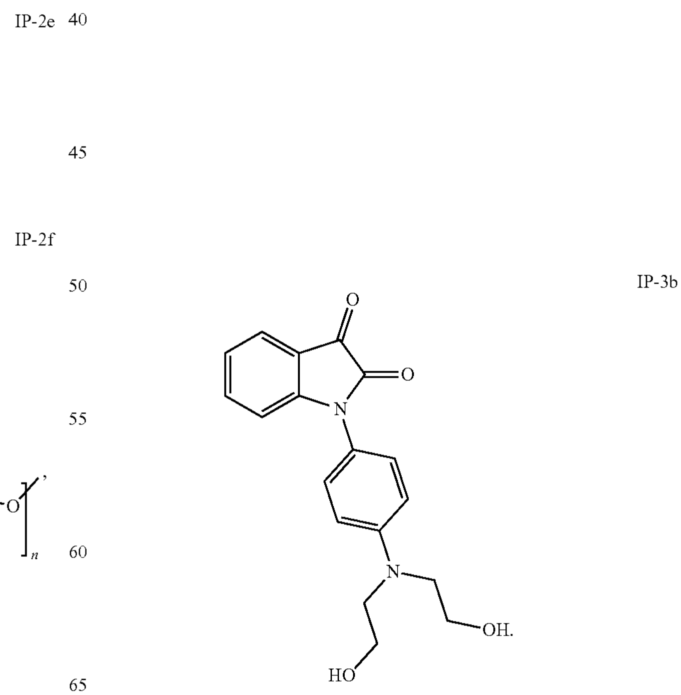

10. The composition of claim 1, comprising a compound of Formula IP-4, Formula IP-5, Formula IP-6, Formula IP-7, Formula IP-8, or Formula IP-9:

Formula IP-4

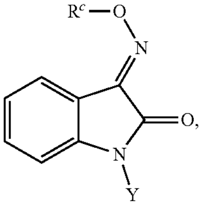

Formula IP-5

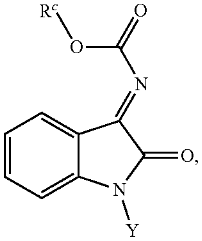

Formula IP-6

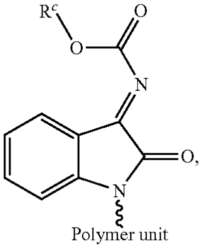

Formula IP-7

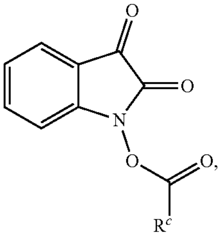

Formula IP-8

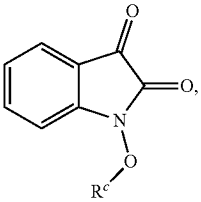

or

Formula IP-9

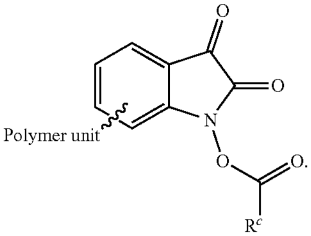

11. The composition of claim 10, wherein the compound is compound IP-4a, compound IP-4b, compound IP-5a, compound IP-5b, compound IP-5c, compound IP-6a, compound IP-6b, compound IP-7a, compound IP-7b, compound IP-7c, compound IP-7d, compound IP-7e, compound IP-8a, compound IP-8b, compound IP-9a, or compound IP-9b:

IP-4a

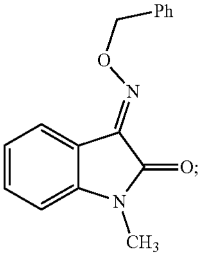

IP-4b

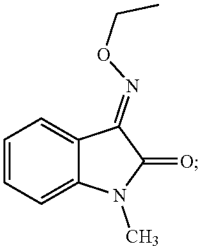

IP-5a

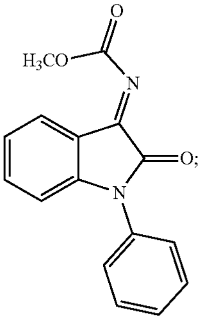

IP-5b

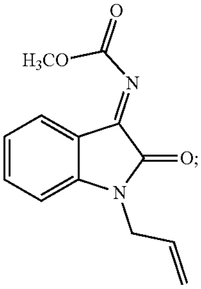

IP-5c

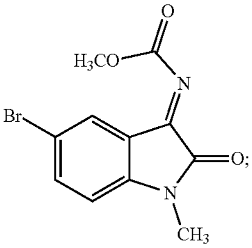

-continued
IP-6a
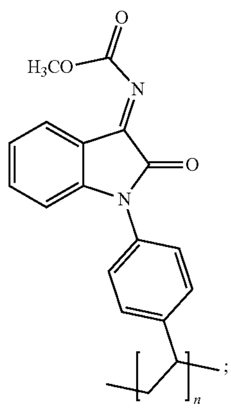
IP-6b
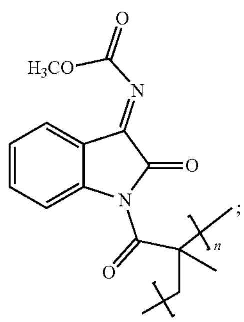
IP-7a
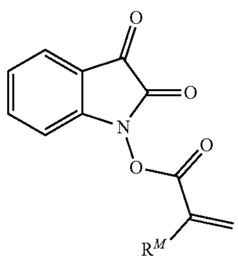
IP-7b
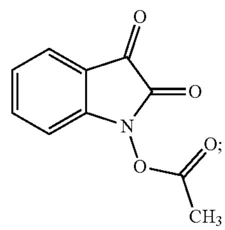
IP-7c
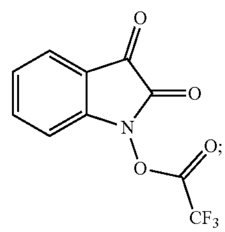
-continued
IP-7d
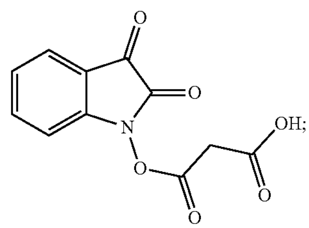
IP-7e
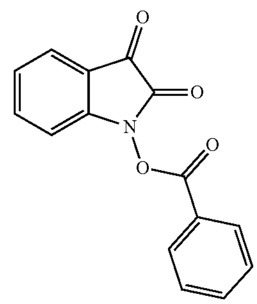
IP-8a
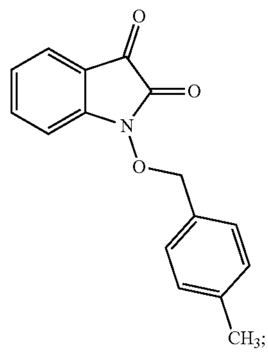
IP-8b
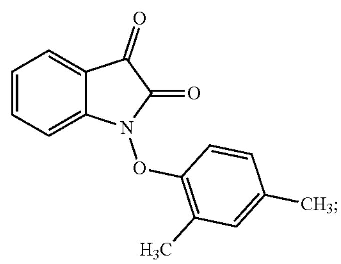
IP-9a
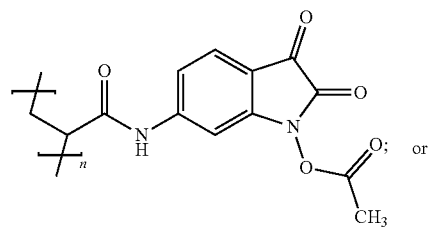
or
IP-9b
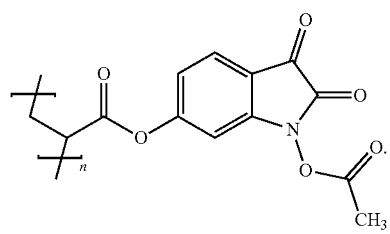

12. The composition of claim 1, wherein the compound is compound IP-10a or compound IP-10b:

IP-10a

, or

IP-10b

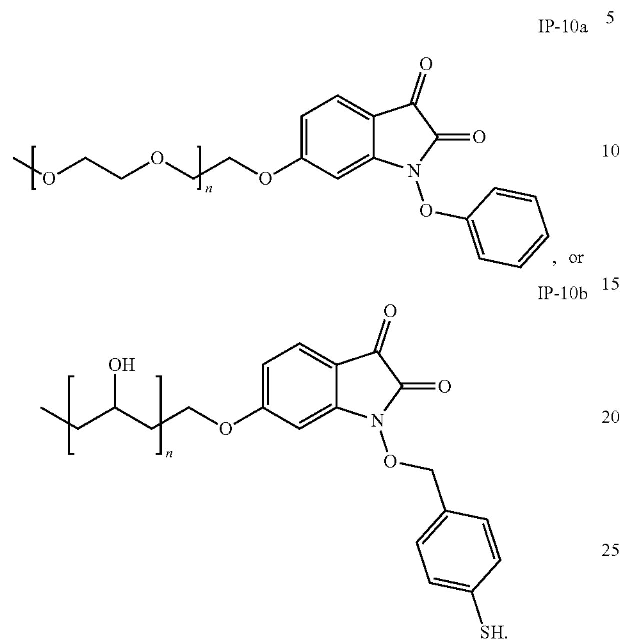

13. A method for making a polymer, the method comprising exposing a photoinitiator and a monomer to light to produce a polymer, wherein the photoinitiator is an N-substituted isatin derivative.

14. The method of claim 13, wherein the photoinitiator has Formula B:

Formula B

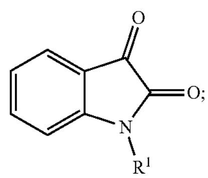

wherein $R^1$ is alkyl, aryl, aryloxy, alkoxy, or halo-substituted alkoxy.

15. The method of claim 13, wherein the polymer is colorless or transparent.

16. The method of claim 13, wherein the photoinitiator comprises isatin 3c, isatin 3d, isatin 3e, isatin 3f, or isatin 3g:

3c

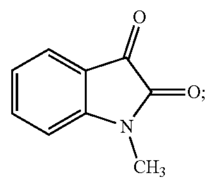

-continued

3d

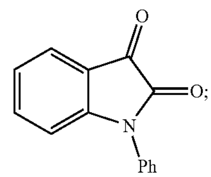

3e

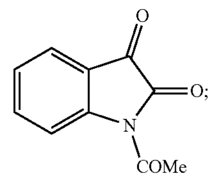

3f

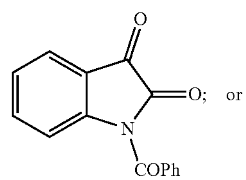

or

3g

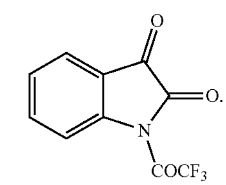

17. The method of claim 13, wherein the photoinitiator is prepared from biomass.

18. The method of claim 13, wherein the light is visible light.

19. The method of claim 13, wherein the monomer is methylmethacrylate 4, furfuryl dimethacrylate monomer 6, or dimethylmethacrylate monomer 8:

4

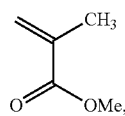

6

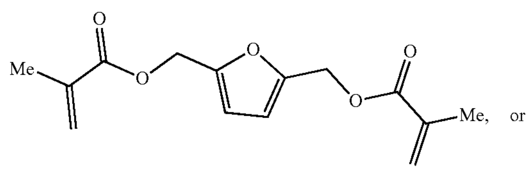

or

8

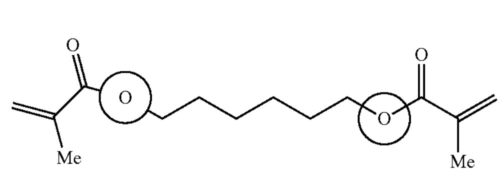

20. The method of claim 19, wherein the polymer is polymer 5:

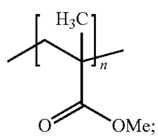

wherein n is an integer.

21. The method of claim 13, wherein the photoinitiator is compound IP-1a, compound IP-1c, compound IP-1d, compound IP-1e, compound IP-1f, compound IP-1g, compound IP-1h, compound IP-2a, compound IP-2b, compound IP-2c, compound IP-2d, compound IP-2e, compound IP-2f, compound IP-2g, compound IP-3a, compound IP-3b, compound IP-4a, compound IP-4b, compound IP-5a, compound IP-5b, compound IP-5c, compound IP-6a, compound IP-6b, compound IP-7a, compound IP-7b, compound IP-7c, compound IP-7d, compound IP-7e, compound IP-8a, compound IP-8a, compound IP-9a, compound IP-9b, compound IP-10a, or compound IP-10b:

IP-1a

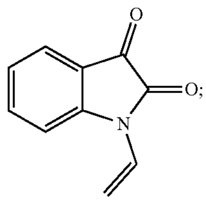

IP-1c

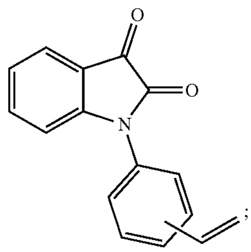

IP-1d

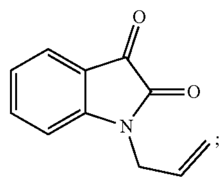

IP-1e

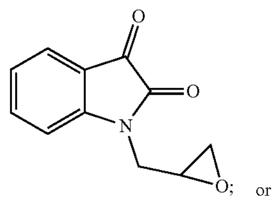

or

-continued

IP-1f

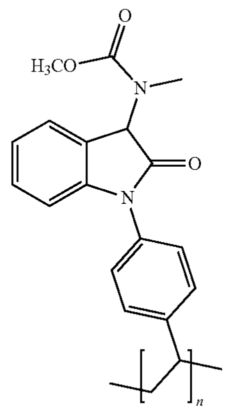

wherein n is an integer;

IP-1g

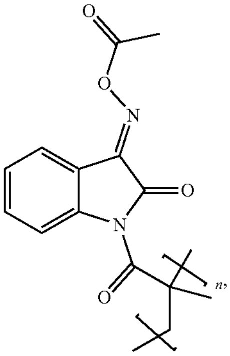

wherein n is an integer;

IP-1h

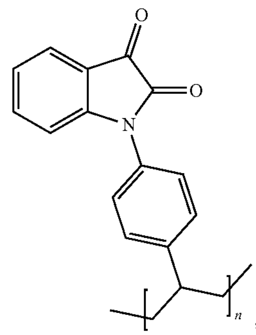

wherein n is an integer; or
IP-1i
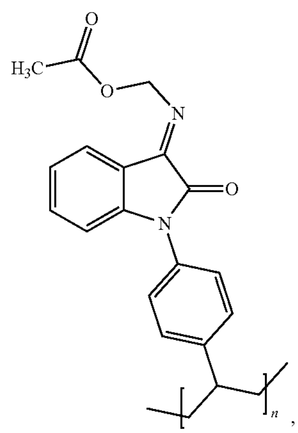
wherein n is an integer;
IP-2a
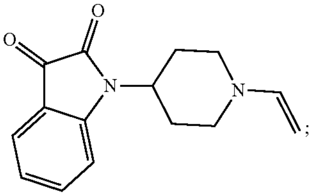
IP-2b
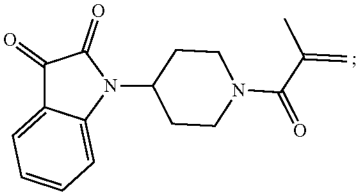
IP-2c
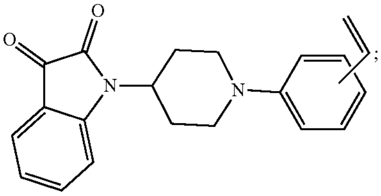
IP-2d
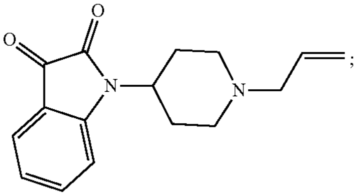
IP-2e
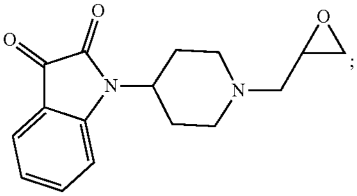
-continued
IP-2f
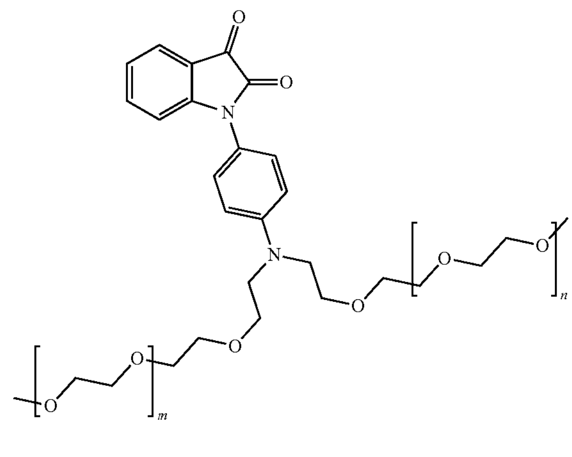
wherein m and n are each integers; or
IP-2g
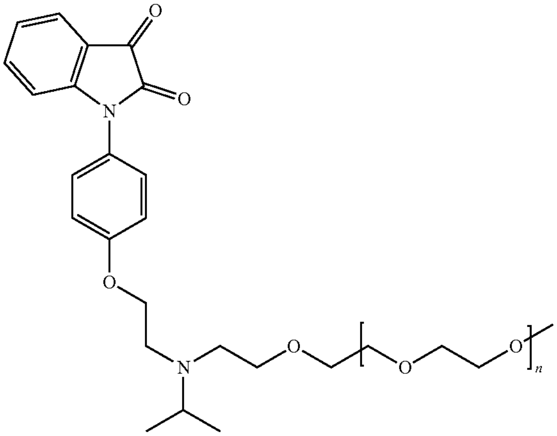
wherein m and n are each integers;
IP-3a
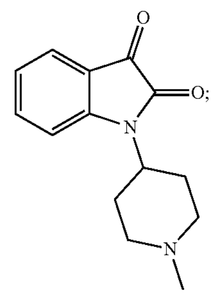

-continued
IP-3b
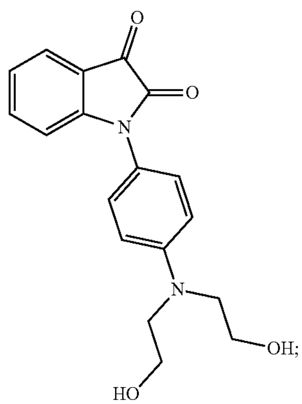
IP-4a
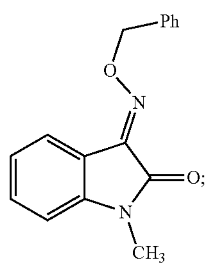
IP-4b
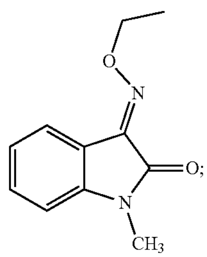
IP-5a
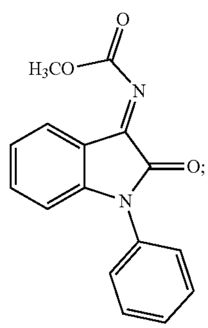
IP-5b
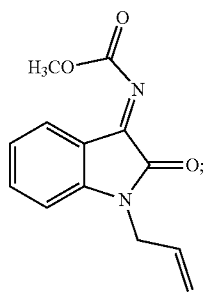
-continued
IP-5c
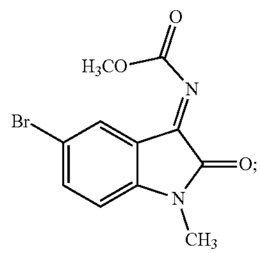
IP-6a
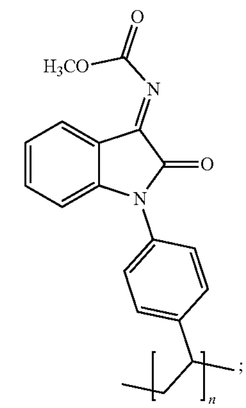
IP-6b
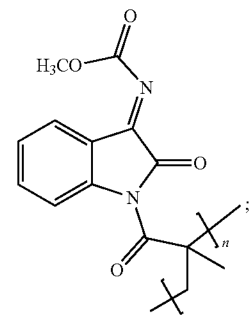
IP-7a
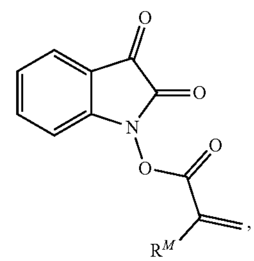
wherein $R^M$ is alkyl, aryl, heteroaryl, alkoxy, carboxy alkyl, or an amide;
IP-7b
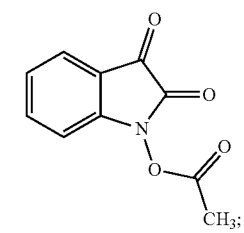

-continued
IP-7c
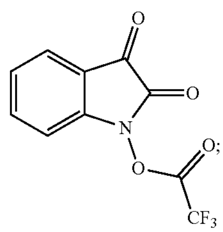
IP-7d
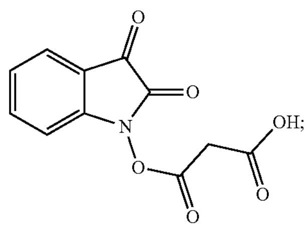
IP-7e
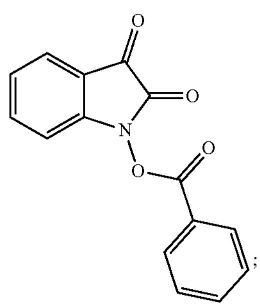
IP-8a
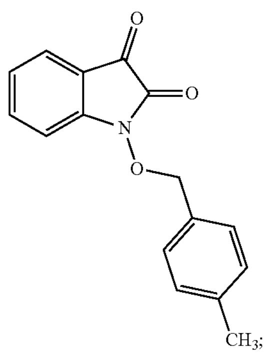
IP-8b
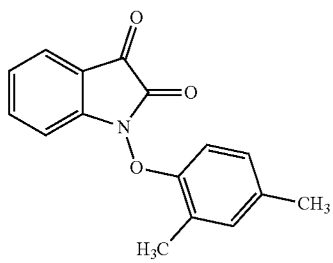
IP-9a
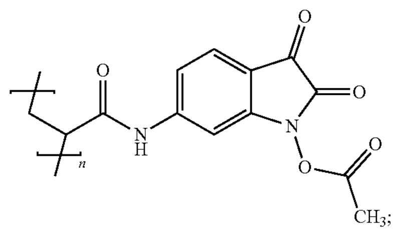
-continued
IP-9b
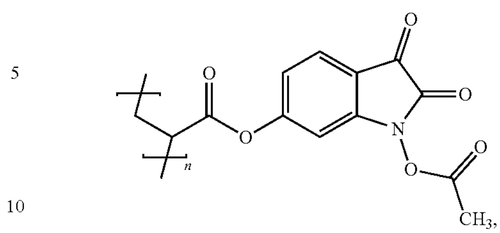
wherein n is an integer;
IP-10a
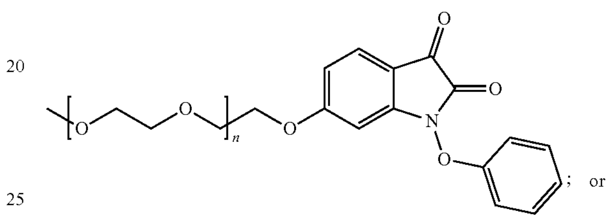
or
IP-10b
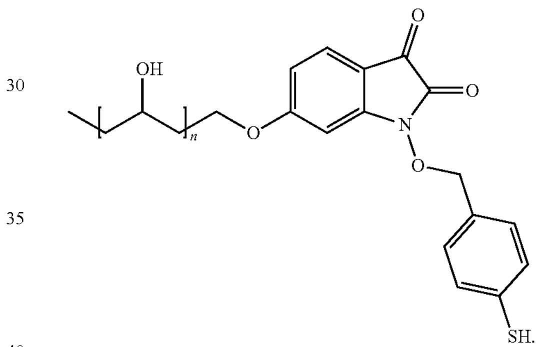
22. The method of claim 13, wherein the photoinitiator is a compound of Formula IP-1b:
Formula IP-1b
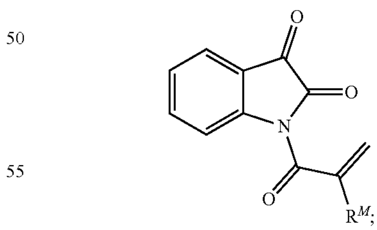
wherein $R^M$ is alkyl, aryl, heteroaryl, alkoxy, carboxy alkyl, or an amide.
23. The method of claim 13, wherein a co-initiator is exposed to the light with the photoinitiator and the monomer.
* * * * *